US012739768B2

(12) United States Patent
Lei et al.

(10) Patent No.: US 12,739,768 B2
(45) Date of Patent: Sep. 15, 2026

(54) MEASUREMENT CONFIGURATION AND VALIDATION

(71) Applicant: QUALCOMM Incorporated, San Diego, CA (US)

(72) Inventors: Jing Lei, San Diego, CA (US); Changhwan Park, San Diego, CA (US); Prashant Sharma, San Marcos, CA (US)

(73) Assignee: QUALCOMM Incorproated, San Diego, CA (US)

( * ) Notice: Subject to any disclaimer, the term of this patent is extended or adjusted under 35 U.S.C. 154(b) by 291 days.

(21) Appl. No.: 18/589,274

(22) Filed: Feb. 27, 2024

(65) Prior Publication Data

US 2024/0292359 A1 Aug. 29, 2024

Related U.S. Application Data

(60) Provisional application No. 63/487,546, filed on Feb. 28, 2023.

(51) Int. Cl.
*H04W 56/00* (2009.01)
*H04L 5/00* (2006.01)
(Continued)

(52) U.S. Cl.
CPC ....... *H04W 56/0045* (2013.01); *H04L 5/0051* (2013.01); *H04W 24/10* (2013.01); *H04W 76/30* (2018.02)

(58) Field of Classification Search
CPC . H04W 56/0045; H04W 24/10; H04W 76/30; H04W 76/28; H04W 24/08;
(Continued)

(56) References Cited

U.S. PATENT DOCUMENTS

2017/0064771 A1* 3/2017 Manepalli ............. H04W 76/30
2021/0235407 A1* 7/2021 Zhang ................. H04W 74/004
2022/0078739 A1* 3/2022 Zhang ............... H04W 56/0045

FOREIGN PATENT DOCUMENTS

WO 2022035762 A1 2/2022

OTHER PUBLICATIONS

De Paiva R.C.D (Nokia)., et al., "Discussion on Performance Requirements for SDT", 3GPP TSG-RAN WG4 Meeting #105, R4-2219738, Type Discussion, NR_SMALLDATA_INACTIVE-PERF, 3rd Generation Partnership Project, Mobile Competence Centre, 650, Route Des Lucioles, F-06921 Sophia-Antipolis Cedex, France, vol. RAN WG4, No. Toulouse, FR, Nov. 14, 2022-Nov. 18, 2022, Nov. 7, 2022, XP052213636, 24 pages, TA Validation for Small Data Uplink Transmission in RRC Inactive Mode, paragraph [0001]-paragraph [02.3].

(Continued)

*Primary Examiner* — Kan Yuen
(74) *Attorney, Agent, or Firm* — Holland & Hart LLP

(57) ABSTRACT

Methods, systems, and devices for wireless communication are described. A user equipment (UE) may support configured grant (CG)-small data transmission (SDT) procedures. To improve CG-SDT, the UE may validate measurement resources for timing advance (TA) validation and CG resource validation. The UE may receive a radio resource control (RRC) release message indicating CG resources and information that may be used for TA and CG resource validation, and the UE may receive measurement information based on one or more reference signals. In some cases, the UE may validate the measurement information and use it to perform a TA command (TAC) validation procedure. In some other cases, the UE may validate the measurement information and use it to perform a communication resources validation procedure. While in an inactive state, (Continued)

the UE may transmit an uplink communication using the validated TA and the validated communication resources.

20 Claims, 18 Drawing Sheets

(51) Int. Cl.
*H04W 24/10* (2009.01)
*H04W 76/30* (2018.01)

(58) Field of Classification Search
CPC ............ H04W 72/1268; H04W 72/231; H04L 5/0051; H04L 5/0048; H04B 17/328
See application file for complete search history.

(56) References Cited

OTHER PUBLICATIONS

International Search Report and Written Opinion—PCT/US2024/017598—ISA/EPO—Nov. 4, 2024.
Nokia., et al., "TA Validation Window Requirements for CG-SDT", 3GPP TSG-RAN WG4 #102-e, R4-2203534, 3rd Generation Partnership Project, Mobile Competence Centre, 650, Route Des Lucioles, F-06921 Sophia-Antipolis Cedex, France, vol. RAN WG4, No. Electronic Meeting; Feb. 21, 2022-Mar. 3, 2022, Feb. 14, 2022, XP052111227, 4 pages, TA Validation for Small Data Uplink Transmission in RRC Inactive Mode, paragraph [0002].
Partial International Search Report—PCT/US2024/017598—ISA/EPO—Jul. 18, 2024.

* cited by examiner

Transmit, by a first network node and in association with a connection-active state release for a second network node, first information that indicates: communication resources for uplink communication by the second network node while the second network node is in a connection-inactive state, a timing advance command (TAC), measurement resources for a TAC validation procedure, TAC validation information, and measurement validation information, where the measurement validation information includes one or more timing-related criterion and one or more non-timing-related criterion

1705

Receive, while the second network node is in the connection-inactive state, the uplink communication using the communication resources, the reception indicative that measurement information obtained by the second network node based on the measurement resources is valid based on the measurement validation information

1710

1700

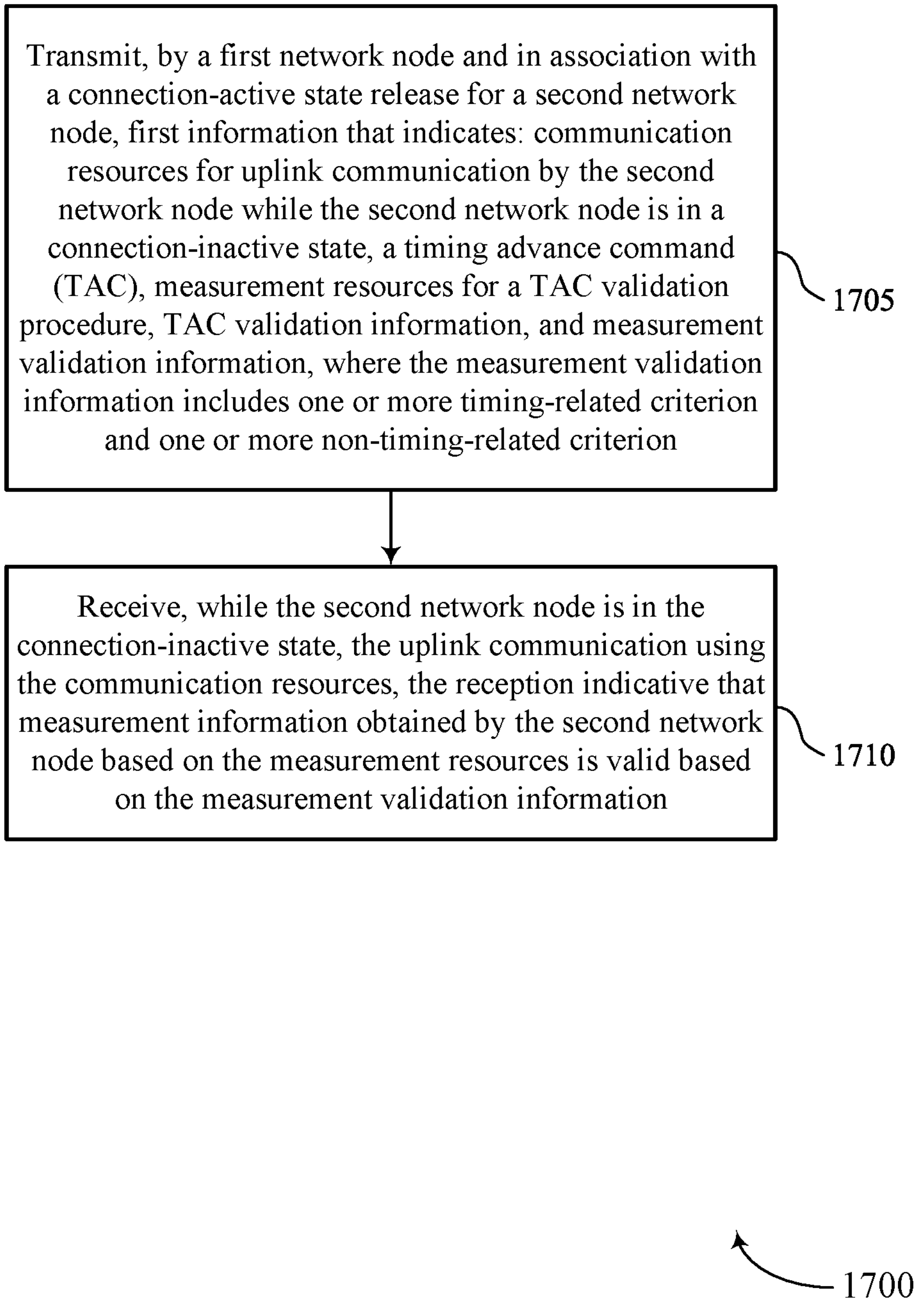

FIG. 17

Transmit, by a first network node and in association with a connection-active state release for a second network node, first information that indicates: communication resources for uplink communication by the second network node while the second network node is in a connection-inactive state, measurement resources for an uplink communication resources validation procedure, uplink communication resources validation information, and measurement validation information

1805

Receive, while the second network node is in the connection-inactive state, the uplink communication using the communication resources, the reception indicative that measurement information obtained by the second network node based on the measurement resources is valid based on the measurement validation information

1810

1800

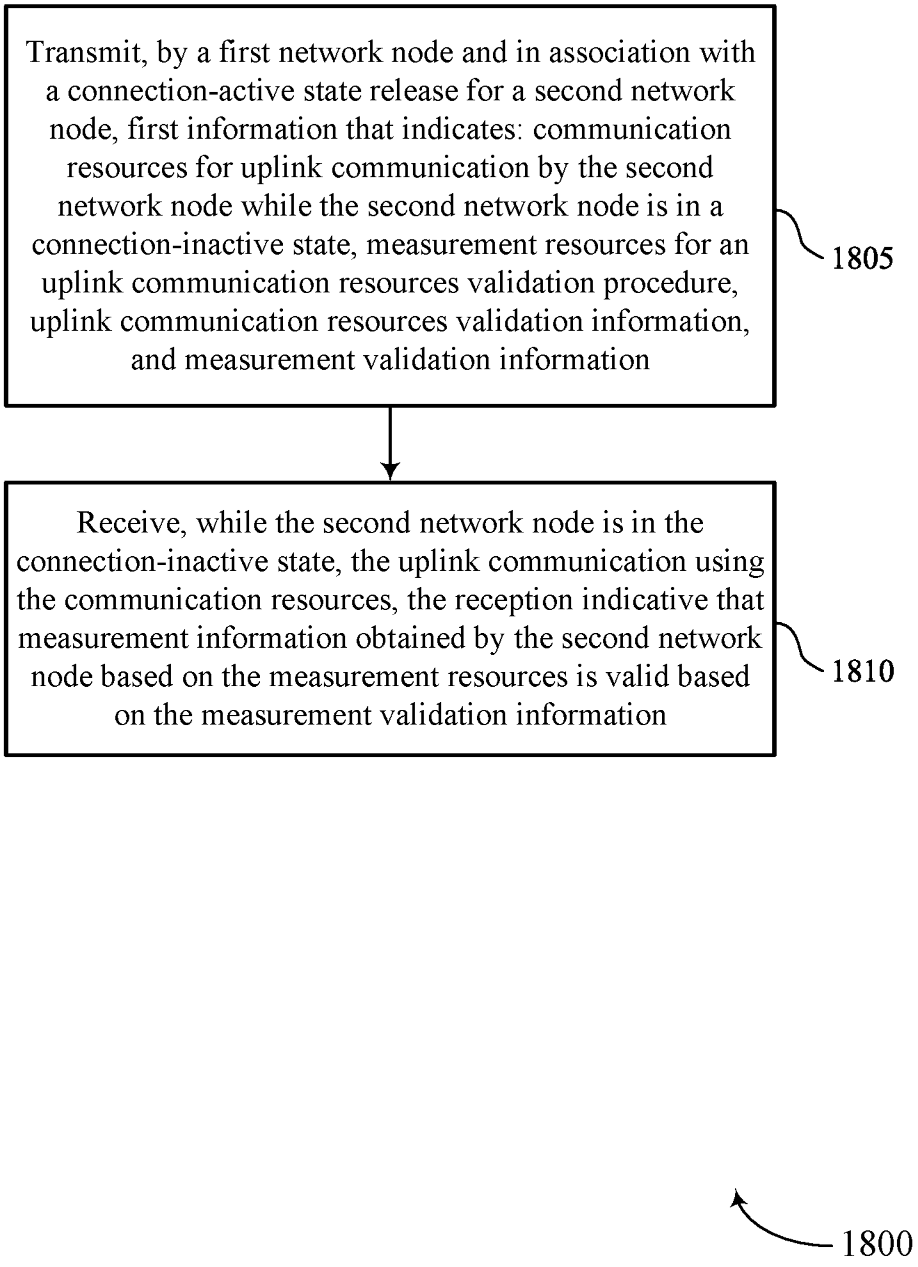

FIG. 18

MEASUREMENT CONFIGURATION AND VALIDATION

CROSS REFERENCE

The present Application for Patent claims the benefit of U.S. Provisional Patent Application No. 63/487,546 by LEI et al., entitled "MEASUREMENT CONFIGURATION AND VALIDATION," filed Feb. 28, 2023, and assigned to the assignee hereof. U.S. Provisional Patent Application No. 63/487,546 is expressly incorporated by reference in its entirety herein.

INTRODUCTION

The following relates to wireless communications relating to measurement configuration and validation for configured grant (CG) small data transmission (SDT) procedures while a user equipment (UE) is in an inactive state.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations, each supporting wireless communication for communication devices, which may be known as UEs.

SUMMARY

Techniques described herein may support measurement configuration and validation in support of timing advance (TA) validation and configured grant (CG) resource validation (and selection) for small data transmission (SDT) procedures. A user equipment (UE) may receive a radio resource control (RRC) release message that also indicates communication resources for uplink communications such as CG-SDT communications. The RRC release message may also include, in connection with the CG-SDT configuration, a timing advance command (TAC), measurement resources for a TAC validation procedure, TAC validation information, and measurement validation information. The measurement validation information may include both timing-related criterion and non-timing-related criterion. Based on the measurement resources, the UE may obtain first and second reference signal measurement information corresponding to a first and second reference signal, respectively. Based on the measurement validation information, the UE may validate the measurement information for use in the TAC validation procedure, which the UE may perform while in an RRC inactive state. In some cases, the UE may validate the TAC for application to transmission of the uplink communication, and transmit the uplink communication resources based on the validated TAC and the communication resources while still in the RRC inactive state.

Additionally, or alternatively, the UE may perform CG resource validation. The UE may receive the RRC release message. In the case of CG resource validation, the RRC release message may indicate communication resources for uplink communication (e.g., a CG-SDT configuration), measurement resources for an uplink communication resources validation procedure, uplink communication resources validation information (used for the corresponding validation procedure), and measurement validation information. The UE may obtain reference signal measurement information based on the measurement resources and then validate the reference signal measurement information based on the measurement validation information. As such, the UE may use the reference signal measurement information as a valid input for the uplink communication resources validation procedure. While in an RRC inactive state, the UE may perform the uplink communication resources validation procedure, which may include validating the communication resources based on the uplink communication resources validation information. While still in the RRC inactive state, the UE may transmit the uplink communication using the validated communication resources.

A method is described. The method may include receiving, at a first network entity and in association with a connection-active state release, first information that indicates: communication resources for uplink communication in a connection-inactive state, a TAC, measurement resources for a TAC validation procedure, TAC validation information, and measurement validation information, where the measurement validation information includes one or more timing-related criterion and one or more non-timing-related criterion, obtaining, based on the measurement resources, measurement information including first reference signal measurement information corresponding to a first reference signal and second reference signal measurement information corresponding to a second reference signal, validating, based on the measurement validation information, the measurement information as valid input information for the TAC validation procedure, performing, while in the connection-inactive state and based on the validation of the measurement information, the TAC validation procedure, where performing the TAC validation procedure includes validating, based on the TAC validation information, the TAC for application to transmission of the uplink communication using the communication resources, and transmitting, while in the connection-inactive state and based on the validated TAC, the uplink communication using the communication resources.

A first network entity is described. The first network entity may include a memory and at least one processor coupled with the memory. The at least one processor may be configured to receive, at the first network entity and in association with a connection-active state release, first information that indicates: communication resources for uplink communication in a connection-inactive state, a TAC, measurement resources for a TAC validation procedure, TAC validation information, and measurement validation information, where the measurement validation information includes one or more timing-related criterion and one or more non-timing-related criterion, obtaining, based on the measurement resources, measurement information including first reference signal measurement information corresponding to a first reference signal and second reference signal measurement information corresponding to a second reference signal, validate, based on the measurement validation information, the measurement information as valid input information for the TAC validation procedure, perform, while in the connection-inactive state and based on the validation of the measurement information, the TAC validation procedure, where performing the TAC validation procedure includes validating, based on the TAC validation information, the TAC for application to transmission of the uplink communication using the communication resources, and transmit, while in the connection-inactive state and based on the validated TAC, the uplink communication using the communication resources.

Another apparatus is described. The apparatus may include means for receiving, at a first network entity and in association with a connection-active state release, first information that indicates: communication resources for uplink communication in a connection-inactive state, a TAC, measurement resources for a TAC validation procedure, TAC validation information, and measurement validation information, where the measurement validation information includes one or more timing-related criterion and one or more non-timing-related criterion, means for obtaining, based on the measurement resources, measurement information including first reference signal measurement information corresponding to a first reference signal and second reference signal measurement information corresponding to a second reference signal, means for validating, based on the measurement validation information, the measurement information as valid input information for the TAC validation procedure, means for performing, while in the connection-inactive state and based on the validation of the measurement information, the TAC validation procedure, where performing the TAC validation procedure includes validating, based on the TAC validation information, the TAC for application to transmission of the uplink communication using the communication resources, and means for transmitting, while in the connection-inactive state and based on the validated TAC, the uplink communication using the communication resources.

A non-transitory computer-readable medium storing code is described. The code may include instructions executable by a processor to receive, at a first network entity and in association with a connection-active state release, first information that indicates: communication resources for uplink communication in a connection-inactive state, a TAC, measurement resources for a TAC validation procedure, TAC validation information, and measurement validation information, where the measurement validation information includes one or more timing-related criterion and one or more non-timing-related criterion, obtaining, based on the measurement resources, measurement information including first reference signal measurement information corresponding to a first reference signal and second reference signal measurement information corresponding to a second reference signal, validate, based on the measurement validation information, the measurement information as valid input information for the TAC validation procedure, perform, while in the connection-inactive state and based on the validation of the measurement information, the TAC validation procedure, where performing the TAC validation procedure includes validating, based on the TAC validation information, the TAC for application to transmission of the uplink communication using the communication resources, and transmit, while in the connection-inactive state and based on the validated TAC, the uplink communication using the communication resources.

In some aspects of the method, first network entities, and non-transitory computer-readable medium described herein, obtaining the measurement information may include operations, features, means, or instructions for receiving and measuring a first instance of a reference signal within a first bandwidth part (BWP) that was used by the first network entity while in a connected state and receiving and measuring a second instance of the reference signal within the first BWP that was used by the first network entity while in the connected state.

In some aspects of the method, first network entities, and non-transitory computer-readable medium described herein, obtaining the measurement information may include operations, features, means, or instructions for receiving and measuring a first instance of a reference signal within a first BWP that was used by the first network entity while in a connected state and receiving and measuring a second instance of the reference signal within a second BWP that was used by the first network entity while in the connection-inactive state.

In some aspects of the method, first network entities, and non-transitory computer-readable medium described herein, obtaining the measurement information may include operations, features, means, or instructions for receiving and measuring a first instance of a reference signal within a second BWP that was used by the first network entity while in the connection-inactive state, where a first BWP was used by the first network entity while in a connected state and receiving and measuring a second instance of the reference signal within the second BWP that was used by the first network entity while in the connection-inactive state.

In some aspects of the method, first network entities, and non-transitory computer-readable medium described herein, performing the TAC validation procedure may include operations, features, means, or instructions for comparing a difference between the first reference signal measurement information and the second reference signal measurement information with a threshold difference.

Some aspects of the method, first network entities, and non-transitory computer-readable medium described herein may further include operations, features, means, or instructions for applying an offset or a scaling factor to at least one of the first reference signal measurement information, the second reference signal measurement information, or the threshold difference based on the first reference signal measurement information and the second reference signal measurement information being associated with different configurations of reference signals, different carrier frequencies, different configurations of receive antennas, or different transmit powers of the reference signals.

In some aspects of the method, first network entities, and non-transitory computer-readable medium described herein, applying the offset or the scaling factor may include operations, features, means, or instructions for receiving the offset or the scaling factor for application to at least one of the first reference signal measurement information, the second reference signal measurement information, or the threshold difference.

In some aspects of the method, first network entities, and non-transitory computer-readable medium described herein, the non-timing-related criterion indicates that the first reference signal measurement information and the second reference signal measurement information may be obtained within a same frequency range.

In some aspects of the method, first network entities, and non-transitory computer-readable medium described herein, the timing-related criterion indicates a first time at which the first reference signal measurement information may be obtained, a second time at which the second reference signal measurement information may be obtained, a TAC validation time, and a transmission time for transmission of the uplink communication and the timing-related criterion indicates that the first time may be prior to the second time, which may be prior to or at a same time as the TAC validation time, which may be prior to the transmission time.

In some aspects of the method, first network entities, and non-transitory computer-readable medium described herein, the timing-related criterion indicates that a difference between the TAC validation time and the second time may be less than or equal to a delta time threshold and the delta time threshold may have a value greater than zero and may be based on one or more of a frequency range of the uplink communication, a discontinuous reception cycle (DRX) cycle length associated with the first network entity in the connection-inactive state, a measurement window configuration for a set of multiple reference resources associated with the TAC validation procedure, a type and a configuration of the second reference signal, and a configuration of receive antennas used to obtain the second reference signal measurement information at the second time.

In some aspects of the method, first network entities, and non-transitory computer-readable medium described herein, the timing-related criterion indicates that a difference between the transmission time and the TAC validation time may be less than or equal to a delta time threshold and the delta time threshold may have a value greater than zero.

In some aspects of the method, first network entities, and non-transitory computer-readable medium described herein, the timing-related criterion indicates that a difference between a message arrival time and the first time may be less than or equal to a delta time threshold, the message arrival time may be a most recent time at which the first network entity receives a TAC of a primary timing advance group (TAG) or receives the first information, and the delta time threshold may have a value greater than zero and may be based on one or more of a frequency range of the uplink communication, a DRX cycle length associated with the first network entity, a measurement window configuration for a set of multiple reference resources associated with the TAC validation procedure, a type and a configuration of the first reference signal, and a configuration of receive antennas used to obtain the first reference signal measurement information at the first time.

Some aspects of the method, first network entities, and non-transitory computer-readable medium described herein may further include operations, features, means, or instructions for receiving an indication of a first threshold value associated with a difference between the TAC validation time and the second time, a second threshold value associated with a difference between the transmission time and the TAC validation time, and a third threshold value associated with a difference between a message arrival time and the first time, where the message arrival time may be a most recent time at which the first network entity receives a TAC of a primary TAG or receives the first information.

In some aspects of the method, first network entities, and non-transitory computer-readable medium described herein, the uplink communication includes an initial CG-SDT or an autonomous retransmission prior to receiving a response message for the initial CG-SDT transmission.

A method is described. The method may include receiving, at a first network entity and in association with a connection-active state release, first information that indicates: communication resources for uplink communication in a connection-inactive state, measurement resources for an uplink communication resources validation procedure, uplink communication resources validation information, and measurement validation information, obtaining, based on the measurement resources, reference signal measurement information, validating, based on the measurement validation information, the reference signal measurement information as valid input information for the uplink communication resources validation procedure, performing, while in the connection-inactive state and based on the validation of the reference signal measurement information, the uplink communication resources validation procedure, where performing the uplink communication resources validation procedure includes validating, based on the uplink communication resources validation information, the communication resources, and transmitting, while in the connection-inactive state and based on the validated communication resources, the uplink communication using the communication resources.

A first network entity is described. The apparatus may include a processor, memory coupled with the processor, and instructions stored in the memory. The instructions may be executable by the processor to cause the apparatus to receive, at a first network entity and in association with a connection-active state release, first information that indicates: communication resources for uplink communication in a connection-inactive state, measurement resources for an uplink communication resources validation procedure, uplink communication resources validation information, and measurement validation information, obtaining, based on the measurement resources, reference signal measurement information, validate, based on the measurement validation information, the reference signal measurement information as valid input information for the uplink communication resources validation procedure, perform, while in the connection-inactive state and based on the validation of the reference signal measurement information, the uplink communication resources validation procedure, where performing the uplink communication resources validation procedure includes validating, based on the uplink communication resources validation information, the communication resources, and transmit, while in the connection-inactive state and based on the validated communication resources, the uplink communication using the communication resources.

Another apparatus is described. The apparatus may include means for receiving, at a first network entity and in association with a connection-active state release, first information that indicates: communication resources for uplink communication in a connection-inactive state, measurement resources for an uplink communication resources validation procedure, uplink communication resources validation information, and measurement validation information, means for obtaining, based on the measurement resources, reference signal measurement information, means for validating, based on the measurement validation information, the reference signal measurement information as valid input information for the uplink communication resources validation procedure, means for performing, while in the connection-inactive state and based on the validation of the reference signal measurement information, the uplink communication resources validation procedure, where performing the uplink communication resources validation procedure includes validating, based on the uplink communication resources validation information, the communication resources, and means for transmitting, while in the connection-inactive state and based on the validated communication resources, the uplink communication using the communication resources.

A non-transitory computer-readable medium storing code is described. The code may include instructions executable by a processor to receive, at a first network entity and in association with a connection-active state release, first information that indicates: communication resources for uplink communication in a connection-inactive state, measurement resources for an uplink communication resources validation procedure, uplink communication resources validation information, and measurement validation information, obtaining, based on the measurement resources, reference signal measurement information, validate, based on the measurement validation information, the reference signal measurement information as valid input information for the uplink communication resources validation procedure, perform, while in the connection-inactive state and based on the validation of the reference signal measurement information, the uplink communication resources validation procedure, where performing the uplink communication resources validation procedure includes validating, based on the uplink communication resources validation information, the communication resources, and transmit, while in the connection-inactive state and based on the validated communication resources, the uplink communication using the communication resources.

In some aspects of the method, first network entities, and non-transitory computer-readable medium described herein, obtaining the reference signal measurement information may include operations, features, means, or instructions for receiving and measuring a reference signal within a first BWP that was used by the first network entity while in a connected state or a second BWP that was used by the first network entity while in the connection-inactive state.

In some aspects of the method, first network entities, and non-transitory computer-readable medium described herein, the communication resources that may be validated may be in a same frequency range as the measurement resources which may be a basis for the reference signal measurement information.

In some aspects of the method, first network entities, and non-transitory computer-readable medium described herein, validating the reference signal measurement information may include operations, features, means, or instructions for comparing a timing and a value of the reference signal measurement information with a set of threshold measurement values.

In some aspects of the method, first network entities, and non-transitory computer-readable medium described herein, transmitting the uplink communication may include operations, features, means, or instructions for transmitting a set of multiple uplink communications over a corresponding set of multiple validated uplink transmission occasions, where the uplink communication resources validation procedure may be performed prior to each transmission.

Some aspects of the method, first network entities, and non-transitory computer-readable medium described herein may further include operations, features, means, or instructions for receiving second information that indicates a set of multiple reference resources for validation of the reference signal measurement information, each of the set of multiple reference resources being associated with a different one of the set of multiple validated uplink transmission occasions and applying an offset or a scaling factor to at least one of the reference signal measurement information or the set of threshold measurement values based on the set of multiple reference resources for the validation of the reference signal measurement information being associated with different reference signals, different carrier frequencies, different configurations of receive antennas, or different transmit powers.

In some aspects of the method, first network entities, and non-transitory computer-readable medium described herein, applying the offset or the scaling factor may include operations, features, means, or instructions for receiving the offset or the scaling factor for application to at least one of the reference signal measurement information or the set of threshold measurement values.

In some aspects of the method, first network entities, and non-transitory computer-readable medium described herein, the measurement validation information indicates that a set of multiple reference resources for the reference signal measurement information correspond to a resource map between the measurement resources which may be a basis for the reference signal measurement information and the communication resources indicated in the first information.

In some aspects of the method, first network entities, and non-transitory computer-readable medium described herein, the measurement validation information indicates that the reference signal measurement information may be obtained and the uplink communication may be transmitted within a same frequency range.

In some aspects of the method, first network entities, and non-transitory computer-readable medium described herein, the measurement validation information indicates a first time at which a first reference signal measurement information may be obtained, a communication resource validation time, a transmission time for transmission of the uplink communication, and a delta time and the measurement validation information indicates that the first time may be prior to or at a same time as the communication resource validation time, which may be prior to the transmission time.

In some aspects of the method, first network entities, and non-transitory computer-readable medium described herein, the measurement validation information indicates that a difference between the communication resource validation time and the first time may be less than or equal to the delta time.

In some aspects of the method, first network entities, and non-transitory computer-readable medium described herein, the delta time may have a value greater than zero and may be based on one or more of a frequency range of the uplink communication, a DRX cycle length associated with the first network entity, a measurement window configuration for a reference signal associated with communication resource validation, a type of a reference signal which may be a basis for the reference signal measurement information, a configuration of receive antennas used to obtain the reference signal measurement information at the first time, a transmission power associated with the reference signal measurement information, and a configuration of receive antennas used for downlink channel reception.

Some aspects of the method, first network entities, and non-transitory computer-readable medium described herein may further include operations, features, means, or instructions for validating, while in the connection-inactive state, a TAC for application to transmission of the uplink communication using the communication resources indicated in the first information, where the TAC validation may be based on the validity of the reference signal measurement information as the valid input information.

A method is described. The method may include transmitting, by a first network entity and in association with a connection-active state release for a second network entity, first information that indicates: communication resources for uplink communication by the second network entity while the second network entity is in a connection-inactive state, a TAC, measurement resources for a TAC validation procedure, TAC validation information, and measurement validation information, where the measurement validation information includes one or more timing-related criterion and one or more non-timing-related criterion and receiving, while the second network entity is in the connection-inactive state, the uplink communication using the communication resources, the reception indicative that measurement information obtained by the second network entity based on the measurement resources is valid based on the measurement validation information.

A first network entity is described. The first network entity may include a memory and at least one processor coupled with the memory. The at least one processor may be configured to transmit, by a first network entity and in association with a connection-active state release for a second network entity, first information that indicates: communication resources for uplink communication by the second network entity while the second network entity is in a connection-inactive state, a TAC, measurement resources for a TAC validation procedure, TAC validation information, and measurement validation information, where the measurement validation information includes one or more timing-related criterion and one or more non-timing-related criterion and receive, while the second network entity is in the connection-inactive state, the uplink communication using the communication resources, the reception indicative that measurement information obtained by the second network entity based on the measurement resources is valid based on the measurement validation information.

Another apparatus is described. The apparatus may include means for transmitting, by a first network entity and in association with a connection-active state release for a second network entity, first information that indicates: communication resources for uplink communication by the second network entity while the second network entity is in a connection-inactive state, a TAC, measurement resources for a TAC validation procedure, TAC validation information, and measurement validation information, where the measurement validation information includes one or more timing-related criterion and one or more non-timing-related criterion and means for receiving, while the second network entity is in the connection-inactive state, the uplink communication using the communication resources, the reception indicative that measurement information obtained by the second network entity based on the measurement resources is valid based on the measurement validation information.

A non-transitory computer-readable medium storing code is described. The code may include instructions executable by a processor to transmit, by a first network entity and in association with a connection-active state release for a second network entity, first information that indicates: communication resources for uplink communication by the second network entity while the second network entity is in a connection-inactive state, a TAC, measurement resources for a TAC validation procedure, TAC validation information, and measurement validation information, where the measurement validation information includes one or more timing-related criterion and one or more non-timing-related criterion and receive, while the second network entity is in the connection-inactive state, the uplink communication using the communication resources, the reception indicative that measurement information obtained by the second network entity based on the measurement resources is valid based on the measurement validation information.

Some aspects of the method, first network entities, and non-transitory computer-readable medium described herein may further include operations, features, means, or instructions for transmitting a first instance of a reference signal within a first BWP that was used by the second network entity while in a connected state and transmitting a second instance of the reference signal within the first BWP that was used by the second network entity while in the connected state.

Some aspects of the method, first network entities, and non-transitory computer-readable medium described herein may further include operations, features, means, or instructions for transmitting a first instance of a reference signal within a first BWP that was used by the second network entity while in a connected state and transmitting a second instance of the reference signal within a second BWP that was used by the second network entity while in the connection-inactive state.

Some aspects of the method, first network entities, and non-transitory computer-readable medium described herein may further include operations, features, means, or instructions for transmitting a first instance of a reference signal within a second BWP that was used by the second network entity while in the connection-inactive state, where a first BWP was used by the first network entity while in a connected state and transmitting a second instance of the reference signal within the second BWP that was used by the second network entity while in the connection-inactive state.

Some aspects of the method, first network entities, and non-transitory computer-readable medium described herein may further include operations, features, means, or instructions for transmitting an offset or a scaling factor for application by the second network entity to at least one of a first reference signal measurement information, a second reference signal measurement information, or a threshold difference between the first reference signal measurement information and the second reference signal measurement information.

In some aspects of the method, first network entities, and non-transitory computer-readable medium described herein, the non-timing-related criterion indicates that a first reference signal measurement information and a second reference signal measurement information may be within a same frequency range.

In some aspects of the method, first network entities, and non-transitory computer-readable medium described herein, the timing-related criterion indicates a first time at which a first reference signal measurement information may be obtained by the second network entity, a second time at which the second reference signal measurement information may be obtained by the second network entity, a TAC validation time, and a transmission time for transmission of the uplink communication and the timing-related criterion indicates that the first time may be prior to the second time, which may be prior to or at a same time as the TAC validation time, which may be prior to the transmission time.

In some aspects of the method, first network entities, and non-transitory computer-readable medium described herein, the timing-related criterion indicates that a difference between the TAC validation time and the second time may be less than or equal to a delta time threshold and the delta time threshold may have a value greater than zero and may be based on one or more of a frequency range of the uplink communication, a DRX cycle length associated with the second network entity in the connection-inactive state, a measurement window configuration for a set of multiple reference resources associated with the TAC validation procedure, a type and a configuration of a reference signal, and a configuration of receive antennas used to obtain the second reference signal measurement information at the second measurement time.

In some aspects of the method, first network entities, and non-transitory computer-readable medium described herein, the timing-related criterion indicates that a difference between the transmission time and the TAC validation time may be less than or equal to a delta time threshold and the delta time threshold may have a value greater than zero.

In some aspects of the method, first network entities, and non-transitory computer-readable medium described herein, the timing-related criterion indicates that a difference between a message arrival time and the first time may be less than or equal to a delta time threshold, the message arrival time may be a most recent time at which the second network entity receives a TAC of a primary TAG or receives the first information, and the delta time threshold may have a value greater than zero and may be based on one or more of a frequency range of the uplink communication, a DRX cycle length associated with the second network entity, a measurement window configuration for a set of multiple reference resources associated with the TAC validation procedure, a type and a configuration of a reference signal, and a configuration of receive antennas used to obtain the first reference signal measurement information at the first time.

Some aspects of the method, first network entities, and non-transitory computer-readable medium described herein may further include operations, features, means, or instructions for transmitting an indication of a first threshold value associated with a difference between the TAC validation time and the second time, a second threshold value associated with a difference between the transmission time and the TAC validation time, and a third threshold value associated with a difference between a message arrival time and the first time, where the message arrival time may be a most recent time at which the first network entity transmits a TAC of a primary TAG or transmits the first information.

In some aspects of the method, first network entities, and non-transitory computer-readable medium described herein, the uplink communication includes an initial CG-SDT or an autonomous retransmission prior to receiving a response message for the initial CG-SDT transmission.

A method is described. The method may include transmitting, by a first network entity and in association with a connection-active state release for a second network entity, first information that indicates: communication resources for uplink communication by the second network entity while the second network entity is in a connection-inactive state, measurement resources for an uplink communication resources validation procedure, uplink communication resources validation information, and measurement validation information and receiving, while the second network entity is in the connection-inactive state, the uplink communication using the communication resources, the reception indicative that measurement information obtained by the second network entity based on the measurement resources is valid based on the measurement validation information.

An apparatus is described. The apparatus may include a processor, memory coupled with the processor, and instructions stored in the memory. The instructions may be executable by the processor to cause the apparatus to transmit, by a first network entity and in association with a connection-active state release for a second network entity, first information that indicates: communication resources for uplink communication by the second network entity while the second network entity is in a connection-inactive state, measurement resources for an uplink communication resources validation procedure, uplink communication resources validation information, and measurement validation information and receive, while the second network entity is in the connection-inactive state, the uplink communication using the communication resources, the reception indicative that measurement information obtained by the second network entity based on the measurement resources is valid based on the measurement validation information.

Another apparatus is described. The apparatus may include means for transmitting, by a first network entity and in association with a connection-active state release for a second network entity, first information that indicates: communication resources for uplink communication by the second network entity while the second network entity is in a connection-inactive state, measurement resources for an uplink communication resources validation procedure, uplink communication resources validation information, and measurement validation information and means for receiving, while the second network entity is in the connection-inactive state, the uplink communication using the communication resources, the reception indicative that measurement information obtained by the second network entity based on the measurement resources is valid based on the measurement validation information.

A non-transitory computer-readable medium storing code is described. The code may include instructions executable by a processor to transmit, by a first network entity and in association with a connection-active state release for a second network entity, first information that indicates: communication resources for uplink communication by the second network entity while the second network entity is in a connection-inactive state, measurement resources for an uplink communication resources validation procedure, uplink communication resources validation information, and measurement validation information and receive, while the second network entity is in the connection-inactive state, the uplink communication using the communication resources, the reception indicative that measurement information obtained by the second network entity based on the measurement resources is valid based on the measurement validation information.

Some aspects of the method, first network entities, and non-transitory computer-readable medium described herein may further include operations, features, means, or instructions for transmitting a reference signal within a first BWP that was used by the second network entity while in a connected state or a second BWP that was used by the second network entity while in the connection-inactive state.

In some aspects of the method, first network entities, and non-transitory computer-readable medium described herein, the communication resources that may be validated may be in a same frequency range as the measurement resources.

In some aspects of the method, first network entities, and non-transitory computer-readable medium described herein, receiving the uplink communication may include operations, features, means, or instructions for receiving a set of multiple uplink communications over a corresponding set of multiple validated uplink transmission occasions.

Some aspects of the method, first network entities, and non-transitory computer-readable medium described herein may further include operations, features, means, or instructions for transmitting second information that indicates a set of multiple reference resources for validation of the measurement information, each of the set of multiple reference resources being associated with a different one of the set of multiple validated uplink transmission occasions.

Some aspects of the method, first network entities, and non-transitory computer-readable medium described herein may further include operations, features, means, or instructions for transmitting an offset or a scaling factor for application to at least one of the measurement information or a set of threshold measurement values.

In some aspects of the method, first network entities, and non-transitory computer-readable medium described herein, the measurement validation information indicates that a set of multiple reference resources for the measurement information correspond to a resource map between the measurement resources which and the communication resources indicated in the first information.

In some aspects of the method, first network entities, and non-transitory computer-readable medium described herein, the measurement validation information indicates a first time at which a first reference signal measurement information may be obtained, a communication resource validation time, a transmission time for transmission of the uplink communication, and a delta time and the measurement validation information indicates that the first time may be prior to or at a same time as the communication resource validation time, which may be prior to the transmission time.

In some aspects of the method, first network entities, and non-transitory computer-readable medium described herein, the measurement validation information indicates that a difference between the communication resource validation time and the first time may be less than or equal to the delta time.

In some aspects of the method, first network entities, and non-transitory computer-readable medium described herein, the delta time may have a value greater than zero and may be based on one or more of a frequency range of the uplink communication, a DRX cycle length associated with a second network entity, a measurement window configuration for the reference signal associated with communication resource validation, a type of a reference signal which may be a basis for the reference signal measurement information, a configuration of receive antennas used to obtain the reference signal measurement information at the first time, a transmission power associated with the reference signal measurement information, and a configuration of receive antennas used for downlink channel reception.

BRIEF DESCRIPTION OF THE DRAWINGS

FIGS. 15 through 18 illustrate flowcharts showing methods that support measurement configuration and validation for small data transmission in accordance with one or more aspects of the present disclosure.

DETAILED DESCRIPTION

Figure 1:
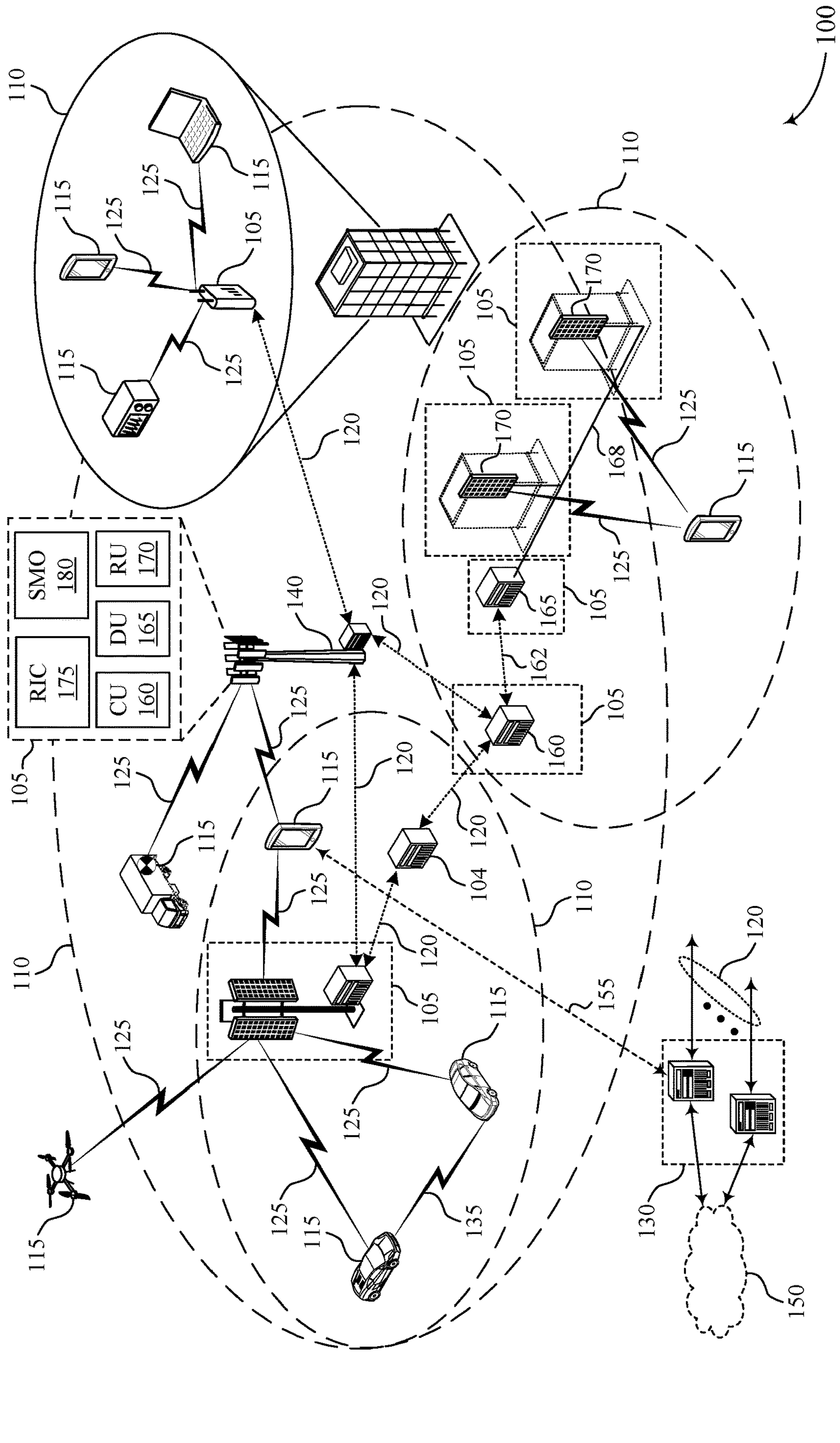
FIG. 1 shows an example of a wireless communications system that supports measurement configuration and validation for small data transmission in accordance with one or more aspects of the present disclosure.

Configured grant (CG)-small data transmission (SDT) procedures may improve power saving and decrease overhead for user equipment (UE). SDT allows for data or other signaling to be transmitted by a UE while the UE is in a radio resource control (RRC) inactive state. To enable SDT, a UE is configured with SDT resources. To allow the UE to remain in the RRC inactive state for the SDT, the UE is granted SDT resources in advance and then, if the UE has need to transmit uplink data or signaling, the UE can use the already-configured resources as needed. However, as described herein, aspects associated with the SDT configuration may become stale over time. Therefore, these aspects, such as timing information and resource information, may be validated prior to the UE actually using the CG-SDT resources. CG-SDT may be used to provide reports or other data that the UE is able to generate without being in an RRC connected state. Nevertheless, the uses of CG-SDT are not limited to reports; CG-SDT may be used for any data transmission where the UE benefits from remaining in the RRC inactive state. Standalone transmissions or transmissions when the UE is maintaining battery life are some examples of what might be considered for CG-SDT transmissions.

To perform CG-SDT, a network entity may transmit an RRC release message suspending an RRC connection between the UE and the network entity. Additionally, the RRC release message may indicate resources (e.g., a CG resource configuration) for the UE to use to transmit uplink communications while in an RRC inactive state. The UE may enter the RRC inactive state, and if the UE determines that it has data to transmit (within the bounds of the CG-SDT configuration), the UE may anticipate using a CG-SDT resource for an uplink transmission (even while the UE is still in the RRC inactive state). In some aspects, the UE may use a last known (e.g., most previously indicated) timing advance (TA) for the uplink transmission. However, as conditions may have changed since the UE received an indication of the TA (e.g., the UE may have moved), the UE may validate the TA before transmitting the uplink transmission via the CG-SDT resources. Once validated, the UE may use the TA for the uplink transmissions.

TA validation may be based on a determination of a difference between two reference signal received power (RSRP) measurements and a comparison of that difference with a threshold. If the difference exceeds (e.g., fails to satisfy) the threshold, meaning that conditions have significantly changed for the UE, the UE may determine that the TA is invalid. In some aspects, restrictions or criteria may be placed on which RSRP measurements may be used to determine whether the TA is valid. Currently, such restrictions or criteria may be time related. That is, the restrictions or criteria may be based on a relative timeline of the RSRP measurements. However, existing restrictions or criteria for RSRP validation may fail to cover cross-bandwidth part (BWP) or component carrier (CC) scenarios, or the use of different reference signals for the RSRP measurements. Moreover, currently, the UE may lack the ability to update the TA validation if the UE is configured with more than one CG-SDT configuration at different times. As such, more clear criteria for the UE to use when validating RSRP measurements for TA validation may be desired. Additionally, RSRP measurement validation to validate the CG resources may also be desired.

The techniques described herein support measurement validation such that TA validation or CG resource validation (and selection) may occur for CG-SDT procedures. A UE may receive an RRC release message that also indicates communication resources for uplink communications, a timing advance command (TAC), measurement resources for a TAC validation procedure, TAC validation information, and measurement validation information. The measurement validation information may include some timing-related criterion and some non-timing-related criterion. Based on the measurement resources, the UE may obtain first and second reference signal measurement information corresponding to a first and second reference signal, respectively. Based on the measurement validation information, the UE may validate the measurement information for use in the TAC validation procedure, which the UE may perform while in an RRC inactive state (e.g., RRC_INACTIVE). In some cases, the UE may validate the TAC for application to transmission of the uplink communication, and transmit the uplink communication resources based on the validated TAC and the communication resources while still in the RRC inactive state.

Additionally, or alternatively, the UE may perform CG resource validation. The UE may receive the RRC release message. In the case of CG resource validation, the RRC release message may indicate communication resources for uplink communication, measurement resources for an uplink communication resources validation procedure, uplink communication resources validation information (used for the corresponding validation procedure), and measurement validation information. The UE may obtain reference signal measurement information based on the measurement resources and then validate the reference signal measurement information based on the measurement validation information. As such, the UE may use the reference signal measurement information as a valid input for the uplink communication resources validation procedure. While in an RRC inactive state, the UE may perform the uplink communication resources validation procedure, which may include validating the communication resources based on the uplink communication resources validation information. While still in the RRC inactive state, the UE may transmit the uplink communication using the validated communication resources.

Aspects of the disclosure are initially described in the context of wireless communications systems. Aspects of the disclosure are then discussed with reference to timelines and process flows. Aspects of the disclosure are further illustrated by and described with reference to apparatus diagrams, system diagrams, and flowcharts that relate to measurement configuration and validation for small data transmission.

FIG. 1 shows an example of a wireless communications system 100 that supports measurement configuration and validation for small data transmission in accordance with one or more aspects of the present disclosure. The wireless communications system 100 may include one or more network entities 105, one or more UEs 115, and a core network 130. In some aspects, the wireless communications system 100 may be a Long Term Evolution (LTE) network, an LTE-Advanced (LTE-A) network, an LTE-A Pro network, a New Radio (NR) network, or a network operating in accordance with other systems and radio technologies, including future systems and radio technologies not explicitly mentioned herein.

The network entities 105 may be dispersed throughout a geographic area to form the wireless communications system 100 and may include devices in different forms or having different capabilities. In various aspects, a network entity 105 may be referred to as a network element, a mobility element, a radio access network (RAN) node, or network equipment, among other nomenclature. In some aspects, network entities 105 and UEs 115 may wirelessly communicate via one or more communication links 125 (e.g., a radio frequency (RF) access link). For example, a network entity 105 may support a coverage area 110 (e.g., a geographic coverage area) over which the UEs 115 and the network entity 105 may establish one or more communication links 125. The coverage area 110 may be an example of a geographic area over which a network entity 105 and a UE 115 may support the communication of signals according to one or more radio access technologies (RATs).

The UEs 115 may be dispersed throughout a coverage area 110 of the wireless communications system 100, and each UE 115 may be stationary, or mobile at different times. The UEs 115 may be devices in different forms or having different capabilities. Some example UEs 115 are illustrated in FIG. 1. The UEs 115 described herein may be capable of supporting communications with various types of devices, such as other UEs 115 or network entities 105, as shown in FIG. 1.

As described herein, a node (which may be referred to as a node, a network node, a network entity, or a wireless node) may include, be, or be included in (e.g., be a component of) a base station (e.g., any base station described herein), a UE (e.g., any UE described herein), a network controller, an apparatus, a device, a computing system, an integrated access and backhauling (IAB) node, a distributed unit (DU), a central unit (CU), a remote/radio unit (RU) (which may also be referred to as a remote radio unit (RRU)), and/or another processing entity configured to perform any of the techniques described herein. For example, a network node may be a UE. As another example, a network node may be a base station or network entity. As another example, a first network node may be configured to communicate with a second network node or a third network node. In one aspect of this example, the first network node may be a UE, the second network node may be a base station, and the third network node may be a UE. In another aspect of this example, the first network node may be a UE, the second network node may be a base station, and the third network node may be a base station. In yet other aspects of this example, the first, second, and third network nodes may be different relative to these examples. Similarly, reference to a UE, base station, apparatus, device, computing system, or the like may include disclosure of the UE, base station, apparatus, device, computing system, or the like being a network node. For example, disclosure that a UE is configured to receive information from a base station also discloses that a first network node is configured to receive information from a second network node. Consistent with this disclosure, once a specific example is broadened in accordance with this disclosure (e.g., a UE is configured to receive information from a base station also discloses that a first network node is configured to receive information from a second network node), the broader example of the narrower example may be interpreted in the reverse, but in a broad open-ended way. In the example above where a UE is configured to receive information from a base station also discloses that a first network node is configured to receive information from a second network node, the first network node may refer to a first UE, a first base station, a first apparatus, a first device, a first computing system, a first set of one or more one or more components, a first processing entity, or the like configured to receive the information; and the second network node may refer to a second UE, a second base station, a second apparatus, a second device, a second computing system, a second set of one or more components, a second processing entity, or the like.

As described herein, communication of information (e.g., any information, signal, or the like) may be described in various aspects using different terminology. Disclosure of one communication term includes disclosure of other communication terms. For example, a first network node may be described as being configured to transmit information to a second network node. In this example and consistent with this disclosure, disclosure that the first network node is configured to transmit information to the second network node includes disclosure that the first network node is configured to provide, send, output, communicate, or transmit information to the second network node. Similarly, in this example and consistent with this disclosure, disclosure that the first network node is configured to transmit information to the second network node includes disclosure that the second network node is configured to receive, obtain, or decode the information that is provided, sent, output, communicated, or transmitted by the first network node.

In some aspects, network entities 105 may communicate with the core network 130, or with one another. For example, network entities 105 may communicate with the core network 130 via one or more backhaul communication links 120 (e.g., in accordance with an S1, N2, N3, or other interface protocol). In some aspects, network entities 105 may communicate with one another via a backhaul communication link 120 (e.g., in accordance with an X2, Xn, or other interface protocol) either directly (e.g., directly between network entities 105) or indirectly (e.g., via a core network 130). In some aspects, network entities 105 may communicate with one another via a midhaul communication link 162 (e.g., in accordance with a midhaul interface protocol) or a fronthaul communication link 168 (e.g., in accordance with a fronthaul interface protocol). The backhaul communication links 120, midhaul communication links 162, or fronthaul communication links 168 may be or include one or more wired links (e.g., an electrical link, an optical fiber link), one or more wireless links (e.g., a radio link, a wireless optical link), among other examples or various combinations thereof. A UE 115 may communicate with the core network 130 via a communication link 155.

One or more of the network entities 105 described herein may include or may be referred to as a base station 140 (e.g., a base transceiver station, a radio base station, an NR base station, an access point, a radio transceiver, a NodeB, an eNodeB (eNB), a next-generation NodeB or a giga-NodeB (either of which may be referred to as a gNB), a 5G NB, a next-generation eNB (ng-eNB), a Home NodeB, a Home eNodeB, or other suitable terminology). In some aspects, a network entity 105 (e.g., a base station 140) may be implemented in an aggregated (e.g., monolithic, standalone) base station architecture, which may be configured to utilize a protocol stack that is physically or logically integrated within a single network entity 105 (e.g., a single RAN node, such as a base station 140).

In some aspects, a network entity 105 may be implemented in a disaggregated architecture (e.g., a disaggregated base station architecture, a disaggregated RAN architecture), which may be configured to utilize a protocol stack that is physically or logically distributed among two or more network entities 105, such as an integrated access backhaul (IAB) network, an open RAN (O-RAN) (e.g., a network configuration sponsored by the O-RAN Alliance), or a virtualized RAN (vRAN) (e.g., a cloud RAN (C-RAN)). For example, a network entity 105 may include one or more of a central unit (CU) 160, a distributed unit (DU) 165, a radio unit (RU) 170, a RAN Intelligent Controller (RIC) 175 (e.g., a Near-Real Time RIC (Near-RT RIC), a Non-Real Time RIC (Non-RT RIC)), or a Service Management and Orchestration (SMO) 180 system. An RU 170 may also be referred to as a radio head, a smart radio head, a remote radio head (RRH), a remote radio unit (RRU), or a transmission reception point (TRP). One or more components of the network entities 105 in a disaggregated RAN architecture may be co-located, or one or more components of the network entities 105 may be located in distributed locations (e.g., separate physical locations). In some aspects, one or more network entities 105 of a disaggregated RAN architecture may be implemented as virtual units (e.g., a virtual CU (VCU), a virtual DU (VDU), a virtual RU (VRU)).

The split of functionality between a CU 160, a DU 165, and an RU 170 is flexible and may support different functionalities depending on which functions (e.g., network layer functions, protocol layer functions, baseband functions, RF functions, and any combinations thereof) are performed at a CU 160, a DU 165, or an RU 170. For example, a functional split of a protocol stack may be employed between a CU 160 and a DU 165 such that the CU 160 may support one or more layers of the protocol stack and the DU 165 may support one or more different layers of the protocol stack. In some aspects, the CU 160 may host upper protocol layer (e.g., layer 3 (L3), layer 2 (L2)) functionality and signaling (e.g., RRC, service data adaption protocol (SDAP), Packet Data Convergence Protocol (PDCP)). The CU 160 may be connected to one or more DUs 165 or RUs 170, and the one or more DUs 165 or RUs 170 may host lower protocol layers, such as layer 1 (L1) (e.g., physical (PHY) layer) or L2 (e.g., radio link control (RLC) layer, medium access control (MAC) layer) functionality and signaling, and may each be at least partially controlled by the CU 160. Additionally, or alternatively, a functional split of the protocol stack may be employed between a DU 165 and an RU 170 such that the DU 165 may support one or more layers of the protocol stack and the RU 170 may support one or more different layers of the protocol stack. The DU 165 may support one or multiple different cells (e.g., via one or more RUs 170). In some cases, a functional split between a CU 160 and a DU 165, or between a DU 165 and an RU 170 may be within a protocol layer (e.g., some functions for a protocol layer may be performed by one of a CU 160, a DU 165, or an RU 170, while other functions of the protocol layer are performed by a different one of the CU 160, the DU 165, or the RU 170). A CU 160 may be functionally split further into CU control plane (CU-CP) and CU user plane (CU-UP) functions. A CU 160 may be connected to one or more DUs 165 via a midhaul communication link 162 (e.g., F1, F1-c, F1-u), and a DU 165 may be connected to one or more RUs 170 via a fronthaul communication link 168 (e.g., open fronthaul (FH) interface). In some aspects, a midhaul communication link 162 or a fronthaul communication link 168 may be implemented in accordance with an interface (e.g., a channel) between layers of a protocol stack supported by respective network entities 105 that are in communication via such communication links.

In wireless communications systems (e.g., wireless communications system 100), infrastructure and spectral resources for radio access may support wireless backhaul link capabilities to supplement wired backhaul connections, providing an IAB network architecture (e.g., to a core network 130). In some cases, in an IAB network, one or more network entities 105 (e.g., IAB nodes 104) may be partially controlled by each other. One or more IAB nodes 104 may be referred to as a donor entity or an IAB donor. One or more DUs 165 or one or more RUs 170 may be partially controlled by one or more CUs 160 associated with a donor network entity 105 (e.g., a donor base station 140). The one or more donor network entities 105 (e.g., IAB donors) may be in communication with one or more additional network entities 105 (e.g., IAB nodes 104) via supported access and backhaul links (e.g., backhaul communication links 120). IAB nodes 104 may include an IAB mobile termination (IAB-MT) controlled (e.g., scheduled) by DUs 165 of a coupled IAB donor. An IAB-MT may include an independent set of antennas for relay of communications with UEs 115, or may share the same antennas (e.g., of an RU 170) of an IAB node 104 used for access via the DU 165 of the IAB node 104 (e.g., referred to as virtual IAB-MT (vIAB-MT)). In some aspects, the IAB nodes 104 may include DUs 165 that support communication links with additional entities (e.g., IAB nodes 104, UEs 115) within the relay chain or configuration of the access network (e.g., downstream). In such cases, one or more components of the disaggregated RAN architecture (e.g., one or more IAB nodes 104 or components of IAB nodes 104) may be configured to operate according to the techniques described herein.

For instance, an access network (AN) or RAN may include communications between access nodes (e.g., an IAB donor), IAB nodes 104, and one or more UEs 115. The IAB donor may facilitate connection between the core network 130 and the AN (e.g., via a wired or wireless connection to the core network 130). That is, an IAB donor may refer to a RAN node with a wired or wireless connection to core network 130. The IAB donor may include a CU 160 and at least one DU 165 (e.g., and RU 170), in which case the CU 160 may communicate with the core network 130 via an interface (e.g., a backhaul link). IAB donor and IAB nodes 104 may communicate via an F1 interface according to a protocol that defines signaling messages (e.g., an F1 AP protocol). Additionally, or alternatively, the CU 160 may communicate with the core network via an interface, which may be an example of a portion of backhaul link, and may communicate with other CUs 160 (e.g., a CU 160 associated with an alternative IAB donor) via an Xn-C interface, which may be an example of a portion of a backhaul link.

An IAB node 104 may refer to a RAN node that provides IAB functionality (e.g., access for UEs 115, wireless self-backhauling capabilities). A DU 165 may act as a distributed scheduling node towards child nodes associated with the IAB node 104, and the IAB-MT may act as a scheduled node towards parent nodes associated with the IAB node 104. That is, an IAB donor may be referred to as a parent node in communication with one or more child nodes (e.g., an IAB donor may relay transmissions for UEs through one or more other IAB nodes 104). Additionally, or alternatively, an IAB node 104 may also be referred to as a parent node or a child node to other IAB nodes 104, depending on the relay chain or configuration of the AN. Therefore, the IAB-MT entity of IAB nodes 104 may provide a Uu interface for a child IAB node 104 to receive signaling from a parent IAB node 104, and the DU interface (e.g., DUs 165) may provide a Uu interface for a parent IAB node 104 to signal to a child IAB node 104 or UE 115.

For example, IAB node 104 may be referred to as a parent node that supports communications for a child IAB node or referred to as a child IAB node associated with an IAB donor. The IAB donor may include a CU 160 with a wired or wireless connection (e.g., a backhaul communication link 120) to the core network 130 and may act as parent node to IAB nodes 104. For example, the DU 165 of IAB donor may relay transmissions to UEs 115 through IAB nodes 104 or may directly signal transmissions to a UE 115. The CU 160 of IAB donor may signal communication link establishment via an F1 interface to IAB nodes 104, and the IAB nodes 104 may schedule transmissions (e.g., transmissions to the UEs 115 relayed from the IAB donor) through the DUs 165. That is, data may be relayed to and from IAB nodes 104 via signaling via an NR Uu interface to MT of the IAB node 104. Communications with IAB node 104 may be scheduled by a DU 165 of IAB donor and communications with IAB node 104 may be scheduled by DU 165 of IAB node 104.

In the case of the techniques described herein applied in the context of a disaggregated RAN architecture, one or more components of the disaggregated RAN architecture may be configured to support measurement configuration and validation for small data transmission as described herein. For example, some operations described as being performed by a UE 115 or a network entity 105 (e.g., a base station 140) may additionally, or alternatively, be performed by one or more components of the disaggregated RAN architecture (e.g., IAB nodes 104, DUs 165, CUs 160, RUs 170, RIC 175, SMO 180).

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some aspects, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the network entities 105 and the network equipment including macro eNBs or gNBs, small cell eNBs or gNBs, or relay base stations, among other examples, as shown in FIG. 1.

The UEs 115 and the network entities 105 may wirelessly communicate with one another via one or more communication links 125 (e.g., an access link) using resources associated with one or more carriers. The term "carrier" may refer to a set of RF spectrum resources having a defined physical layer structure for supporting the communication links 125. For example, a carrier used for a communication link 125 may include a portion of a RF spectrum band (e.g., a BWP) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink CCs and one or more uplink CCs according to a carrier aggregation configuration. Carrier aggregation may be used with both frequency division duplexing (FDD) and time division duplexing (TDD) CCs. Communication between a network entity 105 and other devices may refer to communication between the devices and any portion (e.g., entity, sub-entity) of a network entity 105. For example, the terms "transmitting," "receiving," or "communicating," when referring to a network entity 105, may refer to any portion of a network entity 105 (e.g., a base station 140, a CU 160, a DU 165, a RU 170) of a RAN communicating with another device (e.g., directly or via one or more other network entities 105).

In some aspects, such as in a carrier aggregation configuration, a carrier may also have acquisition signaling or control signaling that coordinates operations for other carriers. A carrier may be associated with a frequency channel (e.g., an evolved universal mobile telecommunication system terrestrial radio access (E-UTRA) absolute RF channel number (EARFCN)) and may be identified according to a channel raster for discovery by the UEs 115. A carrier may be operated in a standalone mode, in which case initial acquisition and connection may be conducted by the UEs 115 via the carrier, or the carrier may be operated in a non-standalone mode, in which case a connection is anchored using a different carrier (e.g., of the same or a different radio access technology).

The communication links 125 shown in the wireless communications system 100 may include downlink transmissions (e.g., forward link transmissions) from a network entity 105 to a UE 115 or uplink transmissions (e.g., return link transmissions) from a UE 115 to a network entity 105, among other configurations of transmissions. Carriers may carry downlink or uplink communications (e.g., in an FDD mode) or may be configured to carry downlink and uplink communications (e.g., in a TDD mode).

A carrier may be associated with a particular bandwidth of the RF spectrum and, in some aspects, the carrier bandwidth may be referred to as a "system bandwidth" of the carrier or the wireless communications system 100. For example, the carrier bandwidth may be one of a set of bandwidths for carriers of a particular radio access technology (e.g., 1.4, 3, 5, 10, 15, 20, 40, or 80 megahertz (MHz)). Devices of the wireless communications system 100 (e.g., the network entities 105 or the UEs 115) may have hardware configurations that support communications using a particular carrier bandwidth or may be configurable to support communications using one of a set of carrier bandwidths. In some aspects, the wireless communications system 100 may include network entities 105 or UEs 115 that support concurrent communications using carriers associated with multiple carrier bandwidths. In some aspects, each served UE 115 may be configured for operating using portions (e.g., a sub-band, a BWP) or all of a carrier bandwidth.

Signal waveforms transmitted via a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may refer to resources of one symbol period (e.g., a duration of one modulation symbol) and one subcarrier, in which case the symbol period and subcarrier spacing may be inversely related. The quantity of bits carried by each resource element may depend on the modulation scheme (e.g., the order of the modulation scheme or the coding rate of the modulation scheme), such that a relatively higher quantity of resource elements (e.g., in a transmission duration) and a relatively higher order of a modulation scheme may correspond to a relatively higher rate of communication. A wireless communications resource may refer to a combination of an RF spectrum resource, a time resource, and a spatial resource (e.g., a spatial layer, a beam), and the use of multiple spatial resources may increase the data rate or data integrity for communications with a UE 115.

One or more numerologies for a carrier may be supported, and a numerology may include a subcarrier spacing ($\Delta f$) and a cyclic prefix. A carrier may be divided into one or more BWPs having the same or different numerologies. In some aspects, a UE 115 may be configured with multiple BWPs. In some aspects, a single BWP for a carrier may be active at a given time and communications for the UE 115 may be restricted to one or more active BWPs.

The time intervals for the network entities 105 or the UEs 115 may be expressed in multiples of a basic time unit which may, for example, refer to a sampling period of $T_s=1/(\Delta f_{max} \cdot N_f)$ seconds, for which $\Delta f_{max}$ may represent a supported subcarrier spacing, and $N_f$ may represent a supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively-numbered subframes or slots, and each subframe or slot may have the same duration. In some aspects, a frame may be divided (e.g., in the time domain) into subframes, and each subframe may be further divided into a quantity of slots. Alternatively, each frame may include a variable quantity of slots, and the quantity of slots may depend on subcarrier spacing. Each slot may include a quantity of symbol periods (e.g., depending on the length of the cyclic prefix prepended to each symbol period). In some wireless communications systems 100, a slot may further be divided into multiple mini-slots associated with one or more symbols. Excluding the cyclic prefix, each symbol period may be associated with one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some aspects, the TTI duration (e.g., a quantity of symbol periods in a TTI) may be variable. Additionally, or alternatively, the smallest scheduling unit of the wireless communications system 100 may be dynamically selected (e.g., in bursts of shortened TTIs (sTTIs)).

Physical channels may be multiplexed for communication using a carrier according to various techniques. A physical control channel and a physical data channel may be multiplexed for signaling via a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a set of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to an amount of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

A network entity 105 may provide communication coverage via one or more cells, for example a macro cell, a small cell, a hot spot, or other types of cells. The term "cell" may refer to a logical communication entity used for communication with a network entity 105 (e.g., using a carrier) and may be associated with an identifier for distinguishing neighboring cells (e.g., a physical cell identifier (PCID), a virtual cell identifier (VCID), or others). In some aspects, a cell also may refer to a coverage area 110 or a portion of a coverage area 110 (e.g., a sector) over which the logical communication entity operates. Such cells may range from smaller areas (e.g., a structure, a subset of structure) to larger areas depending on various factors such as the capabilities of the network entity 105. For example, a cell may be or include a building, a subset of a building, or exterior spaces between or overlapping with coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered network entity 105 (e.g., a lower-powered base station 140), as compared with a macro cell, and a small cell may operate using the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A network entity 105 may support one or multiple cells and may also support communications via the one or more cells using one or multiple CCs.

In some aspects, a carrier may support multiple cells, and different cells may be configured according to different protocol types (e.g., MTC, narrowband IoT (NB-IoT), enhanced mobile broadband (eMBB)) that may provide access for different types of devices.

In some aspects, a network entity 105 (e.g., a base station 140, an RU 170) may be movable and therefore provide communication coverage for a moving coverage area 110. In some aspects, different coverage areas 110 associated with different technologies may overlap, but the different coverage areas 110 may be supported by the same network entity 105. In some other aspects, the overlapping coverage areas 110 associated with different technologies may be supported by different network entities 105. The wireless communications system 100 may include, for example, a heterogeneous network in which different types of the network entities 105 provide coverage for various coverage areas 110 using the same or different radio access technologies.

The wireless communications system 100 may support synchronous or asynchronous operation. For synchronous operation, network entities 105 (e.g., base stations 140) may have similar frame timings, and transmissions from different network entities 105 may be approximately aligned in time. For asynchronous operation, network entities 105 may have different frame timings, and transmissions from different network entities 105 may, in some aspects, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a network entity 105 (e.g., a base station 140) without human intervention. In some aspects, M2M communication or MTC may include communications from devices that integrate sensors or meters to measure or capture information and relay such information to a central server or application program that uses the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception concurrently). In some aspects, half-duplex communications may be performed at a reduced peak rate. Other power conservation techniques for the UEs 115 include entering a power saving deep sleep mode when not engaging in active communications, operating using a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some aspects, a UE 115 may be configured to support communicating directly with other UEs 115 via a device-to-device (D2D) communication link 135 (e.g., in accordance with a peer-to-peer (P2P), D2D, or sidelink protocol). In some aspects, one or more UEs 115 of a group that are performing D2D communications may be within the coverage area 110 of a network entity 105 (e.g., a base station 140, an RU 170), which may support aspects of such D2D communications being configured by (e.g., scheduled by) the network entity 105. In some aspects, one or more UEs 115 of such a group may be outside the coverage area 110 of a network entity 105 or may be otherwise unable to or not configured to receive transmissions from a network entity 105. In some aspects, groups of the UEs 115 communicating via D2D communications may support a one-to-many (1:M) system in which each UE 115 transmits to each of the other UEs 115 in the group. In some aspects, a network entity 105 may facilitate the scheduling of resources for D2D communications. In some other aspects, D2D communications may be carried out between the UEs 115 without an involvement of a network entity 105.

In some systems, a D2D communication link 135 may be an example of a communication channel, such as a sidelink communication channel, between vehicles (e.g., UEs 115). In some aspects, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some aspects, vehicles in a V2X system may communicate with roadside infrastructure, such as roadside units, or with the network via one or more network nodes (e.g., network entities 105, base stations 140, RUs 170) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 (e.g., base stations 140) associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

The wireless communications system 100 may operate using one or more frequency bands, which may be in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. UHF waves may be blocked or redirected by buildings and environmental features, which may be referred to as clusters, but the waves may penetrate structures sufficiently for a macro cell to provide service to the UEs 115 located indoors. Communications using UHF waves may be associated with smaller antennas and shorter ranges (e.g., less than 100 kilometers) compared to communications using the smaller frequencies and longer waves of the high frequency (HF) or very high frequency (VHF) portion of the spectrum below 300 MHz.

The wireless communications system 100 may also operate using a super high frequency (SHF) region, which may be in the range of 3 GHz to 30 GHz, also known as the centimeter band, or using an extremely high frequency (EHF) region of the spectrum (e.g., from 30 GHz to 300 GHz), also known as the millimeter band. In some aspects, the wireless communications system 100 may support millimeter wave (mmW) communications between the UEs 115 and the network entities 105 (e.g., base stations 140, RUs 170), and EHF antennas of the respective devices may be smaller and more closely spaced than UHF antennas. In some aspects, such techniques may facilitate using antenna arrays within a device. The propagation of EHF transmissions, however, may be subject to even greater attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed RF spectrum bands. For example, the wireless communications system 100 may employ License Assisted Access (LAA), LTE-Unlicensed (LTE-U) radio access technology, or NR technology using an unlicensed band such as the 5 GHz industrial, scientific, and medical (ISM) band. While operating using unlicensed RF spectrum bands, devices such as the network entities 105 and the UEs 115 may employ carrier sensing for collision detection and avoidance. In some aspects, operations using unlicensed bands may be based on a carrier aggregation configuration in conjunction with CCs operating using a licensed band (e.g., LAA). Operations using unlicensed spectrum may include downlink transmissions, uplink transmissions, P2P transmissions, or D2D transmissions, among other examples.

A network entity 105 (e.g., a base station 140, an RU 170) or a UE 115 may be equipped with multiple antennas, which may be used to employ techniques such as transmit diversity, receive diversity, multiple-input multiple-output (MIMO) communications, or beamforming. The antennas of a network entity 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some aspects, antennas or antenna arrays associated with a network entity 105 may be located at diverse geographic locations. A network entity 105 may include an antenna array with a set of rows and columns of antenna ports that the network entity 105 may use to support beamforming of communications with a UE 115. Likewise, a UE 115 may include one or more antenna arrays that may support various MIMO or beamforming operations. Additionally, or alternatively, an antenna panel may support RF beamforming for a signal transmitted via an antenna port.

The network entities 105 or the UEs 115 may use MIMO communications to exploit multipath signal propagation and increase spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry information associated with the same data stream (e.g., the same codeword) or different data streams (e.g., different codewords). Different spatial layers may be associated with different antenna ports used for channel measurement and reporting. MIMO techniques include single-user MIMO (SU-MIMO), for which multiple spatial layers are transmitted to the same receiving device, and multiple-user MIMO (MU-MIMO), for which multiple spatial layers are transmitted to multiple devices.

Beamforming, which may also be referred to as spatial filtering, directional transmission, or directional reception, is a signal processing technique that may be used at a transmitting device or a receiving device (e.g., a network entity 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating along particular orientations with respect to an antenna array experience constructive interference while others experience destructive interference. The adjustment of signals communicated via the antenna elements may include a transmitting device or a receiving device applying amplitude offsets or phase offsets to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A network entity 105 or a UE 115 may use beam sweeping techniques as part of beamforming operations. For example, a network entity 105 (e.g., a base station 140, an RU 170) may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a network entity 105 multiple times along different directions. For example, the network entity 105 may transmit a signal according to different beamforming weight sets associated with different directions of transmission. Transmissions along different beam directions may be used to identify (e.g., by a transmitting device, such as a network entity 105, or by a receiving device, such as a UE 115) a beam direction for later transmission or reception by the network entity 105.

Some signals, such as data signals associated with a particular receiving device, may be transmitted by transmitting device (e.g., a transmitting network entity 105, a transmitting UE 115) along a single beam direction (e.g., a direction associated with the receiving device, such as a receiving network entity 105 or a receiving UE 115). In some aspects, the beam direction associated with transmissions along a single beam direction may be determined based on a signal that was transmitted along one or more beam directions. For example, a UE 115 may receive one or more of the signals transmitted by the network entity 105 along different directions and may report to the network entity 105 an indication of the signal that the UE 115 received with a highest signal quality or an otherwise acceptable signal quality.

In some aspects, transmissions by a device (e.g., by a network entity 105 or a UE 115) may be performed using multiple beam directions, and the device may use a combination of digital precoding or beamforming to generate a combined beam for transmission (e.g., from a network entity 105 to a UE 115). The UE 115 may report feedback that indicates precoding weights for one or more beam directions, and the feedback may correspond to a configured set of beams across a system bandwidth or one or more subbands. The network entity 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted along one or more directions by a network entity 105 (e.g., a base station 140, an RU 170), a UE 115 may employ similar techniques for transmitting signals multiple times along different directions (e.g., for identifying a beam direction for subsequent transmission or reception by the UE 115) or for transmitting a signal along a single direction (e.g., for transmitting data to a receiving device).

A receiving device (e.g., a UE 115) may perform reception operations in accordance with multiple receive configurations (e.g., directional listening) when receiving various signals from a receiving device (e.g., a network entity 105), such as synchronization signals, reference signals, beam selection signals, or other control signals. For example, a receiving device may perform reception in accordance with multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some aspects, a receiving device may use a single receive configuration to receive along a single beam direction (e.g., when receiving a data signal). The single receive configuration may be aligned along a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or PDCP layer may be IP-based. An RLC layer may perform packet segmentation and reassembly to communicate via logical channels. A MAC layer may perform priority handling and multiplexing of logical channels into transport channels. The MAC layer also may implement error detection techniques or error correction techniques to support retransmissions to improve link efficiency. In the control plane, an RRC layer may provide establishment, configuration, and maintenance of an RRC connection between a UE 115 and a network entity 105 or a core network 130 supporting radio bearers for user plane data. A PHY layer may map transport channels to physical channels.

The UEs 115 and the network entities 105 may support retransmissions of data to increase the likelihood that data is received successfully. Hybrid automatic repeat request (HARQ) feedback is one technique for increasing the likelihood that data is received correctly via a communication link (e.g., a communication link 125, a D2D communication link 135). HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some aspects, a device may support same-slot HARQ feedback, in which case the device may provide HARQ feedback in a specific slot for data received via a previous symbol in the slot. In some other aspects, the device may provide HARQ feedback in a subsequent slot, or according to some other time interval.

The wireless communications system 100 may support CG-SDT transmissions, where a configuration of a CG resource for an uplink SDT by a UE 115 may be included in an RRC release (e.g., RRCRelease) message. A network entity 105 may transmit a CG resource configuration in the RRC release message to the UE 115. In some aspects, the RRC release message may also include a suspend configuration (e.g., SuspendConfig). In addition, the RRC release message may be used to reconfigure or release CG-SDT resources while the UE 115 is in an inactive state or mode (e.g., RRC_INACTIVE). As such, the CG resource configuration may enable the UE 115 to transmit uplink data while in an RRC inactive state. In some aspects, the CG resource configuration may include one Type 1 CG configuration. Alternatively, the CG resource configuration may support multiple CG-SDT configurations per carrier while the UE 115 is in the RRC inactive state.

The UE 115 may enter the RRC inactive state and if the UE 115 has data to transmit, the UE 115 may then transmit a first uplink message to the network entity 105 assuming a valid TA is configured. The first uplink message may be a CG transmission including a request to resume an RRC connection (e.g., RRCResumeReq) or uplink data. In such cases, the UE 115 may remain in an RRC inactive state. In some cases, the network entity 105 may transmit a network response to the UE 115 after receiving the first uplink message. The network response may include feedback (e.g., ACK) or a retransmission, however, may lack an RRC message. The UE 115 may perform subsequent data transmissions based on the network response. For example, the UE 115 may transmit additional uplink data and may receive downlink data from the network entity 105 in response to the uplink data. For CG-SDT, the subsequent data transmission may use the CG resource for new data transmissions or a dynamic grant (DG) for retransmission.

In some aspects, the network entity 105 may transmit a second RRC release message with SuspendConfig during the course of the CG-SDT process. The second RRC release message may update the CG resource configuration previously transmitted by the network entity. As such, during the course of the subsequent data transmissions during which the UE 115 may transmit one or more sets of additional uplink data using the CG resource configuration, the UE 115 may receive the second RRC release message, which may provide a second CG resource configuration (e.g., a second CG-SDT configuration). The second CG resource configuration may differ from the original CG resource configuration. For example, the second CG resource configuration may include a different modulation and coding scheme (MCS) resource allocation than the original CG resource configuration.

Additionally, or alternatively, the wireless communications system 100 may support 2-step or 4-step RACH-based SDT procedures, which may be applied to random access (RA)-SDT while the UE 115 is in an RRC inactive (e.g., RRC_INACTIVE) state. In such cases, the UE 115 may re-establish at least an SDT PDCP and resume use of SDT resource blocks configured for small data. During subsequent data transmission (after successful contention resolution), the UE 115 may monitor a DG by C-RNTI in a separate common search space (CSS), if configured, in RA-SDT. In addition, the network entity 105 may transmit an RRC release message at the end of the RA-SDT procedure to terminate the SDT procedure (in terms of RRC connection with the UE 115).

The UE 115 may perform TA validation for CG-SDT based on collecting at least two RSRP samples or measurements, including a first RSRP measurement $RSRP_1$ and a second RSRP measurement $RSRP_2$, and comparing a difference between the RSRP measurements and a preconfigured threshold (e.g., cg-SDT-RSRP-ChangeThreshold). When the threshold is configured for TA validation, the UE 115 may transmit using CG-SDT using a latest available TA (e.g., previous TA) provided that the first and the second RSRP measurements are valid and that criteria for TA validation is satisfied. For example, if a time variation of $RSRP_1$ with respect to $RSRP_2$ is within the threshold (e.g., satisfies the threshold), then the UE 115 may assume that a previous TA is valid and continue transmitting uplink data via the previously configured CG resources and based on the previous TA. Alternatively, if the time variation exceeds the threshold (e.g., fails to satisfy the threshold), then the UE 115 may assume that the previous TA is no longer valid and therefore suspend the CG-SDT procedure and in some cases, initiate a random access procedure to obtain a new TA.

In some aspects, the UE 115 may calculate $RSRP_1$ and $RSRP_2$ for different frequency ranges (FRs). For example, for an FR1, the $RSRP_1$ measurement may be given as $(T1-\min(640\text{ ms}, M1*T_{DRX}))\leq T1\leq(T1+\min(640\text{ ms}, M1*T_{DRX}))$, and the $RSRP_2$ measurement may be given as $(T2-\min(640\text{ ms}, M1*T_{DRX}))\leq T2'\leq T2$. Alternatively, for FR2, the $RSRP_1$ measurement may be based on an SSB-based RRM measurement timing configuration (SMTC) periodicity given as $(T1-\min(480\text{ ms}, \mathbf{8}*\text{SMTC periodicity}))\leq T1'\leq(T1+\max(480\text{ ms}, 8*\text{SMTC periodicity}))$, and the $RSRP_2$ measurement may be given as $(T2-\max(480\text{ ms}, 8*\text{SMTC periodicity}))\leq T2'\leq T2$. In such examples, T1 may represent a time when the UE 115 receives an RRC release message that includes the CG-SDT configuration, or a time when the UE 115 receives a latest (most recent) TA while in the RRC inactive state. T1' may represent a time when the UE 115 has completed the measurement of $RSRP_1$, T2 may represent a time when the UE 115 performs TA validation for an uplink transmission using CG-SDT, T2' may represent a time when the UE 115 has completed the measurement of $RSRP_2$, and $T_{DRX}$ may represent a discontinuous reception (DRX) cycle length in milliseconds.

In addition to TA validation for an initial CG-physical uplink shared channel (PUSCH) transmission, the UE 115 may perform an RSRP measurement for initial and subsequent new transmissions of CG-SDT based on a different threshold (e.g., cg-SDT-RSRP-ThresholdSSB) to confirm whether a configured uplink grant is valid. In such cases, the UE 115 may use a specified mapping between a CG-PUSCH configuration period and a synchronization signal block (SSB).

However, existing criteria for such RSRP validation may lack clarity for CD-SDT procedures. For example, the criteria may fail to apply to cross-BWP or cross-CC scenarios for TA validation. That is, when the UE 115 receives or performs the $RSRP_1$ measurement, the UE 115 may be in an RRC connected state (e.g., RRC_CONNECTED) using a first carrier frequency or a first BWP. When the UE 115 receives the RRC release message and enters the RRC inactive state, then the UE 115 may receive or perform the $RSRP_2$ measurement in another carrier frequency or in another BWP. Such factors are lacking in existing RSRP validation criteria.

Additionally, or alternatively, the criteria may fail to clarify validation of RSRP measurements for different reference signals or RSRP validation for CG resource validation or selection. In some aspects using current RSRP validation techniques, a configuration period for CG-PUSCH (PUSCH resources used for uplink CG-SDT) may be less than or equal to a periodicity of an SSB, such that the UE 115 (which may be a reduced capability (RedCap) or a non-RedCap UE) may be unable to obtain new samples for RSRP measurements before some pre-configured CG-PUSCH occasions. That is, although the UE 115 may be required to perform CG resource validation or selection before each CG-PUSCH occasion, the configuration period for the CG-PUSCH being less than or equal to the periodicity of the SSB may prevent the UE 115 from updating its RSRP measurements.

In some aspects using current RSRP validation techniques, the UE 115 (e.g., RedCap or non-RedCap) may be configured with more than one CG-SDT configuration at different times. For example, the UE 115 may receive a first CG resource configuration via a first RRC release message while in an RRC connected state. After the UE 115 enters an RRC inactive state and performs uplink data transmissions more or less frequently over time. However, the network entity 105 may fail to update the CG-SDT configuration to account for the changing uplink data transmissions, which may limit the validation of a previous TA. That is, although the uplink timing alignment after an initial CG-PUSCH transmission may be maintained by a TA command (TAC) MAC-CE and a timer (e.g., cg-SDT-TimeAlignmentTimer), a UE 115 may still obtain valid samples of downlink reference signals (e.g., SSBs or other downlink reference signals) at least to perform CG resource validation and selection, power control, and in some cases, to revalidate a TAC. If a non-cell defining (NCD)-SSB or downlink reference signal different from a cell-defining (CD)-SSB is configured for CG-SDT, the UE 115 may require clarification regarding which RSRP measurements to use for TA validation and CG resource validation. As such, the UE may achieve power savings and overhead reduction by using a unified set of criteria to select valid samples of RSRP measurement for TA validation and CG resource validation.

Figure 2:
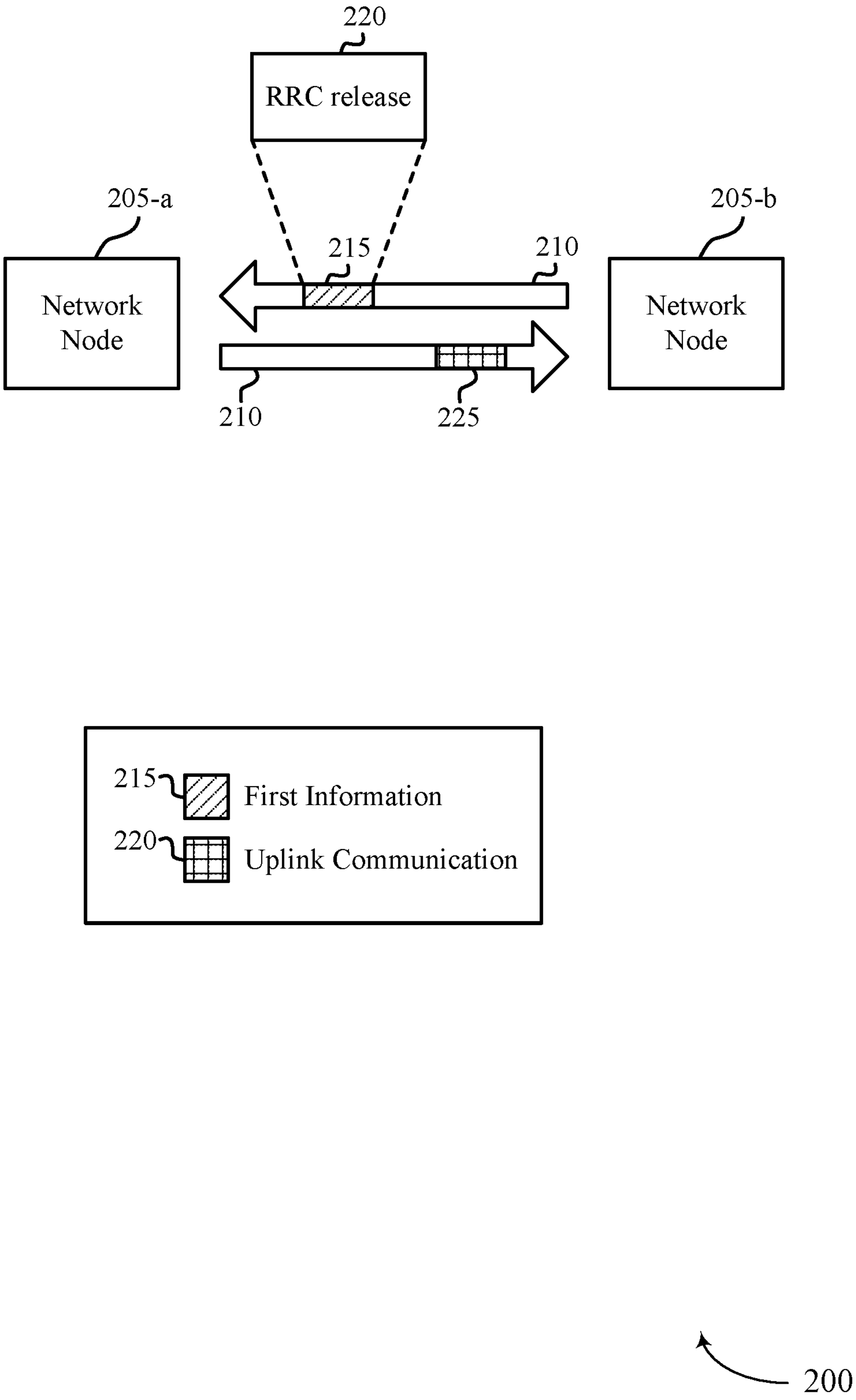
FIG. 2 illustrates an example of a wireless communications system that supports measurement configuration and validation for small data transmission in accordance with one or more aspects of the present disclosure.

FIG. 2 illustrates an example of a wireless communications system 200 that supports measurement configuration and validation for small data transmission in accordance with one or more aspects of the present disclosure. In some aspects, the wireless communications system 200 may implement aspects of the wireless communications system 100 or may be implemented by aspects of the wireless communications system 100. For example, the wireless communications system 200 may include a network entity 205-*a* (e.g., a network node) and a network entity 205-*b* (e.g., a network node), which may be examples of a UE 115 and a network entity 105 described herein, respectively. The network entity 205-*a* and the network entity 205-*b* may support CG-SDT procedures to increase power savings and reduce overhead.

The wireless communications system 200 may support communications between the network entity 205-*a* and the network entity 205-*b* via respective communication links 210, which may be examples of communication links 125 described herein with reference to FIG. 1. For example, the network entity 205-*a* and the network entity 205-*b* may perform uplink and downlink communications via the communication links 210. In some aspects, the network entity 205-*a* and the network entity 205-*b* may communicate while in an RRC connected state (e.g., RRC_CONNECTED) or an RRC inactive state (e.g., RRC_INACTIVE).

In some aspects, the network entity 205-*a* and the network entity 205-*b* may support TA validation and CG resource validation for CG-SDT procedures. The network entity 205-*a* may receive first information 215, which may be associated with an RRC release 220 (e.g., a connection-active state release). The RRC release 220 may release the network entities 205 from an RRC connected mode such that the network entity 205-*a* may enter an inactive state (e.g., a connection-inactive state). In addition, the first information 215 may indicate communication resources for an uplink communication 225 in the inactive state, a TAC, measurement resources for a TAC validation procedure, TAC validation information, and measurement validation information. The communication resources may include CG resources the network entity 205-*a* may use while it is in the inactive state to perform uplink communications, and the TAC may be associated with a TA for the uplink communication 225. In addition, the measurement resources may include reference signal measurements that may be used to validate the TAC, and the TAC validation information may include information the network entity 205-*a* may use to validate the TAC for the uplink communication 225. In addition, the measurement validation information may include one or more timing-related criterion and one or more non-timing-related criterion for validating measurement information.

Based on the measurement resources, the network entity 205-*a* may obtain the measurement information. The measurement information may include first reference signal measurement information corresponding to a first reference signal (e.g., a downlink reference signal, SSB) and second reference signal measurement information corresponding to a second reference signal. For example, the first and second reference signal measurement information may include RSRP measurements corresponding to each reference signal.

The network entity 205-*a* may validate the measurement information based on the measurement validation information such that the measurement information may be used as valid input information for the TAC validation procedure. That is, the network entity 205-*a* may validate one or more RSRP measurements such that they may be used to validate the TAC.

While in the inactive state, and based on the validation of the measurement information, the network entity 205-*a* may perform the TAC validation procedure to validate the TAC for application to transmission of the uplink communication 225 using the communication resources indicated in the first information 215. In this way, the network entity 205-*a* may transmit the uplink communication 225 to the network entity 205-*b* using the communication resources and based on the validated TAC.

Additionally, or alternatively, the network entity 205-*a* may perform CG resource validation or selection based on valid RSRP measurements. In such cases, the first information 215 may indicate communication resources for the uplink communication 225, measurement resources for an uplink communication resources validation procedure, uplink communication resources validation information, and measurement validation information. The communication resources may include CG resources which the network entity 205-*a* may use while in the inactive state. The measurement resources may include resources on which the network entity 205-*a* may base reference signal measurement information validation. The uplink communication resources validation information may include information that the network entity 205-*a* may use to validate the uplink communication resources, and the measurement validation information may include some criteria by which the network entity 205-*a* may validate the reference signal measurement information.

Based on the measurement resources, the network entity 205-*a* may obtain reference signal measurement information, which may include RSRP measurements corresponding to reference signals (e.g., downlink reference signals, SSBs). In addition, based on the measurement validation information, the network entity 205-*a* may validate the reference signal measurement information as valid information that may be input into the uplink communication resources validation procedure. The network entity 205-*a* may enter the RRC inactive state and based on validating the measurement information, may perform the uplink communication resources validation procedure, which may include validating the communication resources based on the uplink communication resources validation information. Accordingly, the network entity 205-*a* may transmit the uplink communication 225 using the validated communication resources. In this way, the network entity 205-*a* may increase power savings and reduce overhead for CG-SDT procedures.

Figure 3:
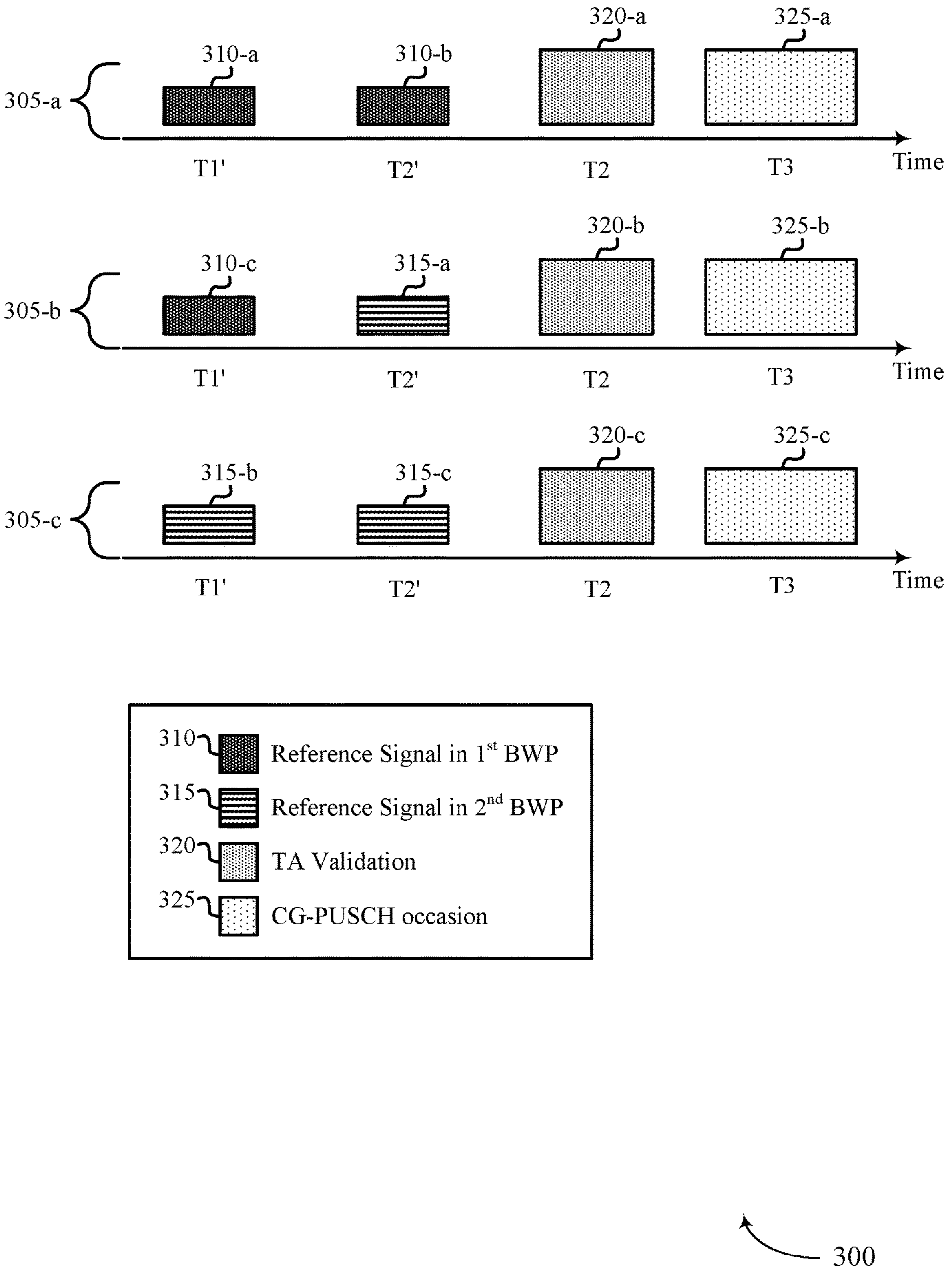
FIG. 3 illustrates an example of a timeline that supports measurement configuration and validation for small data transmission in accordance with one or more aspects of the present disclosure.

FIG. 3 illustrates an example of a timeline 300 that supports measurement configuration and validation for small data transmission in accordance with one or more aspects of the present disclosure. In some aspects, the timeline 300 may implement aspects of the wireless communications systems 100 and 200 or may be implemented by aspects of the wireless communications systems 100 and 200. For example, a UE 115 (e.g., a network entity) may use a case 305 of the timeline 300 to validate RSRP samples for TA validation to improve CG-SDT procedures.

In some aspects, a UE 115 (e.g., a first network entity) may be in an RRC connected state (e.g., RRC_CONNECTED) with a network entity 105 (e.g., a second network entity). The UE 115 may receive a CG-SDT configuration from the network entity 105 in a first BWP (e.g., BWP A). In addition, the UE 115 may be configured with a second BWP (e.g., BWP B) on the downlink or uplink to initiate the SDT procedure, where downlink reference signals may be transmitted in the first and second BWPs.

Before an initial CG-PUSCH transmission and one or more autonomous retransmissions on one or more preconfigured PUSCH occasions, the UE 115 may perform TA validation while in an RRC inactive state (e.g., RRC_INACTIVE) using valid RSRP measurements corresponding to the downlink reference signals. In some aspects, the downlink reference signals that are a basis for the RSRP measurements may also be configured as pathloss reference signals for uplink CG-SDT.

The timeline 300 may indicate times at which the UE 115 may receive and measure reference signals in different BWPs, perform TA validation 320, and transmit uplink communications via CG-PUSCH occasions 325. Before transmitting on a CG-PUSCH occasion 325 at a time T3, the UE 115 may collect at least two valid RSRP measurements or samples (e.g., $RSRP_1$ and $RSRP_2$ at times T1' and T2', respectively). For example, in a case 305-*a*, the UE 115 may receive and measure a first instance of a reference signal 310-*a* within a first BWP that was used by the UE 115 while in the RRC connected state at a time T1'. In addition, the UE 115 may receive and measure a second instance of a reference signal 310-*b* within the first BWP at a time T2'. The UE 115 may perform TA validation 320-*a* (e.g., based on validating RSRP measurements corresponding to the reference signal 310-*a* and the reference signal 310-*b*) at a time T2 and transmit uplink communications on a CG-PUSCH occasion 325-*a* at a time T3.

In a case 305-*b*, the UE 115 may receive and measure a first instance of a reference signal 310-*c* within a first BWP that was used by the UE 115 while in the RRC connected state at a time T1'. In addition, the UE 115 may receive and measure a first instance of a reference signal 315-*a* within a second BWP that was used by the UE 115 while in the inactive state at a time T2'. The UE 115 may perform TA validation 320-*b* (e.g., based on validating RSRP measurements corresponding to the reference signal 310-*c* and the reference signal 315-*a*) at a time T2 and transmit on a CG-PUSCH occasion 325-*b* at a time T3. Alternatively, in a case 305-*c*, the UE 115 may receive and measure a first instance of a reference signal 315-*b* within the second BWP while in the RRC connected state at a time T1'. In addition, the UE 115 may receive and measure a second instance of a reference signal 315-*c* within the second BWP at a time T2'. The UE 115 may perform TA validation 320-*c* (e.g., based on validating RSRP measurements corresponding to the reference signal 315-*b* and the reference signal 315-*c*) at a time T2 and transmit on a CG-PUSCH occasion 325-*c* at a time T3.

In some aspects, the UE 115 may validate the RSRP measurements (based on the reference signals 310 and the reference signals 315) for TA validation 320 of CG-SDT at a time T2 based on some timing-related criterion and non-timing-related criterion. For example, the non-timing-related criterion may indicate that the UE 115 may perform the RSRP measurements (e.g., $RSRP_1$ and $RSRP_2$) on a same frequency range. Additionally, the timing-related criterion may indicate a relationship between the times T1', T2', T2, and T3. For example, the time T1' may represent a first time at which the UE 115 may obtain first reference signal measurement information (corresponding to a reference signal 310 or a reference signal 315), the time T2' may represent a second time at which the UE 115 may obtain first reference signal measurement information, T2 may represent a TAC validation time at which the UE 115 may perform TA validation 320, and T3 may represent a transmission time for transmission of an uplink communication. As such, the timing-related criterion may indicate that $T1'<T2'\leq T2<T3$ (e.g., T1 may occur prior to T2', which may occur prior to or at a same time as T2, which may occur prior to T3). The timing-related criterion may also indicate $T2-\Delta2\leq T2'\leq T2$, $T3-T2\leq\Delta0$, and $T1-\Delta1\leq T1'\leq T1+\Delta1$.

In such timing-related criterion, $\Delta0\geq0$ and may be a constant or a configurable parameter (e.g., by system information (SI) or RRC signaling) that may represent a delta time threshold. In addition, T1 may represent a latest time at which the UE 115 may receive a TAC of a primary timing advance group (TAG), or a latest time at which the UE 115 may receive an RRC release message with SuspendConfig before or during an SDT. In addition, $\Delta1\geq0$ may be a constant or a configurable parameter (e.g., by SI or RRC signaling) and may be based on a frequency range of an SDT operation, a DRX cycle length, an SMTC periodicity, a downlink reference signal type (e.g., SSB or CSI-RS), a quantity and configuration of receive antennas used for RSRP measurement at T1', and a measurement window configuration for a set of reference resources associated with the TA validation 320. In addition, $\Delta2\geq0$ may be a constant or a configurable parameter (e.g., by SI or RRC signaling) and may be based on a frequency range of an SDT operation, a DRX cycle length, an SMTC periodicity, a downlink reference signal type (e.g., SSB or tracking reference signal (TRS)), a quantity and configuration of receive antennas used for RSRP measurement at T2', and a measurement window configuration for a set of reference resources associated with the TA validation 320.

As described herein, the UE 115 may obtain $RSRP_1$ and $RSRP_2$ on a same frequency range by measuring the same downlink reference signal (case 305-*a* and case 305-*c*) or different downlink reference signals (case 305-*b*). In some aspects, to perform the TA validation 320, the UE 115 may compare a difference between $RSRP_1$ and $RSRP_2$ with a threshold difference (e.g., cg-SDT-RSRP-ChangeThreshold). In addition, reference resources and corresponding configurations of downlink reference signals (reference signals 310 and reference signals 315) that are the basis for $RSRP_1$ and $RSRP_2$ may be signaled to the UE 115 via RRC signaling or SI. If $RSRP_1$ and $RSRP_2$ are associated with different configurations of reference signals, different carrier frequencies, different configurations of receive antennas, or different transmit powers of the reference signals, the UE 115 may apply an offset or a scaling factor to the $RSRP_1$, the $RSRP_2$, or the threshold difference for the TA validation 320. In some aspects, a network entity 105 may indicate the offset or the scaling factor to the UE 115.

Figure 4:
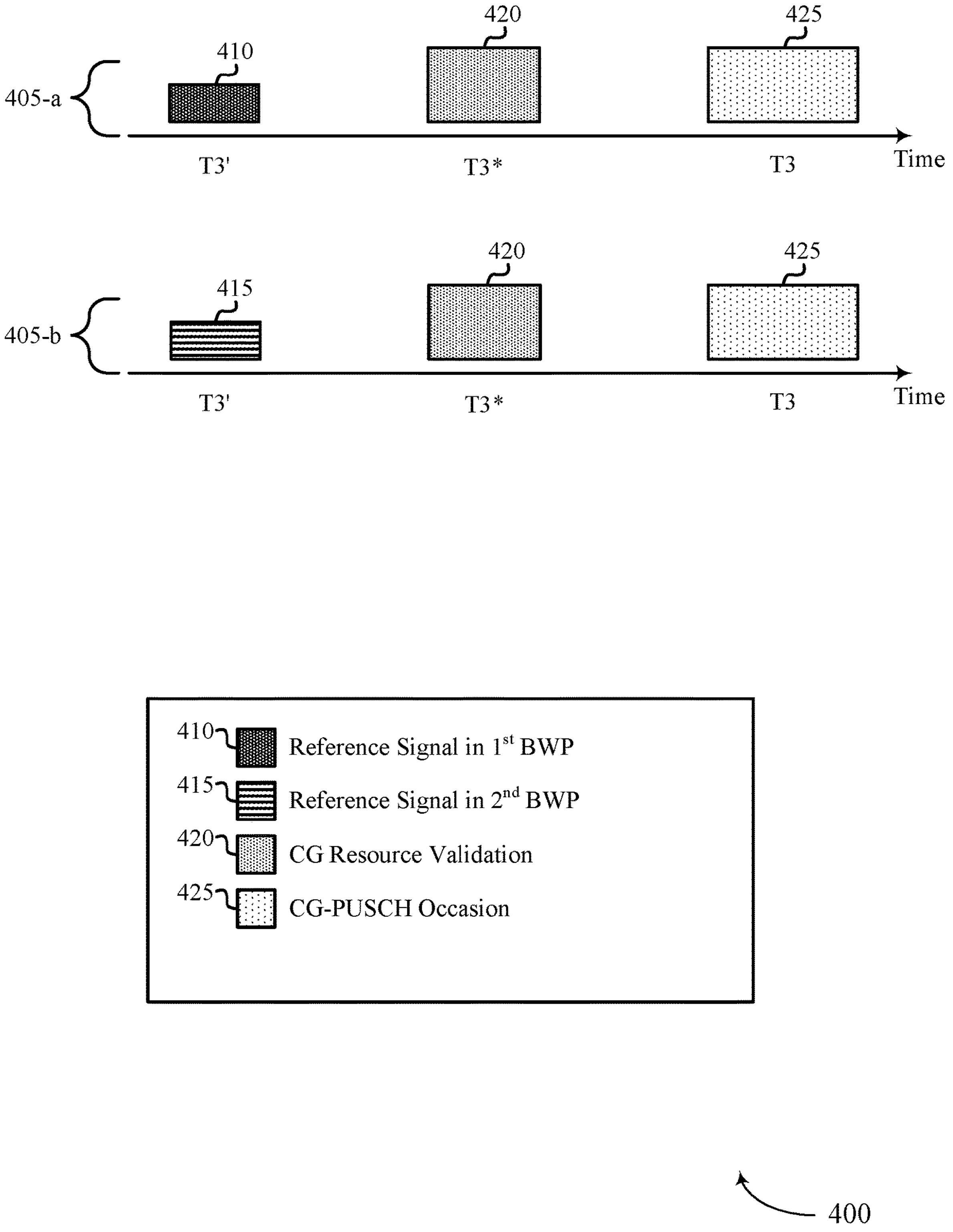
FIG. 4 illustrates an example of a timeline that supports measurement configuration and validation for small data transmission in accordance with one or more aspects of the present disclosure.

FIG. 4 illustrates an example of a timeline 400 that supports measurement configuration and validation for small data transmission in accordance with one or more aspects of the present disclosure. In some aspects, the timeline 400 may implement aspects of the wireless communications systems 100 and 200 or may be implemented by aspects of the wireless communications systems 100 and 200. For example, a UE 115 (e.g., a network entity) may use a case 405 of the timeline 400 to validate RSRP samples for CG resource validation, which may improve CG-SDT procedures.

As described herein with reference to FIGS. 2 and 3, a UE 115 (e.g., a first network entity) may be in an RRC connected state (e.g., RRC_CONNECTED) with a network entity 105 (e.g., a second network entity). The UE 115 may receive a CG-SDT configuration from the network entity 105 in a first BWP (e.g., BWP A). In addition, the UE 115 may be configured with a second BWP (e.g., BWP B) on the downlink or uplink to initiate the SDT procedure, where downlink reference signals may be transmitted in the first and second BWPs. That is, the UE 115 may obtain an $RSRP_1$ at a time T1' and an $RSRP_2$ at a time T2', which may be reference signal measurements used for CG resource validation 420.

Before an initial CG-PUSCH transmission, one or more autonomous retransmissions, or one or more new transmissions on one or more preconfigured PUSCH occasions at a time T3, the UE 115 may perform TA validation while in an RRC inactive state (e.g., RRC_INACTIVE) and using valid RSRP measurements corresponding to the downlink reference signals. In some aspects, the UE (in an RRC inactive state) may perform CG resource validation or selection at a time T3* based on a valid RSRP sample ($RSRP_3$) obtained at a time T3'. If the UE 115 has performed TA validation before the CG resource validation or selection at T3* (as described herein with reference to FIG. 3), and if the TA validation failed, the UE may skip subsequent CG resource validation or selection on or after a time T3 at which the UE 115 may transmit on a CG-PUSCH occasion 425. In such cases, the UE 115 may not consider the corresponding CG-PUSCH occasions as valid uplink grants for CG-SDT.

In some aspects, one or multiple reference resources associated with the CG resource validation or selection may be specified and signaled to the UE via RRC signaling or SI. In some cases, reference resources for $RSRP_3$ may be transmitted on a same frequency range as the CG-SDT. Additionally, same or different reference signals may be specified for CG resource validation or selection across different CG-PUSCH occasions 425 of a CG-SDT procedure. In some aspects, to validate the reference signals, the UE 115 may compare a timing and a value of the reference signal measurement information with as set of threshold measurements (e.g., cg-SDT-RSRP-Threshold). If the reference resources are associated with different configurations of downlink reference signals, different carrier frequencies, different configurations of receive antennas, or different transmit powers, the UE 115 may apply an offset or a scaling factor to $RSRP_3$ or the threshold difference for RSRP validation.

The timeline 400 may indicate times at which the UE 115 may receive and measure reference signals in different BWPs, perform CG resource validation 420, and transmit uplink communications via CG-PUSCH occasions 425. Before transmitting on a CG-PUSCH occasion 425 at a time T3, the UE 115 may collect at least two valid RSRP measurements or samples (e.g., $RSRP_1$ and $RSRP_2$ at times T1' and T2', respectively). For example, in a case 405-*a*, the UE 115 may receive and measure a first instance of a reference signal 410 within a first BWP that was used by the UE 115 while in the RRC connected state at a time T3'. In a case 405-*b*, the UE 115 may receive and measure a first instance of a reference signal 415 within a second BWP that was used by the UE 115 while in an inactive state (e.g., a connection-inactive state).

In some cases, the UE 115 may validate RSRP samples for CG resource validation or selection at T3* based on some criterion. For example, the criteria may indicate that reference resources (e.g., reference signals 410 or reference signals 415) may be associated with a resource mapping between the reference signals and the CG-PUSCH occasions

425 of CG-SDT. In addition, the criteria may specify that the $RSRP_3$ measurement and the CG-SDT procedure are taken on a same frequency range.

Additionally, the criteria may indicate a relationship between the times T3', T3*, and T3. For example, the time T3' may represent a first time at which the UE 115 may obtain first reference signal measurement information (corresponding to the reference signal 410 or the reference signal 415), the time T3* may represent a communication resource validation time at which the UE 115 may perform a communication resource validation procedure, and T3 may represent a transmission time for transmission of an uplink communication. As such, the time-related criterion may indicate that $T1' \leq T3' \leq T3^* < T3$ (e.g., T1' may occur prior or at a same time as T3', which may occur prior to or at a same time as T3*, which may occur prior to T3). The time-related criterion may also indicate $T3^* - \Delta 3 \leq T3' \leq T3^*$, where $\Delta 3$ may be a constant or a configurable parameter. If $\Delta 3$ is a configurable parameter, $\Delta 3$ may depend at least on a frequency range of an SDT operation, an SMTC periodicity, a downlink reference signal type (e.g., SSB, CSI-RS), a quantity and configuration of receive antennas used for the $RSRP_3$ measurement at T3', a quantity of receive antennas used for physical downlink control channel (PDCCH) or physical downlink shared channel (PDSCH) reception of SDT. For example, in case 405-*a*, the UE 115 may receive the reference signal 410 at time T3' and perform the communication validation procedure at time T3*. At time T3, the UE 115 may transmit the uplink communication.

If the downlink reference signal used for TA validation is also associated with a resource mapping of CG-SDT and if T1' or T2' as described herein with reference to FIG. 3 meet the criteria related to CG resource validation or selection, the UE 115 may reuse the valid RSRP samples for TA validation to validate or select the CG resources used for an initial CG-PUSCH transmission, autonomous retransmissions, or new transmissions at T3.

Figure 5:
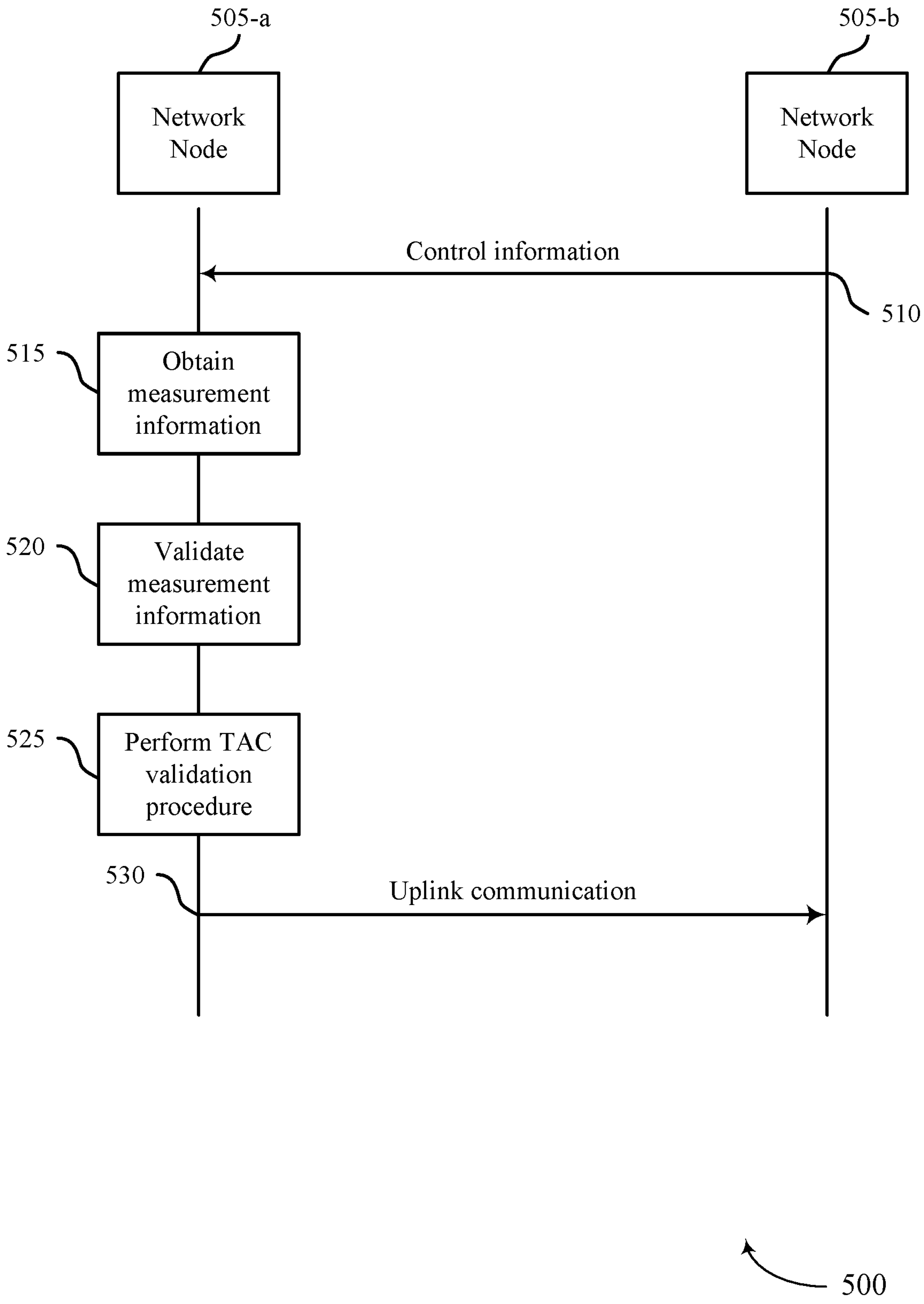
FIG. 5 illustrates an example of a process flow that supports measurement configuration and validation for small data transmission in accordance with one or more aspects of the present disclosure.

FIG. 5 illustrates an example of a process flow 500 that supports measurement configuration and validation for small data transmission in accordance with one or more aspects of the present disclosure. The process flow 500 may implement aspects of wireless communications systems 100 and 200, or may be implemented by aspects of the wireless communications system 100 and 200. For example, the process flow 500 may illustrate operations between a network entity 505-*a* (e.g., a UE 115 or network node) and a network entity 505-*b* (e.g., a network entity 105 or network node) which may be examples of corresponding devices described herein. In the following description of the process flow 500, the operations between the network entity 505-*a* and the network entity 505-*b* may be transmitted in a different order than the example order shown, or the operations performed by the network entity 505-*a* and the network entity 505-*b* may be performed in different orders or at different times. Some operations may also be omitted from the process flow 500, and other operations may be added to the process flow 500.

At 510, the network entity 505-*a* may receive, from the network entity 505-*b* and in association with a connection-active state release, first information that indicates: communication resources for uplink communication in a connection-inactive state, a TAC measurement resources for a TAC validation procedure, TAC validation information, and measurement validation information, where the measurement validation information includes one or more timing-related criterion and one or more non-timing-related criterion.

At 515, the network entity 505-*a* may obtain, based on the measurement resources, measurement information including first reference signal measurement information corresponding to a first reference signal and second reference signal measurement information corresponding to a second reference signal. The reference signal measurement information may include RSRP measurements.

At 520, the network entity 505-*a* may validate, based on the measurement validation information, the measurement information as valid input information for the TAC validation procedure.

At 525, the network entity 505-*a* may perform, while in the connection-inactive state and based on the validation of the measurement information, the TAC validation procedure, where, to perform the TAC validation procedure, the network entity 505-*a* may validate, based on the TAC validation information, the TAC for application to transmission of the uplink communication using the communication resources.

At 530, the network entity 505-*a* may transmit, to the network entity 505-*b* and while in the connection-inactive state and based on the validated TAC, the uplink communication using the communication resources. The uplink communication may include an initial CG-SDT transmission or an autonomous retransmission prior to receiving a response message for the initial CG-SDT transmission.

Figure 6:
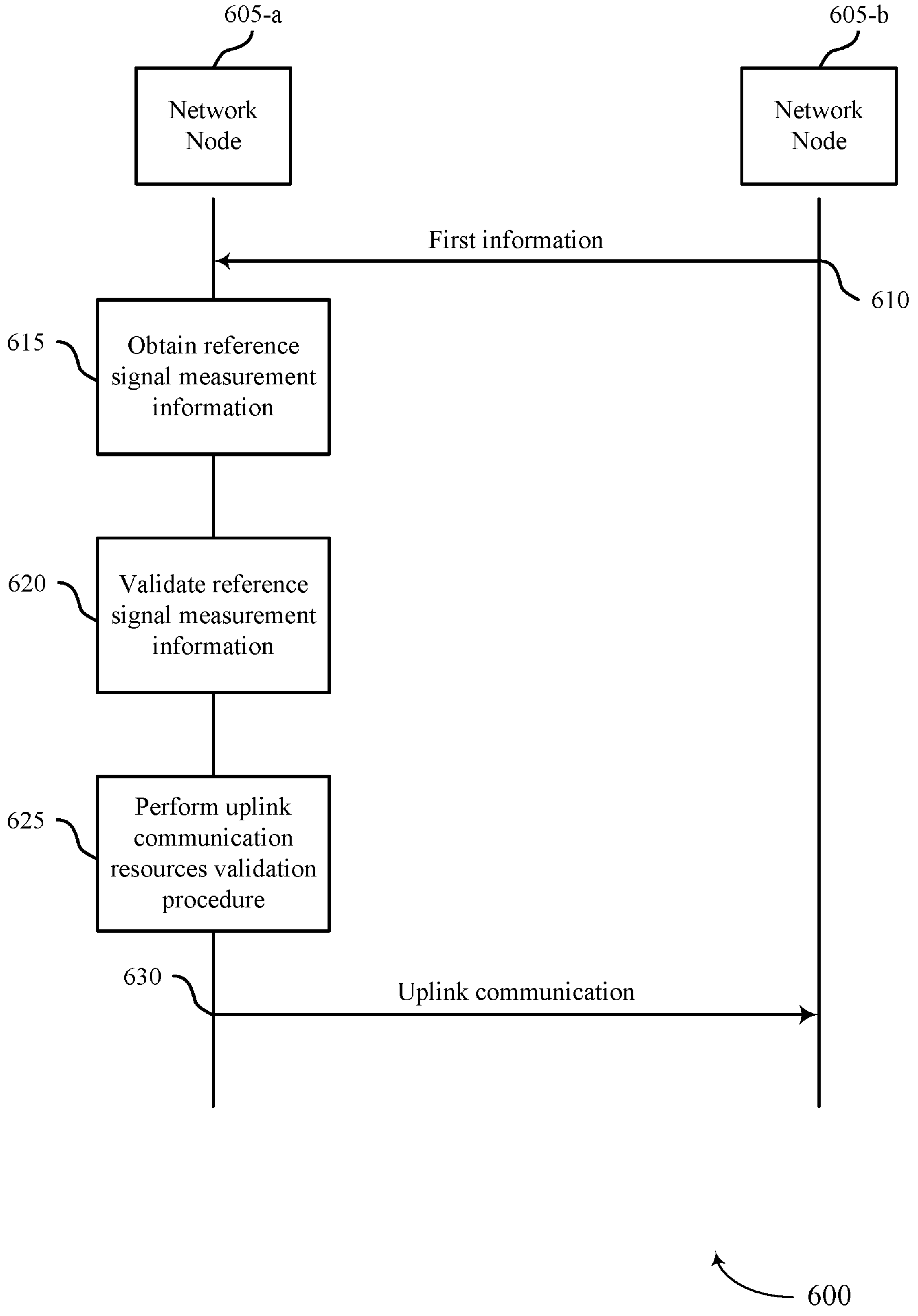
FIG. 6 illustrates an example of a process flow that supports measurement configuration and validation for small data transmission in accordance with one or more aspects of the present disclosure.

FIG. 6 illustrates an example of a process flow 600 that supports measurement configuration and validation for small data transmission in accordance with one or more aspects of the present disclosure. The process flow 600 may implement aspects of wireless communications systems 100 and 200, or may be implemented by aspects of the wireless communications system 100 and 200. For example, the process flow 600 may illustrate operations between a network entity 605-*a* (e.g., a UE 115 or a network node) and a network entity 605-*b* (e.g., a network entity 105 or network node) which may be examples of corresponding devices described herein. In the following description of the process flow 600, the operations between the network entity 605-*a* and the network entity 605-*b* may be transmitted in a different order than the example order shown, or the operations performed by the network entity 605-*a* and the network entity 605-*b* may be performed in different orders or at different times. Some operations may also be omitted from the process flow 600, and other operations may be added to the process flow 600.

At 610, the network entity 605-*a* may receive, from the network entity 605-*b* and in association with a connection active state release, first information that indicates: communication resources for uplink communication in a connection-inactive state, measurement resources for an uplink communication resources validation procedure, uplink communication resources validation information, and measurement validation information.

At 615, the network entity 605-*a* may obtain, based on the measurement resources, reference signal measurement information. At 620, the network entity 605-*a* may validate, based on the measurement validation information, the reference signal measurement information as valid input information for the uplink communication resources validation procedure.

At 625, the network entity 605-*a* may perform, while in the connection-inactive state and based on the validation of the measurement information, the uplink communication resources validation procedure, where, to perform the uplink communication resources validation procedure, the network entity 605-*a* may validate, based on the uplink communication resources validation information, the communication resources.

At 630, the network entity 605-*a* may perform uplink communication with the network entity 605-*b*.

Figure 7:
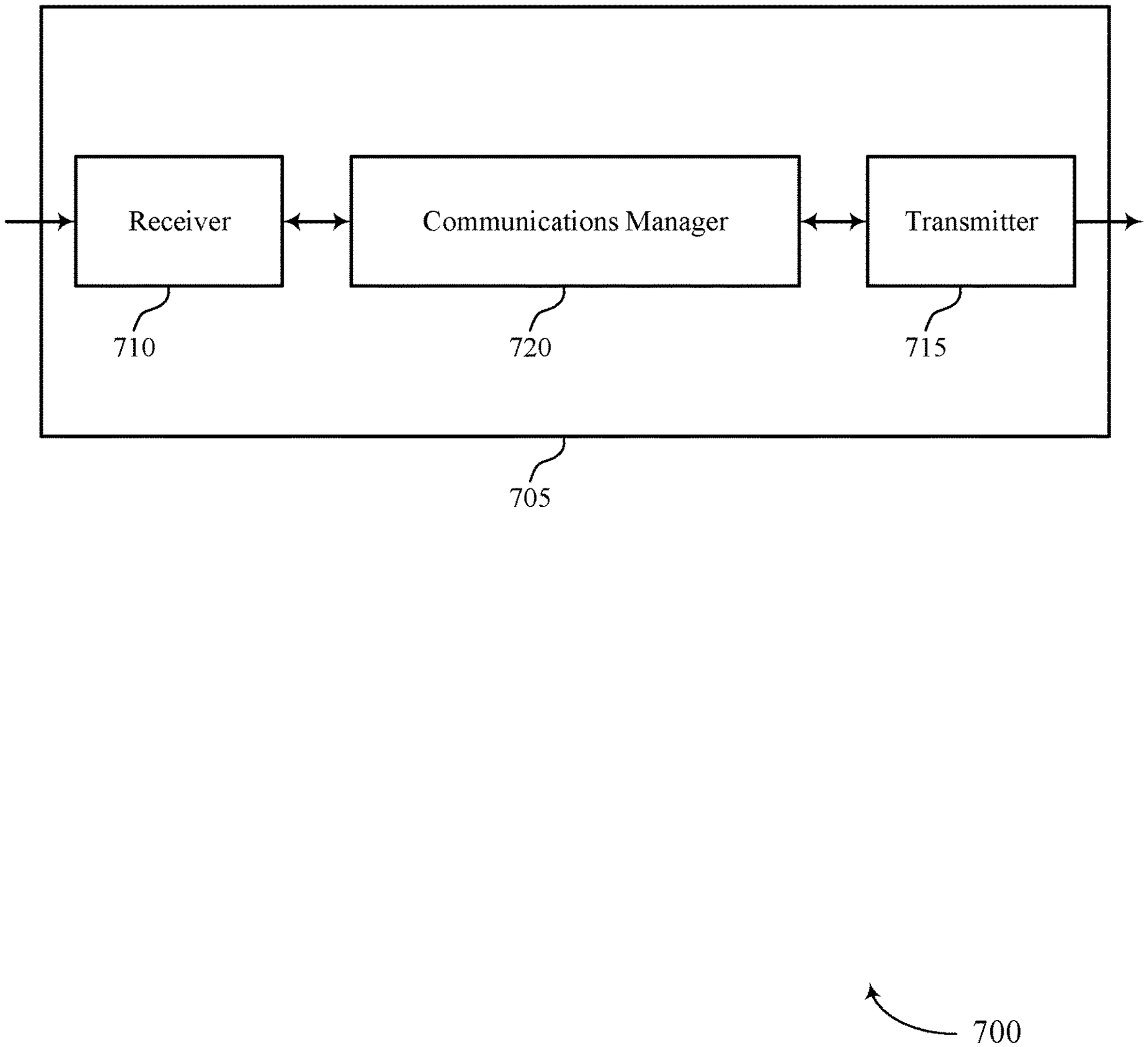
FIGS. 7 and 8 illustrate block diagrams of devices that support measurement configuration and validation for small data transmission in accordance with one or more aspects of the present disclosure.

FIG. 7 illustrates a block diagram 700 of a device 705 that supports measurement configuration and validation for small data transmission in accordance with one or more aspects of the present disclosure. The device 705 may be an example of aspects of a UE 115 as described herein. The device 705 may include a receiver 710, a transmitter 715, and a communications manager 720. The device 705 may also include a processor. Each of these components may be in communication with one another (e.g., via one or more buses).

The receiver 710 may provide a means for receiving information such as packets, user data, or control information associated with various information channels (e.g., control channels, data channels, information channels related to small data transmission). Information may be passed on to other components of the device 705. The receiver 710 may utilize a single antenna or a set of multiple antennas.

The transmitter 715 may provide a means for transmitting signals generated by other components of the device 705. For example, the transmitter 715 may transmit information such as packets, user data, or control information associated with various information channels (e.g., control channels, data channels, information channels related to small data transmission). In some aspects, the transmitter 715 may be co-located with a receiver 710 in a transceiver module. The transmitter 715 may utilize a single antenna or a set of multiple antennas.

The communications manager 720, the receiver 710, the transmitter 715, or various combinations thereof or various components thereof may be examples of means for performing various aspects of measurement configuration and validation for small data transmission as described herein. For example, the communications manager 720, the receiver 710, the transmitter 715, or various combinations or components thereof may support a method for performing one or more of the functions described herein.

In some aspects, the communications manager 720, the receiver 710, the transmitter 715, or various combinations or components thereof may be implemented in hardware (e.g., in communications management circuitry). The hardware may include a processor, a digital signal processor (DSP), a central processing unit (CPU), an application-specific integrated circuit (ASIC), a field-programmable gate array (FPGA) or other programmable logic device, a microcontroller, discrete gate or transistor logic, or discrete hardware components configured as or otherwise supporting a means for performing the functions described in the present disclosure. In some aspects, a processor and memory coupled with the processor may be configured to perform one or more of the functions described herein (e.g., by executing, by the processor, instructions stored in the memory).

Additionally, or alternatively, in some aspects, the communications manager 720, the receiver 710, the transmitter 715, or various combinations or components thereof may be implemented in code (e.g., as communications management software or firmware) executed by a processor. If implemented in code executed by a processor, the functions of the communications manager 720, the receiver 710, the transmitter 715, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some aspects, the communications manager 720 may be configured to perform various operations (e.g., receiving, obtaining, monitoring, outputting, transmitting) using or otherwise in cooperation with the receiver 710 or the transmitter 715. For example, the communications manager 720 may receive information from the receiver 710, send information to the transmitter 715, or be integrated in combination with the receiver 710 or the transmitter 715 to obtain information, output information, or perform various other operations as described herein.

For example, the communications manager 720 may be configured as or otherwise support a means for receiving, at a first network entity and in association with a connection-active state release, first information that indicates: communication resources for uplink communication in a connection-inactive state, a TAC, measurement resources for a TAC validation procedure, TAC validation information, and measurement validation information, where the measurement validation information includes one or more timing-related criterion and one or more non-timing-related criterion. The communications manager 720 may be configured as or otherwise support a means for obtaining, based on the measurement resources, measurement information including first reference signal measurement information corresponding to a first reference signal and second reference signal measurement information corresponding to a second reference signal. The communications manager 720 may be configured as or otherwise support a means for validating, based on the measurement validation information, the measurement information as valid input information for the TAC validation procedure. The communications manager 720 may be configured as or otherwise support a means for performing, while in the connection-inactive state and based on the validation of the measurement information, the TAC validation procedure, where performing the TAC validation procedure includes validating, based on the TAC validation information, the TAC for application to transmission of the uplink communication using the communication resources. The communications manager 720 may be configured as or otherwise support a means for transmitting, while in the connection-inactive state and based on the validated TAC, the uplink communication using the communication resources.

For example, the communications manager 720 may be configured as or otherwise support a means for receiving, at a first network entity and in association with a connection-active state release, first information that indicates: communication resources for uplink communication in a connection-inactive state, measurement resources for an uplink communication resources validation procedure, uplink communication resources validation information, and measurement validation information. The communications manager 720 may be configured as or otherwise support a means for obtaining, based on the measurement resources, reference signal measurement information. The communications manager 720 may be configured as or otherwise support a means for validating, based on the measurement validation information, the reference signal measurement information as valid input information for the uplink communication resources validation procedure. The communications manager 720 may be configured as or otherwise support a means for performing, while in the connection-inactive state and based on the validation of the reference signal measurement information, the uplink communication resources validation procedure, where performing the uplink communication resources validation procedure includes validating, based on the uplink communication resources validation information, the communication resources. The communications manager 720 may be configured as or otherwise support a means for transmitting, while in the connection-inactive state and based on the validated communication resources, the uplink communication using the communication resources.

By including or configuring the communications manager 720 in accordance with examples as described herein, the device 705 (e.g., a processor controlling or otherwise coupled with the receiver 710, the transmitter 715, the communications manager 720, or a combination thereof) may support techniques for reduced processing, reduced power consumption, and more efficient utilization of communication resources.

Figure 8:
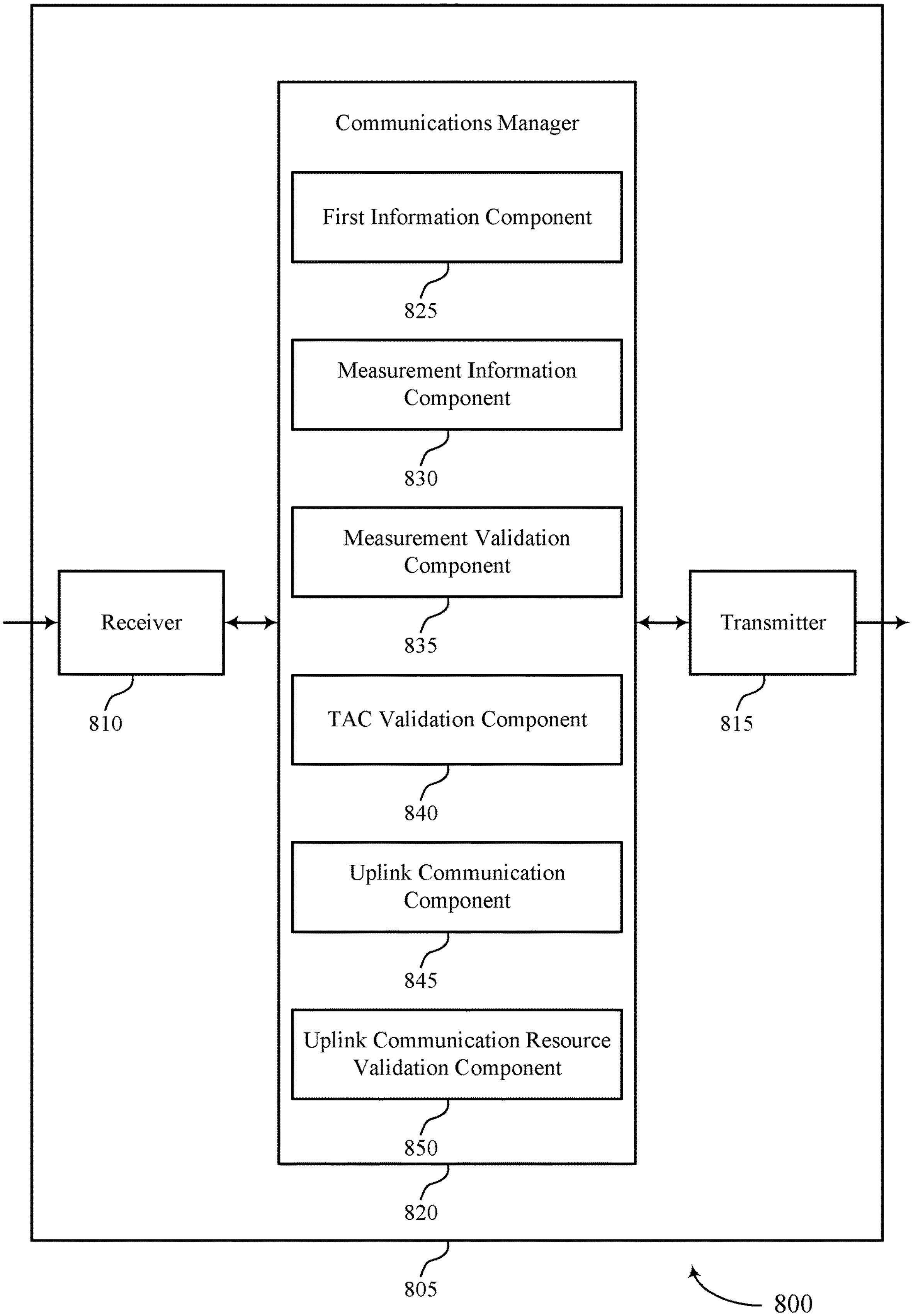

FIG. 8 illustrates a block diagram 800 of a device 805 that supports measurement configuration and validation for small data transmission in accordance with one or more aspects of the present disclosure. The device 805 may be an example of aspects of a device 705 or a UE 115 as described herein. The device 805 may include a receiver 810, a transmitter 815, and a communications manager 820. The device 805 may also include a processor. Each of these components may be in communication with one another (e.g., via one or more buses).

The receiver 810 may provide a means for receiving information such as packets, user data, or control information associated with various information channels (e.g., control channels, data channels, information channels related to small data transmission). Information may be passed on to other components of the device 805. The receiver 810 may utilize a single antenna or a set of multiple antennas.

The transmitter 815 may provide a means for transmitting signals generated by other components of the device 805. For example, the transmitter 815 may transmit information such as packets, user data, or control information associated with various information channels (e.g., control channels, data channels, information channels related to small data transmission). In some aspects, the transmitter 815 may be co-located with a receiver 810 in a transceiver module. The transmitter 815 may utilize a single antenna or a set of multiple antennas.

The device 805, or various components thereof, may be an example of means for performing various aspects of measurement configuration and validation for small data transmission as described herein. For example, the communications manager 820 may include a first information component 825, a measurement information component 830, a measurement validation component 835, a TAC validation component 840, an uplink communication component 845, or an uplink communication resource validation component 850. The communications manager 820 may be an example of aspects of a communications manager 720 as described herein. In some aspects, the communications manager 820, or various components thereof, may be configured to perform various operations (e.g., receiving, obtaining, monitoring, outputting, transmitting) using or otherwise in cooperation with the receiver 810 or the transmitter 815. For example, the communications manager 820 may receive information from the receiver 810, send information to the transmitter 815, or be integrated in combination with the receiver 810 or the transmitter 815 to obtain information, output information, or perform various other operations as described herein.

The first information component 825 may be configured as or otherwise support a means for receiving, at a first network entity and in association with a connection-active state release, first information that indicates: communication resources for uplink communication in a connection-inactive state, a TAC, measurement resources for a TAC validation procedure, TAC validation information, and measurement validation information, where the measurement validation information includes one or more timing-related criterion and one or more non-timing-related criterion. The measurement information component 830 may be configured as or otherwise support a means for obtaining, based on the measurement resources, measurement information including first reference signal measurement information corresponding to a first reference signal and second reference signal measurement information corresponding to a second reference signal. The measurement validation component 835 may be configured as or otherwise support a means for validating, based on the measurement validation information, the measurement information as valid input information for the TAC validation procedure. The TAC validation component 840 may be configured as or otherwise support a means for performing, while in the connection-inactive state and based on the validation of the measurement information, the TAC validation procedure, where performing the TAC validation procedure includes validating, based on the TAC validation information, the TAC for application to transmission of the uplink communication using the communication resources. The uplink communication component 845 may be configured as or otherwise support a means for transmitting, while in the connection-inactive state and based on the validated TAC, the uplink communication using the communication resources.

The first information component 825 may be configured as or otherwise support a means for receiving, at a first network entity and in association with a connection-active state release, first information that indicates: communication resources for uplink communication in a connection-inactive state, measurement resources for an uplink communication resources validation procedure, uplink communication resources validation information, and measurement validation information. The measurement information component 830 may be configured as or otherwise support a means for obtaining, based on the measurement resources, reference signal measurement information. The measurement validation component 835 may be configured as or otherwise support a means for validating, based on the measurement validation information, the reference signal measurement information as valid input information for the uplink communication resources validation procedure. The uplink communication resource validation component 850 may be configured as or otherwise support a means for performing, while in the connection-inactive state and based on the validation of the reference signal measurement information, the uplink communication resources validation procedure, where performing the uplink communication resources validation procedure includes validating, based on the uplink communication resources validation information, the communication resources. The uplink communication component 845 may be configured as or otherwise support a means for transmitting, while in the connection-inactive state and based on the validated communication resources, the uplink communication using the communication resources.

Figure 9:
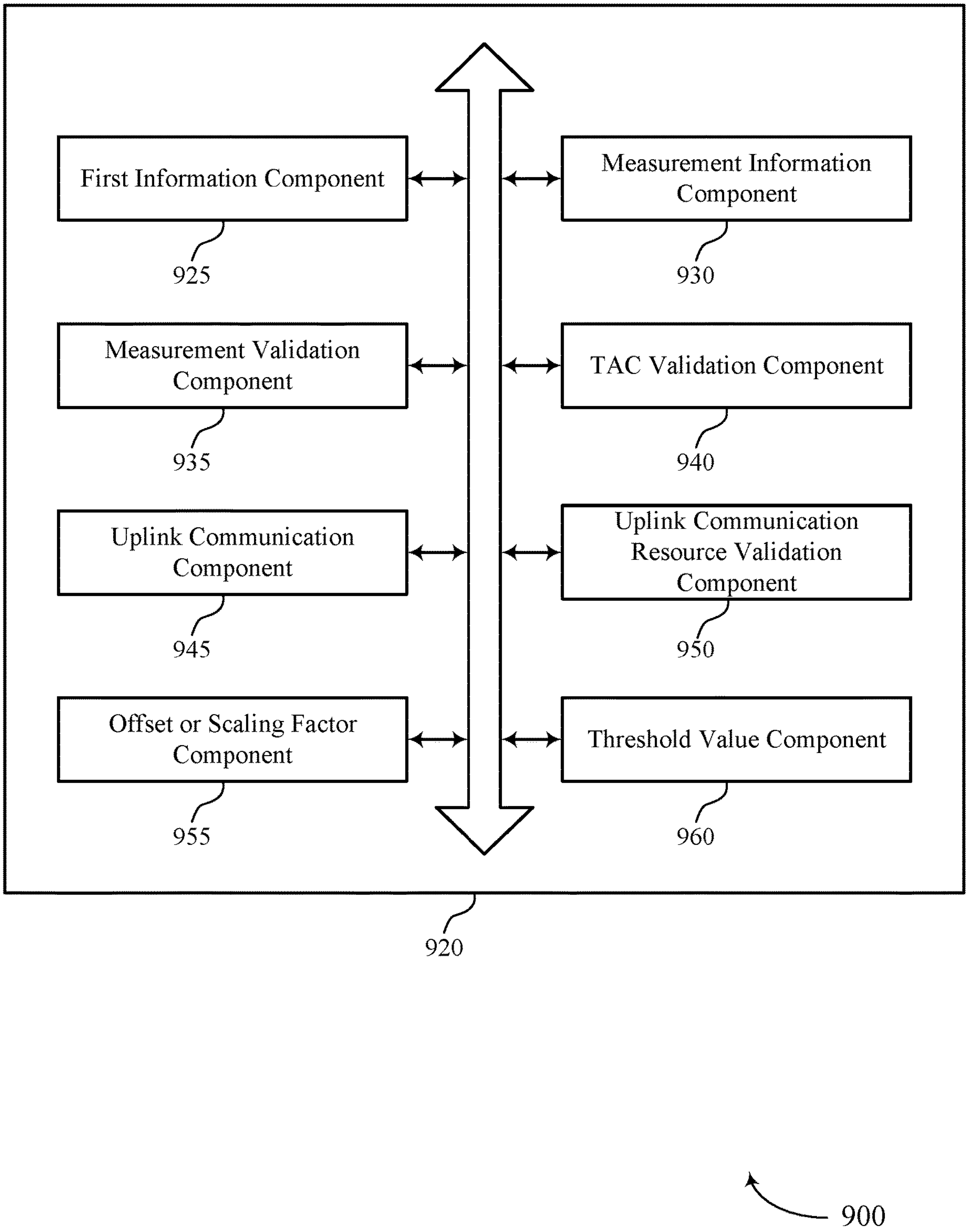
FIG. 9 illustrates a block diagram of a communications manager that supports measurement configuration and validation for small data transmission in accordance with one or more aspects of the present disclosure.

FIG. 9 illustrates a block diagram 900 of a communications manager 920 that supports measurement configuration and validation for small data transmission in accordance with one or more aspects of the present disclosure. The communications manager 920 may be an example of aspects of a communications manager 720 or a communications manager 820, as described herein. The communications manager 920, or various components thereof, may be an example of means for performing various aspects of measurement configuration and validation for small data transmission as described herein. For example, the communications manager 920 may include a first information component 925, a measurement information component 930, a measurement validation component 935, a TAC validation component 940, an uplink communication component 945, an uplink communication resource validation component 950, an offset or scaling factor component 955, or a threshold value component 960. Each of these components may communicate, directly or indirectly, with one another (e.g., via one or more buses).

The first information component 925 may be configured as or otherwise support a means for receiving, at a first network entity and in association with a connection-active state release, first information that indicates: communication resources for uplink communication in a connection-inactive state, a TAC, measurement resources for a TAC validation procedure, TAC validation information, and measurement validation information, where the measurement validation information includes one or more timing-related criterion and one or more non-timing-related criterion. The measurement information component 930 may be configured as or otherwise support a means for obtaining, based on the measurement resources, measurement information including first reference signal measurement information corresponding to a first reference signal and second reference signal measurement information corresponding to a second reference signal. The measurement validation component 935 may be configured as or otherwise support a means for validating, based on the measurement validation information, the measurement information as valid input information for the TAC validation procedure. The TAC validation component 940 may be configured as or otherwise support a means for performing, while in the connection-inactive state and based on the validation of the measurement information, the TAC validation procedure, where performing the TAC validation procedure includes validating, based on the TAC validation information, the TAC for application to transmission of the uplink communication using the communication resources. The uplink communication component 945 may be configured as or otherwise support a means for transmitting, while in the connection-inactive state and based on the validated TAC, the uplink communication using the communication resources.

In some aspects, to support obtaining the measurement information, the measurement information component 930 may be configured as or otherwise support a means for receiving and measuring a first instance of a reference signal within a first BWP that was used by the first network entity while in a connected state. In some aspects, to support obtaining the measurement information, the measurement information component 930 may be configured as or otherwise support a means for receiving and measuring a second instance of the reference signal within the first BWP that was used by the first network entity while in the connected state.

In some aspects, to support obtaining the measurement information, the measurement information component 930 may be configured as or otherwise support a means for receiving and measuring a first instance of a reference signal within a first BWP that was used by the first network entity while in a connected state. In some aspects, to support obtaining the measurement information, the measurement information component 930 may be configured as or otherwise support a means for receiving and measuring a second instance of the reference signal within a second BWP that was used by the first network entity while in the connection-inactive state.

In some aspects, to support obtaining the measurement information, the measurement information component 930 may be configured as or otherwise support a means for receiving and measuring a first instance of a reference signal within a second BWP that was used by the first network entity while in the connection-inactive state, where a first BWP was used by the first network entity while in a connected state. In some aspects, to support obtaining the measurement information, the measurement information component 930 may be configured as or otherwise support a means for receiving and measuring a second instance of the reference signal within the second BWP that was used by the first network entity while in the connection-inactive state.

In some aspects, to support performing the TAC validation procedure, the TAC validation component 940 may be configured as or otherwise support a means for comparing a difference between the first reference signal measurement information and the second reference signal measurement information with a threshold difference.

In some aspects, the offset or scaling factor component 955 may be configured as or otherwise support a means for applying an offset or a scaling factor to at least one of the first reference signal measurement information, the second reference signal measurement information, or the threshold difference based on the first reference signal measurement information and the second reference signal measurement information being associated with different configurations of reference signals, different carrier frequencies, different configurations of receive antennas, or different transmit powers of the reference signals.

In some aspects, to support applying the offset or the scaling factor, the offset or scaling factor component 955 may be configured as or otherwise support a means for receiving the offset or the scaling factor for application to at least one of the first reference signal measurement information, the second reference signal measurement information, or the threshold difference.

In some aspects, the non-timing-related criterion indicates that the first reference signal measurement information and the second reference signal measurement information are obtained within a same frequency range.

In some aspects, the timing-related criterion indicates a first time at which the first reference signal measurement information is obtained, a second time at which the second reference signal measurement information is obtained, a TAC validation time, and a transmission time for transmission of the uplink communication. In some aspects, the timing-related criterion indicates that the first time is prior to the second time, which is prior to or at a same time as the TAC validation time, which is prior to the transmission time.

In some aspects, the timing-related criterion indicates that a difference between the TAC validation time and the second time is less than or equal to a delta time threshold. In some aspects, the delta time threshold has a value greater than zero and is based on one or more of a frequency range of the uplink communication, a discontinuous reception cycle length associated with the first network entity in the connection-inactive state, a measurement window configuration for a set of multiple reference resources associated with the TAC validation procedure, a type and a configuration of the second reference signal, and a configuration of receive antennas used to obtain the second reference signal measurement information at the second time.

In some aspects, the timing-related criterion indicates that a difference between the transmission time and the TAC validation time is less than or equal to a delta time threshold. In some aspects, the delta time threshold has a value greater than zero.

In some aspects, the timing-related criterion indicates that a difference between a message arrival time and the first time is less than or equal to a delta time threshold. In some aspects, the message arrival time is a most recent time at which the first network entity receives a TAC of a primary TA group or receives the first information. In some aspects, the delta time threshold has a value greater than zero and is based on one or more of a frequency range of the uplink communication, a discontinuous reception cycle length associated with the first network entity, a measurement window configuration for a set of multiple reference resources associated with the TAC validation procedure, a type and a configuration of the first reference signal, and a configuration of receive antennas used to obtain the first reference signal measurement information at the first time.

In some aspects, the threshold value component 960 may be configured as or otherwise support a means for receiving an indication of a first threshold value associated with a difference between the TAC validation time and the second time, a second threshold value associated with a difference between the transmission time and the TAC validation time, and a third threshold value associated with a difference between a message arrival time and the first time, where the message arrival time is a most recent time at which the first network entity receives a TAC of a primary TA group or receives the first information.

In some aspects, the uplink communication includes an initial CG-SDT transmission or an autonomous retransmission prior to receiving a response message for the initial CG-SDT transmission.

In some aspects, the first information component 925 may be configured as or otherwise support a means for receiving, at a first network entity and in association with a connection-active state release, first information that indicates: communication resources for uplink communication in a connection-inactive state, measurement resources for an uplink communication resources validation procedure, uplink communication resources validation information, and measurement validation information. In some aspects, the measurement information component 930 may be configured as or otherwise support a means for obtaining, based on the measurement resources, reference signal measurement information. In some aspects, the measurement validation component 935 may be configured as or otherwise support a means for validating, based on the measurement validation information, the reference signal measurement information as valid input information for the uplink communication resources validation procedure. The uplink communication resource validation component 950 may be configured as or otherwise support a means for performing, while in the connection-inactive state and based on the validation of the reference signal measurement information, the uplink communication resources validation procedure, where performing the uplink communication resources validation procedure includes validating, based on the uplink communication resources validation information, the communication resources. In some aspects, the uplink communication component 945 may be configured as or otherwise support a means for transmitting, while in the connection-inactive state and based on the validated communication resources, the uplink communication using the communication resources.

In some aspects, to support obtaining the reference signal measurement information, the measurement information component 930 may be configured as or otherwise support a means for receiving and measuring a reference signal within a first BWP that was used by the first network entity while in a connected state or a second BWP that was used by the first network entity while in the connection-inactive state.

In some aspects, the communication resources that are validated are in a same frequency range as the measurement resources which are a basis for the reference signal measurement information.

In some aspects, to support validating the reference signal measurement information, the measurement validation component 935 may be configured as or otherwise support a means for comparing a timing and a value of the reference signal measurement information with a set of threshold measurement values.

In some aspects, to support transmitting the uplink communication, the uplink communication component 945 may be configured as or otherwise support a means for transmitting a set of multiple uplink communications over a corresponding set of multiple validated uplink transmission occasions, where the uplink communication resources validation procedure is performed prior to each transmission.

In some aspects, the measurement validation component 935 may be configured as or otherwise support a means for receiving second information that indicates a set of multiple reference resources for validation of the reference signal measurement information, each of the set of multiple reference resources being associated with a different one of the set of multiple validated uplink transmission occasions. In some aspects, the offset or scaling factor component 955 may be configured as or otherwise support a means for applying an offset or a scaling factor to at least one of the reference signal measurement information or the set of threshold measurement values based on the set of multiple reference resources for the validation of the reference signal measurement information being associated with different reference signals, different carrier frequencies, different configurations of receive antennas, or different transmit powers.

In some aspects, to support applying the offset or the scaling factor, the offset or scaling factor component 955 may be configured as or otherwise support a means for receiving the offset or the scaling factor for application to at least one of the reference signal measurement information or the set of threshold measurement values.

In some aspects, the measurement validation information indicates that a set of multiple reference resources for the reference signal measurement information correspond to a resource map between the measurement resources which are a basis for the reference signal measurement information and the communication resources indicated in the first information. In some aspects, the measurement validation information indicates that the reference signal measurement information is obtained and the uplink communication is transmitted within a same frequency range.

In some aspects, the measurement validation information indicates a first time at which a first reference signal measurement information is obtained, a communication resource validation time, a transmission time for transmission of the uplink communication, and a delta time. In some aspects, the measurement validation information indicates that the first time is prior to or at a same time as the communication resource validation time, which is prior to the transmission time. In some aspects, the measurement validation information indicates that a difference between the communication resource validation time and the first time is less than or equal to the delta time.

In some aspects, the delta time has a value greater than zero and is based on one or more of a frequency range of the uplink communication, a discontinuous reception cycle length associated with the first network entity, a measurement window configuration for a reference signal associated with communication resource validation, a type of a reference signal which is a basis for the reference signal measurement information, a configuration of receive antennas used to obtain the reference signal measurement information at the first time, a transmission power associated with the reference signal measurement information, and a configuration of receive antennas used for downlink channel reception.

In some aspects, the TAC validation component 940 may be configured as or otherwise support a means for validating, while in the connection-inactive state, a TAC for application to transmission of the uplink communication using the communication resources indicated in the first information, where the TAC validation is based on the validity of the reference signal measurement information as the valid input information.

Figure 10:
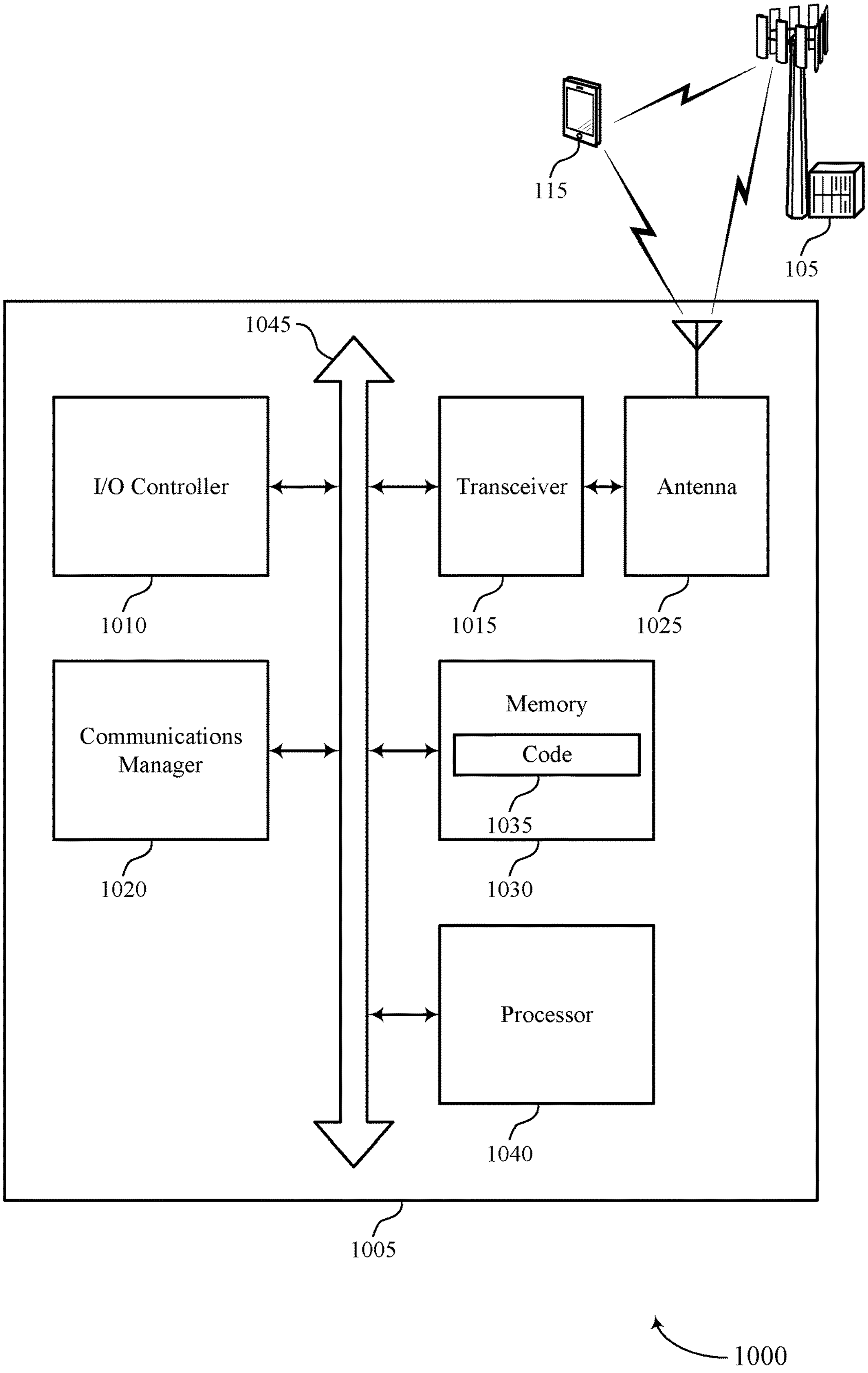
FIG. 10 illustrates a diagram of a system including a device that supports measurement configuration and validation for small data transmission in accordance with one or more aspects of the present disclosure.

FIG. 10 illustrates a diagram of a system 1000 including a device 1005 that supports measurement configuration and validation for small data transmission in accordance with one or more aspects of the present disclosure. The device 1005 may be an example of or include the components of a device 705, a device 805, or a UE 115 as described herein. The device 1005 may communicate (e.g., wirelessly) with one or more network entities 105 or one or more UEs 115. The device 1005 may include components for bi-directional voice and data communications including components for transmitting and receiving communications, such as a communications manager 1020, an input/output (I/O) controller 1010, a transceiver 1015, an antenna 1025, a memory 1030, code 1035, and a processor 1040. These components may be in electronic communication or otherwise coupled (e.g., operatively, communicatively, functionally, electronically, electrically) via one or more buses (e.g., a bus 1045).

The I/O controller 1010 may manage input and output signals for the device 1005. The I/O controller 1010 may also manage peripherals not integrated into the device 1005. In some cases, the I/O controller 1010 may represent a physical connection or port to an external peripheral. In some cases, the I/O controller 1010 may utilize an operating system such as iOS®, ANDROID®, MS-DOS®, MS-WINDOWS®, OS/2®, UNIX®, LINUX®, or another known operating system. Additionally, or alternatively, the I/O controller 1010 may represent or interact with a modem, a keyboard, a mouse, a touchscreen, or a similar device. In some cases, the I/O controller 1010 may be implemented as part of a processor, such as the processor 1040. In some cases, a user may interact with the device 1005 via the I/O controller 1010 or via hardware components controlled by the I/O controller 1010.

In some cases, the device 1005 may include a single antenna 1025. However, in some other cases, the device 1005 may have more than one antenna 1025, which may be capable of concurrently transmitting or receiving multiple wireless transmissions. The transceiver 1015 may communicate bi-directionally, via the one or more antennas 1025, wired, or wireless links as described herein. For example, the transceiver 1015 may represent a wireless transceiver and may communicate bi-directionally with another wireless transceiver. The transceiver 1015 may also include a modem to modulate the packets, to provide the modulated packets to one or more antennas 1025 for transmission, and to demodulate packets received from the one or more antennas 1025. The transceiver 1015, or the transceiver 1015 and one or more antennas 1025, may be an example of a transmitter 715, a transmitter 815, a receiver 710, or a receiver 810, as described herein.

The memory 1030 may include random access memory (RAM) and read-only memory (ROM). The memory 1030 may store computer-readable, computer-executable code 1035 including instructions that, when executed by the processor 1040, cause the device 1005 to perform various functions described herein. The code 1035 may be stored in a non-transitory computer-readable medium such as system memory or another type of memory. In some cases, the code 1035 may not be directly executable by the processor 1040 but may cause a computer (e.g., when compiled and executed) to perform functions described herein. In some cases, the memory 1030 may contain, among other things, a basic I/O system (BIOS) which may control basic hardware or software operation such as the interaction with peripheral components or devices.

The processor 1040 may include an intelligent hardware device (e.g., a general-purpose processor, a DSP, a CPU, a microcontroller, an ASIC, an FPGA, a programmable logic device, a discrete gate or transistor logic component, or a discrete hardware component). In some cases, the processor 1040 may be configured to operate a memory array using a memory controller. In some other cases, a memory controller may be integrated into the processor 1040. The processor 1040 may be configured to execute computer-readable instructions stored in a memory (e.g., the memory 1030) to cause the device 1005 to perform various functions (e.g., functions or tasks supporting small data transmission). For example, the device 1005 or a component of the device 1005 may include a processor 1040 and memory 1030 coupled with or to the processor 1040, the processor 1040 and memory 1030 configured to perform various functions described herein.

For example, the communications manager 1020 may be configured as or otherwise support a means for receiving, at a first network entity and in association with a connection-active state release, first information that indicates: communication resources for uplink communication in a connection-inactive state, a TAC, measurement resources for a TAC validation procedure, TAC validation information, and measurement validation information, where the measurement validation information includes one or more timing-related criterion and one or more non-timing-related criterion. The communications manager 1020 may be configured as or otherwise support a means for obtaining, based on the measurement resources, measurement information including first reference signal measurement information corresponding to a first reference signal and second reference signal measurement information corresponding to a second reference signal. The communications manager 1020 may be configured as or otherwise support a means for validating, based on the measurement validation information, the measurement information as valid input information for the TAC validation procedure. The communications manager 1020 may be configured as or otherwise support a means for performing, while in the connection-inactive state and based on the validation of the measurement information, the TAC validation procedure, where performing the TAC validation procedure includes validating, based on the TAC validation information, the TAC for application to transmission of the uplink communication using the communication resources. The communications manager 1020 may be configured as or otherwise support a means for transmitting, while in the connection-inactive state and based on the validated TAC, the uplink communication using the communication resources.

For example, the communications manager 1020 may be configured as or otherwise support a means for receiving, at a first network entity and in association with a connection-active state release, first information that indicates: communication resources for uplink communication in a connection-inactive state, measurement resources for an uplink communication resources validation procedure, uplink communication resources validation information, and measurement validation information. The communications manager 1020 may be configured as or otherwise support a means for obtaining, based on the measurement resources, reference signal measurement information. The communications manager 1020 may be configured as or otherwise support a means for validating, based on the measurement validation information, the reference signal measurement information as valid input information for the uplink communication resources validation procedure. The communications manager 1020 may be configured as or otherwise support a means for performing, while in the connection-inactive state and based on the validation of the reference signal measurement information, the uplink communication resources validation procedure, where performing the uplink communication resources validation procedure includes validating, based on the uplink communication resources validation information, the communication resources. The communications manager 1020 may be configured as or otherwise support a means for transmitting, while in the connection-inactive state and based on the validated communication resources, the uplink communication using the communication resources.

By including or configuring the communications manager 1020 in accordance with examples as described herein, the device 1005 may support techniques for reduced latency, improved communication reliability, and improved coordination between devices.

In some aspects, the communications manager 1020 may be configured to perform various operations (e.g., receiving, monitoring, transmitting) using or otherwise in cooperation with the transceiver 1015 or the one or more antennas 1025. Although the communications manager 1020 is illustrated as a separate component, in some aspects, one or more functions described with reference to the communications manager 1020 may be supported by or performed by the processor 1040, the memory 1030, or the code 1035. For example, the code 1035 may include instructions executable by the processor 1040 to cause the device 1005 to perform various aspects of measurement configuration and validation for small data transmission as described herein, or the processor 1040 and the memory 1030 may be otherwise configured to perform or support such operations.

Figure 11:
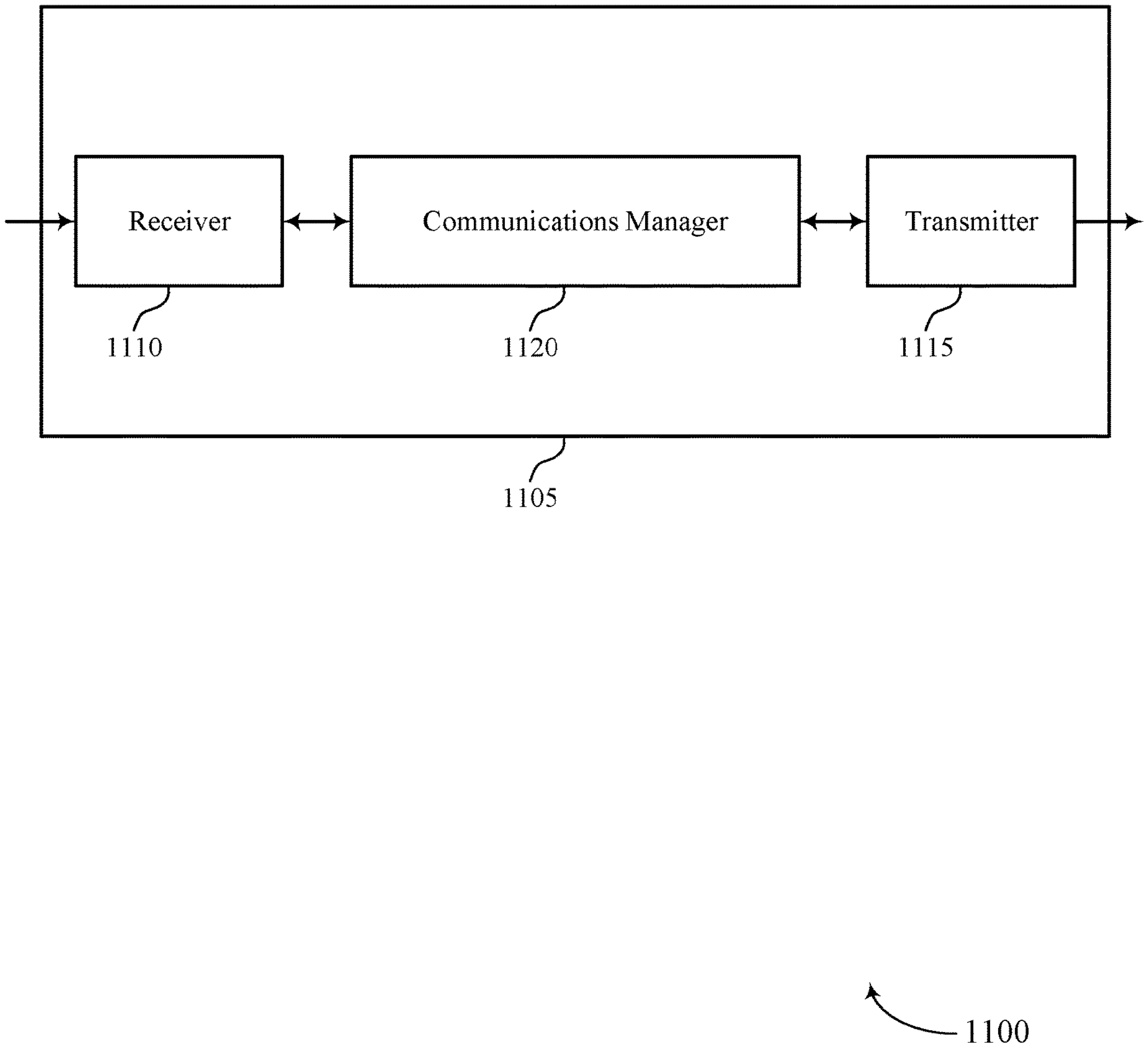
FIGS. 11 and 12 illustrate block diagrams of devices that support measurement configuration and validation for small data transmission in accordance with one or more aspects of the present disclosure.

FIG. 11 illustrates a block diagram 1100 of a device 1105 that supports measurement configuration and validation for small data transmission in accordance with one or more aspects of the present disclosure. The device 1105 may be an example of aspects of a network entity 105 as described herein. The device 1105 may include a receiver 1110, a transmitter 1115, and a communications manager 1120. The device 1105 may also include a processor. Each of these components may be in communication with one another (e.g., via one or more buses).

The receiver 1110 may provide a means for obtaining (e.g., receiving, determining, identifying) information such as user data or control information (e.g., I/Q samples, symbols, packets, protocol data units, service data units) associated with various channels (e.g., control channels, data channels, information channels, channels associated with a protocol stack). Information may be passed on to other components of the device 1105. In some aspects, the receiver 1110 may support obtaining information by receiving signals via one or more antennas. Additionally, or alternatively, the receiver 1110 may support obtaining information by receiving signals via one or more wired (e.g., electrical, fiber optic) interfaces or wireless interfaces.

The transmitter 1115 may provide a means for outputting (e.g., transmitting, providing, conveying, sending) information generated by other components of the device 1105. For example, the transmitter 1115 may output information such as user data or control information (e.g., I/Q samples, symbols, packets, protocol data units, service data units) associated with various channels (e.g., control channels, data channels, information channels, channels associated with a protocol stack). In some aspects, the transmitter 1115 may support outputting information by transmitting signals via one or more antennas. Additionally, or alternatively, the transmitter 1115 may support outputting information by transmitting signals via one or more wired (e.g., electrical, fiber optic) interfaces or wireless interfaces. In some aspects, the transmitter 1115 and the receiver 1110 may be co-located in a transceiver, which may include or be coupled with a modem.

The communications manager 1120, the receiver 1110, the transmitter 1115, or various combinations thereof or various components thereof may be examples of means for performing various aspects of measurement configuration and validation for small data transmission as described herein. For example, the communications manager 1120, the receiver 1110, the transmitter 1115, or various combinations or components thereof may support a method for performing one or more of the functions described herein.

In some aspects, the communications manager 1120, the receiver 1110, the transmitter 1115, or various combinations or components thereof may be implemented in hardware (e.g., in communications management circuitry). The hardware may include a processor, a DSP, a CPU, an ASIC, an FPGA or other programmable logic device, a microcontroller, discrete gate or transistor logic, or discrete hardware components configured as or otherwise supporting a means for performing the functions described in the present disclosure. In some aspects, a processor and memory coupled with the processor may be configured to perform one or more of the functions described herein (e.g., by executing, by the processor, instructions stored in the memory).

Additionally, or alternatively, in some aspects, the communications manager 1120, the receiver 1110, the transmitter 1115, or various combinations or components thereof may be implemented in code (e.g., as communications management software or firmware) executed by a processor. If implemented in code executed by a processor, the functions of the communications manager 1120, the receiver 1110, the transmitter 1115, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some aspects, the communications manager 1120 may be configured to perform various operations (e.g., receiving, obtaining, monitoring, outputting, transmitting) using or otherwise in cooperation with the receiver 1110 or the transmitter 1115. For example, the communications manager 1120 may receive information from the receiver 1110, send information to the transmitter 1115, or be integrated in combination with the receiver 1110 or the transmitter 1115 to obtain information, output information, or perform various other operations as described herein.

For example, the communications manager 1120 may be configured as or otherwise support a means for transmitting, by a first network entity and in association with a connection-active state release for a second network entity, first information that indicates: communication resources for uplink communication by the second network entity while the second network entity is in a connection-inactive state, a TAC, measurement resources for a TAC validation procedure, TAC validation information, and measurement validation information, where the measurement validation information includes one or more timing-related criterion and one or more non-timing-related criterion. The communications manager 1120 may be configured as or otherwise support a means for receiving, while the second network entity is in the connection-inactive state, the uplink communication using the communication resources, the reception indicative that measurement information obtained by the second network entity based on the measurement resources is valid based on the measurement validation information.

For example, the communications manager 1120 may be configured as or otherwise support a means for transmitting, by a first network entity and in association with a connection-active state release for a second network entity, first information that indicates: communication resources for uplink communication by the second network entity while the second network entity is in a connection-inactive state, measurement resources for an uplink communication resources validation procedure, uplink communication resources validation information, and measurement validation information. The communications manager 1120 may be configured as or otherwise support a means for receiving, while the second network entity is in the connection-inactive state, the uplink communication using the communication resources, the reception indicative that measurement information obtained by the second network entity based on the measurement resources is valid based on the measurement validation information.

By including or configuring the communications manager 1120 in accordance with examples as described herein, the device 1105 (e.g., a processor controlling or otherwise coupled with the receiver 1110, the transmitter 1115, the communications manager 1120, or a combination thereof) may support techniques for reduced processing, reduced power consumption, and more efficient utilization of communication resources.

Figure 12:
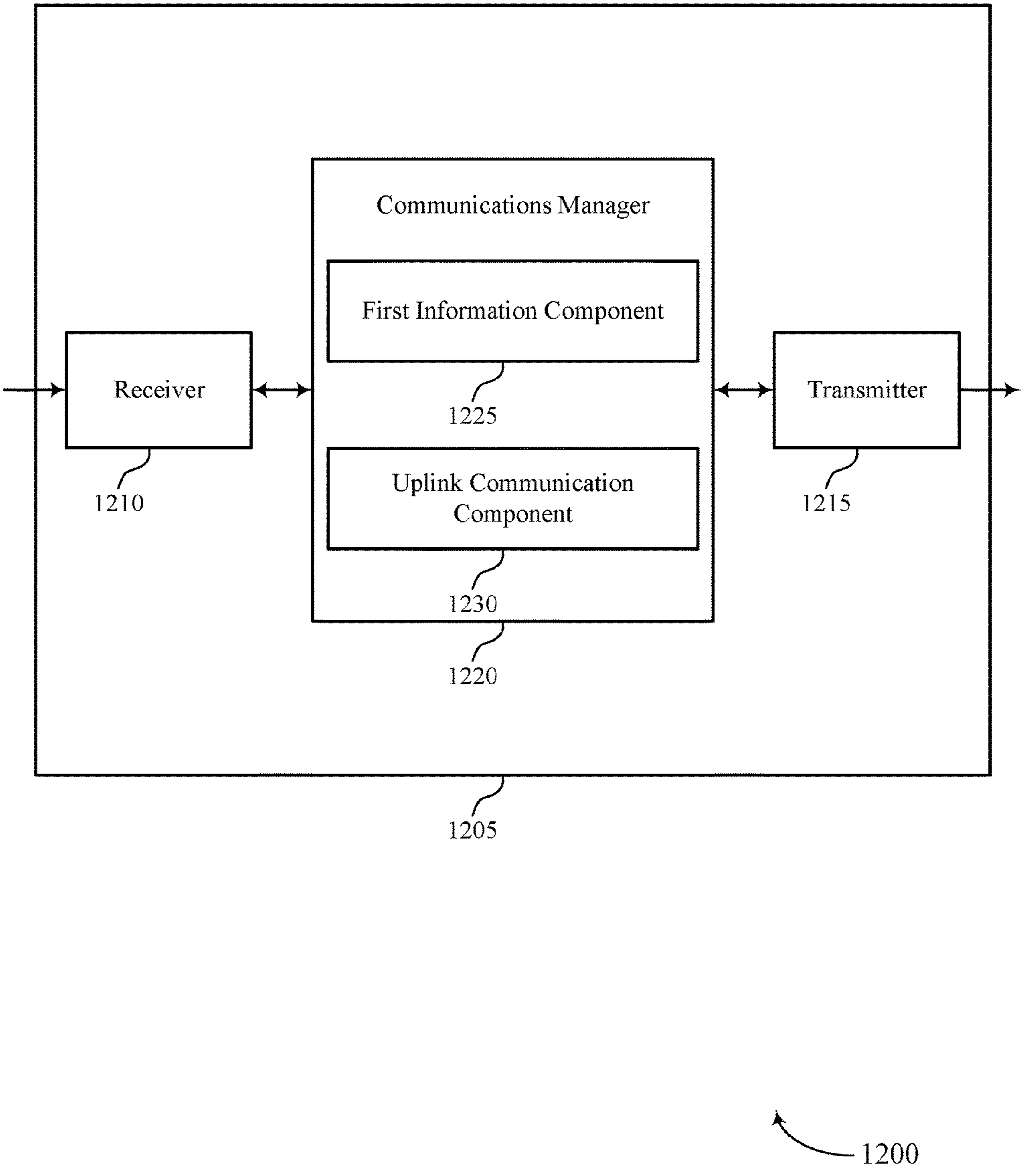

FIG. 12 illustrates a block diagram 1200 of a device 1205 that supports measurement configuration and validation for small data transmission in accordance with one or more aspects of the present disclosure. The device 1205 may be an example of aspects of a device 1105 or a network entity 105 as described herein. The device 1205 may include a receiver 1210, a transmitter 1215, and a communications manager 1220. The device 1205 may also include a processor. Each of these components may be in communication with one another (e.g., via one or more buses).

The receiver 1210 may provide a means for obtaining (e.g., receiving, determining, identifying) information such as user data or control information (e.g., I/Q samples, symbols, packets, protocol data units, service data units) associated with various channels (e.g., control channels, data channels, information channels, channels associated with a protocol stack). Information may be passed on to other components of the device 1205. In some aspects, the receiver 1210 may support obtaining information by receiving signals via one or more antennas. Additionally, or alternatively, the receiver 1210 may support obtaining information by receiving signals via one or more wired (e.g., electrical, fiber optic) interfaces or wireless interfaces.

The transmitter 1215 may provide a means for outputting (e.g., transmitting, providing, conveying, sending) information generated by other components of the device 1205. For example, the transmitter 1215 may output information such as user data or control information (e.g., I/Q samples, symbols, packets, protocol data units, service data units) associated with various channels (e.g., control channels, data channels, information channels, channels associated with a protocol stack). In some aspects, the transmitter 1215 may support outputting information by transmitting signals via one or more antennas. Additionally, or alternatively, the transmitter 1215 may support outputting information by transmitting signals via one or more wired (e.g., electrical, fiber optic) interfaces or wireless interfaces. In some aspects, the transmitter 1215 and the receiver 1210 may be co-located in a transceiver, which may include or be coupled with a modem.

The device 1205, or various components thereof, may be an example of means for performing various aspects of measurement configuration and validation for small data transmission as described herein. For example, the communications manager 1220 may include a first information component 1225 or an uplink communication component 1230. The communications manager 1220 may be an example of aspects of a communications manager 1120 as described herein. In some aspects, the communications manager 1220, or various components thereof, may be configured to perform various operations (e.g., receiving, obtaining, monitoring, outputting, transmitting) using or otherwise in cooperation with the receiver 1210 or the transmitter 1215. For example, the communications manager 1220 may receive information from the receiver 1210, send information to the transmitter 1215, or be integrated in combination with the receiver 1210 or the transmitter 1215 to obtain information, output information, or perform various other operations as described herein.

The first information component 1225 may be configured as or otherwise support a means for transmitting, by a first network entity and in association with a connection-active state release for a second network entity, first information that indicates: communication resources for uplink communication by the second network entity while the second network entity is in a connection-inactive state, a TAC, measurement resources for a TAC validation procedure, TAC validation information, and measurement validation information, where the measurement validation information includes one or more timing-related criterion and one or more non-timing-related criterion. The uplink communication component 1230 may be configured as or otherwise support a means for receiving, while the second network entity is in the connection-inactive state, the uplink communication using the communication resources, the reception indicative that measurement information obtained by the second network entity based on the measurement resources is valid based on the measurement validation information.

The first information component 1225 may be configured as or otherwise support a means for transmitting, by a first network entity and in association with a connection-active state release for a second network entity, first information that indicates: communication resources for uplink communication by the second network entity while the second network entity is in a connection-inactive state, measurement resources for an uplink communication resources validation procedure, uplink communication resources validation information, and measurement validation information. The uplink communication component 1230 may be configured as or otherwise support a means for receiving, while the second network entity is in the connection-inactive state, the uplink communication using the communication resources, the reception indicative that measurement information obtained by the second network entity based on the measurement resources is valid based on the measurement validation information.

Figure 13:
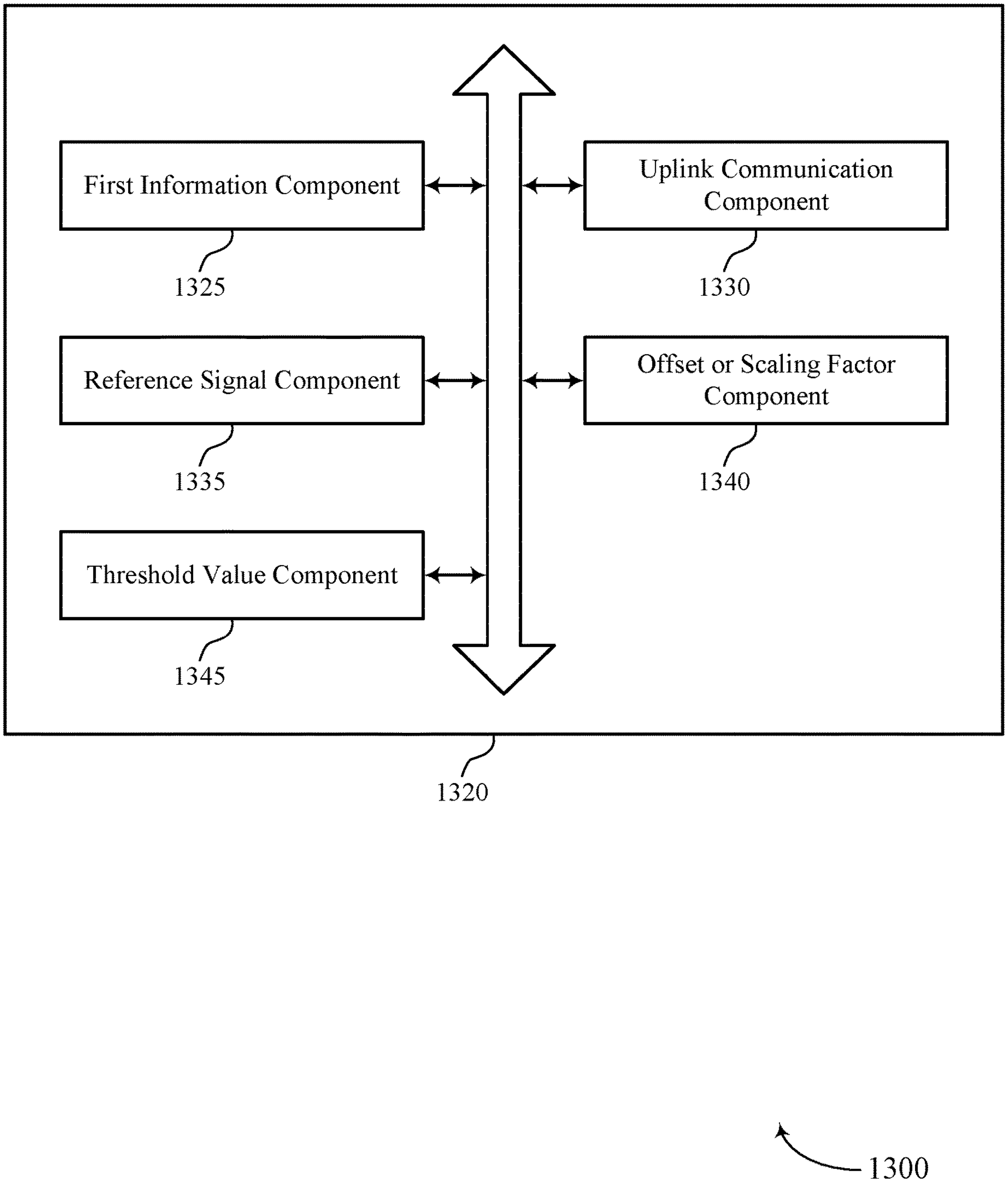
FIG. 13 illustrates a block diagram of a communications manager that supports measurement configuration and validation for small data transmission in accordance with one or more aspects of the present disclosure.

FIG. 13 illustrates a block diagram 1300 of a communications manager 1320 that supports measurement configuration and validation for small data transmission in accordance with one or more aspects of the present disclosure. The communications manager 1320 may be an example of aspects of a communications manager 1120 or a communications manager 1220, as described herein. The communications manager 1320, or various components thereof, may be an example of means for performing various aspects of measurement configuration and validation for small data transmission as described herein. For example, the communications manager 1320 may include a first information component 1325, an uplink communication component 1330, a reference signal component 1335, an offset or scaling factor component 1340, or a threshold value component 1345. Each of these components may communicate, directly or indirectly, with one another (e.g., via one or more buses) which may include communications within a protocol layer of a protocol stack, communications associated with a logical channel of a protocol stack (e.g., between protocol layers of a protocol stack, within a device, component, or virtualized component associated with a network entity 105, between devices, components, or virtualized components associated with a network entity 105).

The first information component 1325 may be configured as or otherwise support a means for transmitting, by a first network entity and in association with a connection-active state release for a second network entity, first information that indicates: communication resources for uplink communication by the second network entity while the second network entity is in a connection-inactive state, a TAC, measurement resources for a TAC validation procedure, TAC validation information, and measurement validation information, where the measurement validation information includes one or more timing-related criterion and one or more non-timing-related criterion. The uplink communication component 1330 may be configured as or otherwise support a means for receiving, while the second network entity is in the connection-inactive state, the uplink communication using the communication resources, the reception indicative that measurement information obtained by the second network entity based on the measurement resources is valid based on the measurement validation information.

In some aspects, the reference signal component 1335 may be configured as or otherwise support a means for transmitting a first instance of a reference signal within a first BWP that was used by the second network entity while in a connected state. In some aspects, the reference signal component 1335 may be configured as or otherwise support a means for transmitting a second instance of the reference signal within the first BWP that was used by the second network entity while in the connected state.

In some aspects, the reference signal component 1335 may be configured as or otherwise support a means for transmitting a first instance of a reference signal within a first BWP that was used by the second network entity while in a connected state. In some aspects, the reference signal component 1335 may be configured as or otherwise support a means for transmitting a second instance of the reference signal within a second BWP that was used by the second network entity while in the connection-inactive state.

In some aspects, the reference signal component 1335 may be configured as or otherwise support a means for transmitting a first instance of a reference signal within a second BWP that was used by the second network entity while in the connection-inactive state, where a first BWP was used by the first network entity while in a connected state. In some aspects, the reference signal component 1335 may be configured as or otherwise support a means for transmitting a second instance of the reference signal within the second BWP that was used by the second network entity while in the connection-inactive state.

In some aspects, the offset or scaling factor component 1340 may be configured as or otherwise support a means for transmitting an offset or a scaling factor for application by the second network entity to at least one of a first reference signal measurement information, a second reference signal measurement information, or a threshold difference between the first reference signal measurement information and the second reference signal measurement information. In some aspects, the non-timing-related criterion indicates that a first reference signal measurement information and a second reference signal measurement information are within a same frequency range.

In some aspects, the timing-related criterion indicates a first time at which a first reference signal measurement information is obtained by the second network entity, a second time at which the second reference signal measurement information is obtained by the second network entity, a TAC validation time, and a transmission time for transmission of the uplink communication. In some aspects, the timing-related criterion indicates that the first time is prior to the second time, which is prior to or at a same time as the TAC validation time, which is prior to the transmission time.

In some aspects, the timing-related criterion indicates that a difference between the TAC validation time and the second time is less than or equal to a delta time threshold. In some aspects, the delta time threshold has a value greater than zero and is based on one or more of a frequency range of the uplink communication, a discontinuous reception cycle length associated with the second network entity in the connection-inactive state, a measurement window configuration for a set of multiple reference resources associated with the TAC validation procedure, a type and a configuration of a reference signal, and a configuration of receive antennas used to obtain the second reference signal measurement information at the second measurement time.

In some aspects, the timing-related criterion indicates that a difference between the transmission time and the TAC validation time is less than or equal to a delta time threshold. In some aspects, the delta time threshold has a value greater than zero.

In some aspects, the timing-related criterion indicates that a difference between a message arrival time and the first time is less than or equal to a delta time threshold. In some aspects, the message arrival time is a most recent time at which the second network entity receives a TAC of a primary TA group or receives the first information. In some aspects, the delta time threshold has a value greater than zero and is based on one or more of a frequency range of the uplink communication, a discontinuous reception cycle length associated with the second network entity, a measurement window configuration for a set of multiple reference resources associated with the TAC validation procedure, a type and a configuration of a reference signal, and a configuration of receive antennas used to obtain the first reference signal measurement information at the first time.

In some aspects, the threshold value component 1345 may be configured as or otherwise support a means for transmitting an indication of a first threshold value associated with a difference between the TAC validation time and the second time, a second threshold value associated with a difference between the transmission time and the TAC validation time, and a third threshold value associated with a difference between a message arrival time and the first time, where the message arrival time is a most recent time at which the first network entity transmits a TAC of a primary TA group or transmits the first information.

In some aspects, the uplink communication includes an initial CG-SDT transmission or an autonomous retransmission prior to receiving a response message for the initial CG-SDT transmission.

In some aspects, the first information component 1325 may be configured as or otherwise support a means for transmitting, by a first network entity and in association with a connection-active state release for a second network entity, first information that indicates: communication resources for uplink communication by the second network entity while the second network entity is in a connection-inactive state, measurement resources for an uplink communication resources validation procedure, uplink communication resources validation information, and measurement validation information. In some aspects, the uplink communication component 1330 may be configured as or otherwise support a means for receiving, while the second network entity is in the connection-inactive state, the uplink communication using the communication resources, the reception indicative that measurement information obtained by the second network entity based on the measurement resources is valid based on the measurement validation information.

In some aspects, the reference signal component 1335 may be configured as or otherwise support a means for transmitting a reference signal within a first BWP that was used by the second network entity while in a connected state or a second BWP that was used by the second network entity while in the connection-inactive state. In some aspects, the communication resources that are validated are in a same frequency range as the measurement resources.

In some aspects, to support receiving the uplink communication, the uplink communication component 1330 may be configured as or otherwise support a means for receiving a set of multiple uplink communications over a corresponding set of multiple validated uplink transmission occasions.

In some aspects, the reference signal component 1335 may be configured as or otherwise support a means for transmitting second information that indicates a set of multiple reference resources for validation of the measurement information, each of the set of multiple reference resources being associated with a different one of the set of multiple validated uplink transmission occasions.

In some aspects, the offset or scaling factor component 1340 may be configured as or otherwise support a means for transmitting an offset or a scaling factor for application to at least one of the measurement information or a set of threshold measurement values. In some aspects, the measurement validation information indicates that a set of multiple reference resources for the measurement information correspond to a resource map between the measurement resources which and the communication resources indicated in the first information.

In some aspects, the measurement validation information indicates a first time at which a first reference signal measurement information is obtained, a communication resource validation time, a transmission time for transmission of the uplink communication, and a delta time. In some aspects, the measurement validation information indicates that the first time is prior to or at a same time as the communication resource validation time, which is prior to the transmission time. In some aspects, the measurement validation information indicates that a difference between the communication resource validation time and the first time is less than or equal to the delta time.

In some aspects, the delta time has a value greater than zero and is based on one or more of a frequency range of the uplink communication, a discontinuous reception cycle length associated with a second network entity, a measurement window configuration for the reference signal associated with communication resource validation, a type of a reference signal which is a basis for the reference signal measurement information, a configuration of receive antennas used to obtain the reference signal measurement information at the first time, a transmission power associated with the reference signal measurement information, and a configuration of receive antennas used for downlink channel reception.

Figure 14:
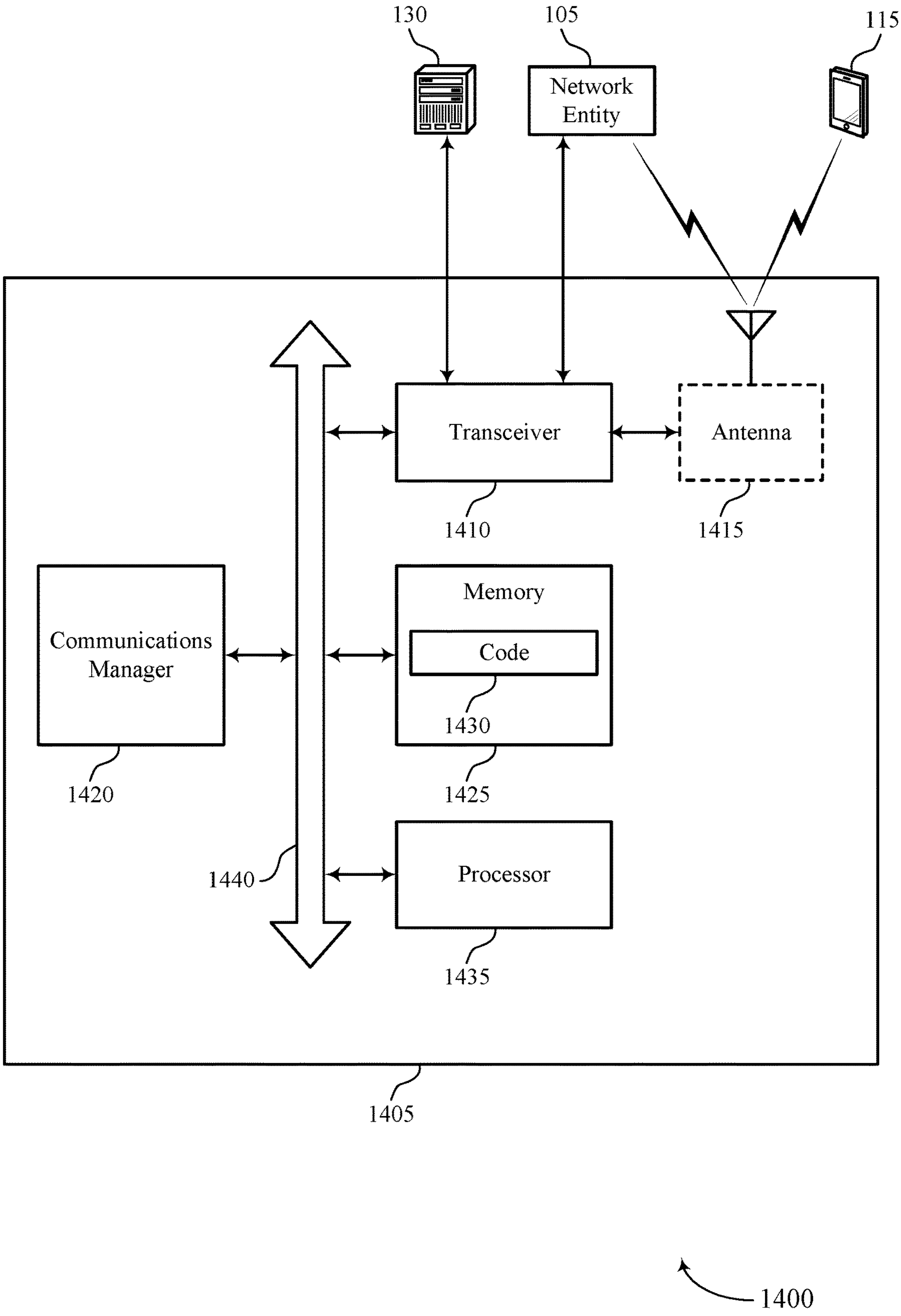
FIG. 14 illustrates a diagram of a system including a device that supports measurement configuration and validation for small data transmission in accordance with one or more aspects of the present disclosure.

FIG. 14 illustrates a diagram of a system 1400 including a device 1405 that supports measurement configuration and validation for small data transmission in accordance with one or more aspects of the present disclosure. The device 1405 may be an example of or include the components of a device 1105, a device 1205, or a network entity 105 as described herein. The device 1405 may communicate with one or more network entities 105 or one or more UEs 115, which may include communications over one or more wired interfaces or over one or more wireless interfaces. The device 1405 may include components that support outputting and obtaining communications, such as a communications manager 1420, a transceiver 1410, an antenna 1415, a memory 1425, code 1430, and a processor 1435. These components may be in electronic communication or otherwise coupled (e.g., operatively, communicatively, functionally, electronically, electrically) via one or more buses (e.g., a bus 1440).

The transceiver 1410 may support bi-directional communications via wired links or wireless links, as described herein. In some aspects, the transceiver 1410 may include a wired transceiver and may communicate bi-directionally with another wired transceiver. Additionally, or alternatively, in some aspects, the transceiver 1410 may include a wireless transceiver and may communicate bi-directionally with another wireless transceiver. In some aspects, the device 1405 may include one or more antennas 1415, which may be capable of transmitting or receiving wireless transmissions (e.g., concurrently). The transceiver 1410 may also include a modem to modulate signals, to provide the modulated signals for transmission (e.g., by one or more antennas 1415, by a wired transmitter), to receive modulated signals (e.g., from one or more antennas 1415, from a wired receiver), and to demodulate signals. In some implementations, the transceiver 1410 may include one or more interfaces, such as one or more interfaces coupled with the one or more antennas 1415 that are configured to support various receiving or obtaining operations, or one or more interfaces coupled with the one or more antennas 1415 that are configured to support various transmitting or outputting operations, or a combination thereof. In some implementations, the transceiver 1410 may include or be configured for coupling with one or more processors or memory components that are operable to perform or support operations based on received or obtained information or signals, or to generate information or other signals for transmission or other outputting. In some implementations, the transceiver 1410, or the transceiver 1410 and the one or more antennas 1415, or the transceiver 1410 and the one or more antennas 1415 and one or more processors or memory components (for example, the processor 1435 or the memory 1425), may be included in a chip or chip assembly that is installed in the device 1405. In some aspects, the transceiver may be operable to support communications via one or more communications links (e.g., a communication link 125, a backhaul communication link 120, a midhaul communication link 162, a fronthaul communication link 168).

The memory 1425 may include RAM and ROM. The memory 1425 may store computer-readable, computer-executable code 1430 including instructions that, when executed by the processor 1435, cause the device 1405 to perform various functions described herein. The code 1430 may be stored in a non-transitory computer-readable medium such as system memory or another type of memory. In some cases, the code 1430 may not be directly executable by the processor 1435 but may cause a computer (e.g., when compiled and executed) to perform functions described herein. In some cases, the memory 1425 may contain, among other things, a BIOS which may control basic hardware or software operation such as the interaction with peripheral components or devices.

The processor 1435 may include an intelligent hardware device (e.g., a general-purpose processor, a DSP, an ASIC, a CPU, an FPGA, a microcontroller, a programmable logic device, discrete gate or transistor logic, or a discrete hardware component). In some cases, the processor 1435 may be configured to operate a memory array using a memory controller. In some other cases, a memory controller may be integrated into the processor 1435. The processor 1435 may be configured to execute computer-readable instructions stored in a memory (e.g., the memory 1425) to cause the device 1405 to perform various functions (e.g., functions or tasks supporting small data transmission). For example, the device 1405 or a component of the device 1405 may include a processor 1435 and memory 1425 coupled with the processor 1435, the processor 1435 and memory 1425 configured to perform various functions described herein. The processor 1435 may be an example of a cloud-computing platform (e.g., one or more physical nodes and supporting software such as operating systems, virtual machines, or container instances) that may host the functions (e.g., by executing code 1430) to perform the functions of the device 1405. The processor 1435 may be any one or more suitable processors capable of executing scripts or instructions of one or more software programs stored in the device 1405 (such as within the memory 1425). In some implementations, the processor 1435 may be a component of a processing system. A processing system may generally refer to a system or series of machines or components that receives inputs and processes the inputs to produce a set of outputs (which may be passed to other systems or components of, for example, the device 1405). For example, a processing system of the device 1405 may refer to a system including the various other components or subcomponents of the device 1405, such as the processor 1435, or the transceiver 1410, or the communications manager 1420, or other components or combinations of components of the device 1405. The processing system of the device 1405 may interface with other components of the device 1405, and may process information received from other components (such as inputs or signals) or output information to other components. For example, a chip or modem of the device 1405 may include a processing system and one or more interfaces to output information or to obtain information. The one or more interfaces may be implemented as or otherwise include a first interface configured to output information and a second interface configured to obtain information, or a same interface configured to output information and to obtain information, among other implementations. In some implementations, the one or more interfaces may refer to an interface between the processing system of the chip or modem and a transmitter, such that the device 1405 may transmit information output from the chip or modem. Additionally, or alternatively, in some implementations, the one or more interfaces may refer to an interface between the processing system of the chip or modem and a receiver, such that the device 1405 may obtain information or signal inputs, and the information may be passed to the processing system. A person having ordinary skill in the art will readily recognize that a first interface also may obtain information or signal inputs, and a second interface also may output information or signal outputs.

In some aspects, a bus 1440 may support communications of (e.g., within) a protocol layer of a protocol stack. In some aspects, a bus 1440 may support communications associated with a logical channel of a protocol stack (e.g., between protocol layers of a protocol stack), which may include communications performed within a component of the device 1405, or between different components of the device 1405 that may be co-located or located in different locations (e.g., where the device 1405 may refer to a system in which one or more of the communications manager 1420, the transceiver 1410, the memory 1425, the code 1430, and the processor 1435 may be located in one of the different components or divided between different components).

In some aspects, the communications manager 1420 may manage aspects of communications with a core network 130 (e.g., via one or more wired or wireless backhaul links). For example, the communications manager 1420 may manage the transfer of data communications for client devices, such as one or more UEs 115. In some aspects, the communications manager 1420 may manage communications with other network entities 105, and may include a controller or scheduler for controlling communications with UEs 115 in cooperation with other network entities 105. In some aspects, the communications manager 1420 may support an X2 interface within an LTE/LTE-A wireless communications network technology to provide communication between network entities 105.

For example, the communications manager 1420 may be configured as or otherwise support a means for transmitting, by a first network entity and in association with a connection-active state release for a second network entity, first information that indicates: communication resources for uplink communication by the second network entity while the second network entity is in a connection-inactive state, a TAC, measurement resources for a TAC validation procedure, TAC validation information, and measurement validation information, where the measurement validation information includes one or more timing-related criterion and one or more non-timing-related criterion. The communications manager 1420 may be configured as or otherwise support a means for receiving, while the second network entity is in the connection-inactive state, the uplink communication using the communication resources, the reception indicative that measurement information obtained by the second network entity based on the measurement resources is valid based on the measurement validation information.

For example, the communications manager 1420 may be configured as or otherwise support a means for transmitting, by a first network entity and in association with a connection-active state release for a second network entity, first information that indicates: communication resources for uplink communication by the second network entity while the second network entity is in a connection-inactive state, measurement resources for an uplink communication resources validation procedure, uplink communication resources validation information, and measurement validation information. The communications manager 1420 may be configured as or otherwise support a means for receiving, while the second network entity is in the connection-inactive state, the uplink communication using the communication resources, the reception indicative that measurement information obtained by the second network entity based on the measurement resources is valid based on the measurement validation information.

By including or configuring the communications manager 1420 in accordance with examples as described herein, the device 1405 may support techniques for improved communication reliability, reduced latency, and improved coordination between devices.

In some aspects, the communications manager 1420 may be configured to perform various operations (e.g., receiving, obtaining, monitoring, outputting, transmitting) using or otherwise in cooperation with the transceiver 1410, or the one or more antennas 1415 (e.g., where applicable). Although the communications manager 1420 is illustrated as a separate component, in some aspects, one or more functions described with reference to the communications manager 1420 may be supported by or performed by the transceiver 1410, the processor 1435, the memory 1425, or the code 1430. For example, the code 1430 may include instructions executable by the processor 1435 to cause the device 1405 to perform various aspects of measurement configuration and validation for small data transmission as described herein, or the processor 1435 and the memory 1425 may be otherwise configured to perform or support such operations.

Figure 15:
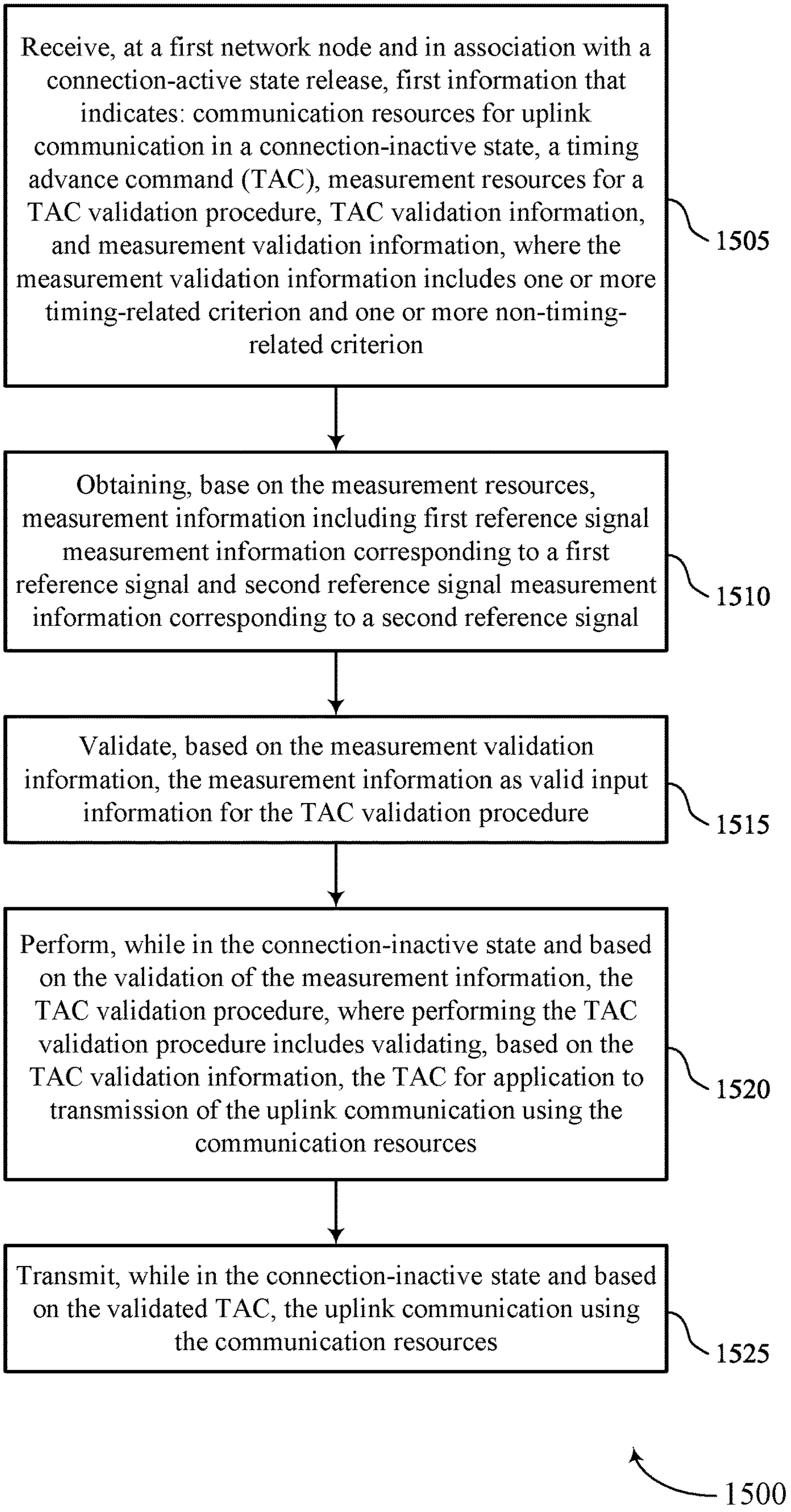

FIG. 15 illustrates a flowchart showing a method 1500 that supports measurement configuration and validation for small data transmission in accordance with one or more aspects of the present disclosure. The operations of the method 1500 may be implemented by a UE or its components as described herein. For example, the operations of the method 1500 may be performed by a UE 115 as described with reference to FIGS. 1 through 10. In some aspects, a UE may execute a set of instructions to control the functional elements of the UE to perform the described functions. Additionally, or alternatively, the UE may perform aspects of the described functions using special-purpose hardware.

At 1505, the method may include receiving, at a first network entity and in association with a connection-active state release, first information that indicates: communication resources for uplink communication in a connection-inactive state, a TAC, measurement resources for a TAC validation procedure, TAC validation information, and measurement validation information, where the measurement validation information includes one or more timing-related criterion and one or more non-timing-related criterion. The operations of 1505 may be performed in accordance with examples as disclosed herein. In some aspects, aspects of the operations of 1505 may be performed by a first information component 925 as described with reference to FIG. 9.

At 1510, the method may include obtaining, based on the measurement resources, measurement information including first reference signal measurement information corresponding to a first reference signal and second reference signal measurement information corresponding to a second reference signal. The operations of 1510 may be performed in accordance with examples as disclosed herein. In some aspects, aspects of the operations of 1510 may be performed by a measurement information component 930 as described with reference to FIG. 9.

At 1515, the method may include validating, based on the measurement validation information, the measurement information as valid input information for the TAC validation procedure. The operations of 1515 may be performed in accordance with examples as disclosed herein. In some aspects, aspects of the operations of 1515 may be performed by a measurement validation component 935 as described with reference to FIG. 9.

At 1520, the method may include performing, while in the connection-inactive state and based on the validation of the measurement information, the TAC validation procedure, where performing the TAC validation procedure includes validating, based on the TAC validation information, the TAC for application to transmission of the uplink communication using the communication resources. The operations of 1520 may be performed in accordance with examples as disclosed herein. In some aspects, aspects of the operations of 1520 may be performed by a TAC validation component 940 as described with reference to FIG. 9.

At 1525, the method may include transmitting, while in the connection-inactive state and based on the validated TAC, the uplink communication using the communication resources. The operations of 1525 may be performed in accordance with examples as disclosed herein. In some aspects, aspects of the operations of 1525 may be performed by an uplink communication component 945 as described with reference to FIG. 9.

Figure 16:
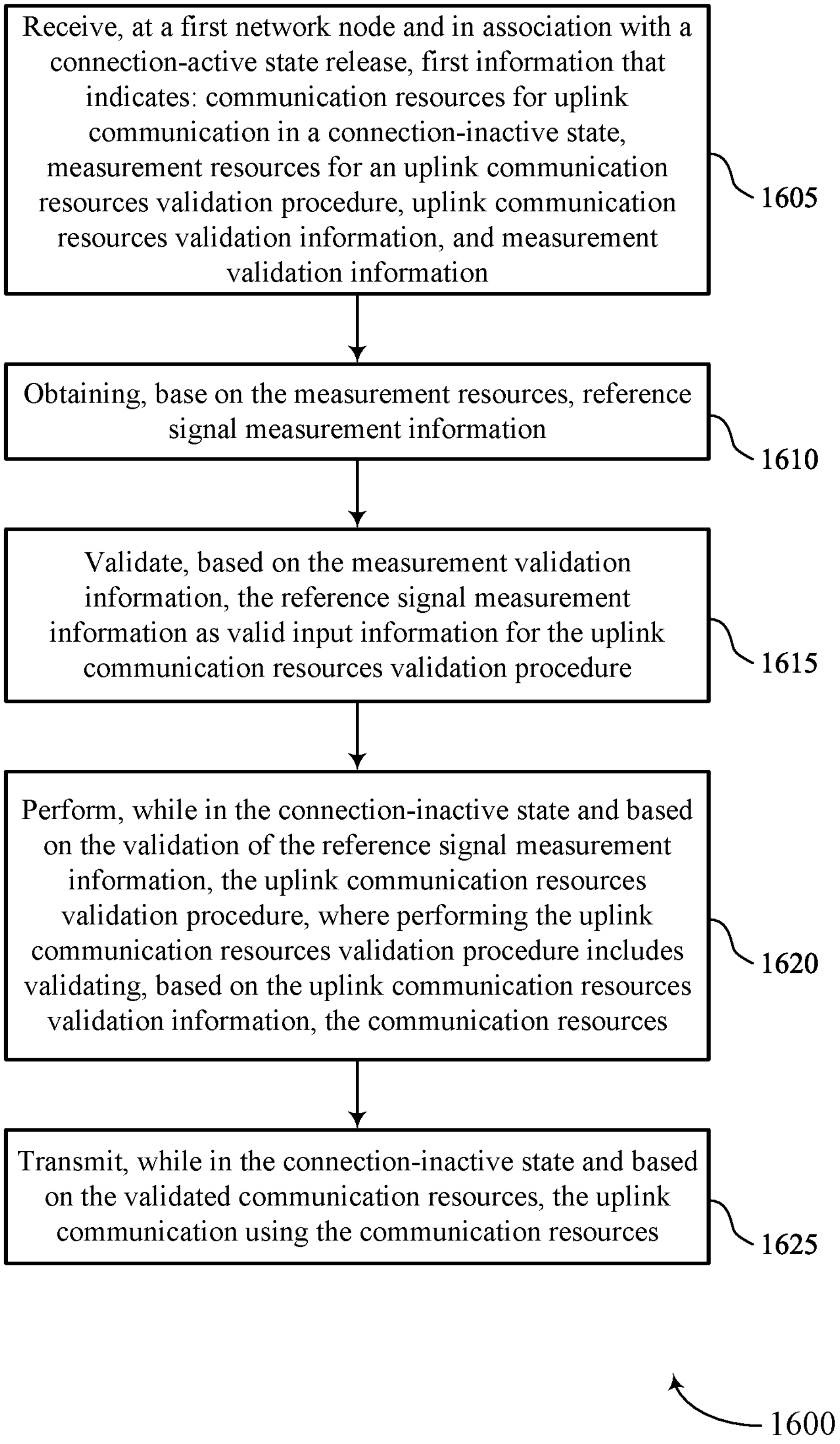

FIG. 16 illustrates a flowchart showing a method 1600 that supports measurement configuration and validation for small data transmission in accordance with one or more aspects of the present disclosure. The operations of the method 1600 may be implemented by a UE or its components as described herein. For example, the operations of the method 1600 may be performed by a UE 115 as described with reference to FIGS. 1 through 10. In some aspects, a UE may execute a set of instructions to control the functional elements of the UE to perform the described functions. Additionally, or alternatively, the UE may perform aspects of the described functions using special-purpose hardware.

At 1605, the method may include receiving, at a first network entity and in association with a connection-active state release, first information that indicates: communication resources for uplink communication in a connection-inactive state, measurement resources for an uplink communication resources validation procedure, uplink communication resources validation information, and measurement validation information. The operations of 1605 may be performed in accordance with examples as disclosed herein. In some aspects, aspects of the operations of 1605 may be performed by a first information component 925 as described with reference to FIG. 9.

At 1610, the method may include obtaining, based on the measurement resources, reference signal measurement information. The operations of 1610 may be performed in accordance with examples as disclosed herein. In some aspects, aspects of the operations of 1610 may be performed by a measurement information component 930 as described with reference to FIG. 9.

At 1615, the method may include validating, based on the measurement validation information, the reference signal measurement information as valid input information for the uplink communication resources validation procedure. The operations of 1615 may be performed in accordance with examples as disclosed herein. In some aspects, aspects of the operations of 1615 may be performed by a measurement validation component 935 as described with reference to FIG. 9.

At 1620, the method may include performing, while in the connection-inactive state and based on the validation of the reference signal measurement information, the uplink communication resources validation procedure, where performing the uplink communication resources validation procedure includes validating, based on the uplink communication resources validation information, the communication resources. The operations of 1620 may be performed in accordance with examples as disclosed herein. In some aspects, aspects of the operations of 1620 may be performed by an uplink communication resource validation component 950 as described with reference to FIG. 9.

At 1625, the method may include transmitting, while in the connection-inactive state and based on the validated communication resources, the uplink communication using the communication resources. The operations of 1625 may be performed in accordance with examples as disclosed herein. In some aspects, aspects of the operations of 1625 may be performed by an uplink communication component 945 as described with reference to FIG. 9.

FIG. 17 illustrates a flowchart showing a method 1700 that supports measurement configuration and validation for small data transmission in accordance with one or more aspects of the present disclosure. The operations of the method 1700 may be implemented by a network entity or its components as described herein. For example, the operations of the method 1700 may be performed by a network entity as described with reference to FIGS. 1 through 6 and 11 through 14. In some aspects, a network entity may execute a set of instructions to control the functional elements of the network entity to perform the described functions. Additionally, or alternatively, the network entity may perform aspects of the described functions using special-purpose hardware.

At 1705, the method may include transmitting, by a first network entity and in association with a connection-active state release for a second network entity, first information that indicates: communication resources for uplink communication by the second network entity while the second network entity is in a connection-inactive state, a TAC, measurement resources for a TAC validation procedure, TAC validation information, and measurement validation information, where the measurement validation information includes one or more timing-related criterion and one or more non-timing-related criterion. The operations of 1705 may be performed in accordance with examples as disclosed herein. In some aspects, aspects of the operations of 1705 may be performed by a first information component 1325 as described with reference to FIG. 13.

At 1710, the method may include receiving, while the second network entity is in the connection-inactive state, the uplink communication using the communication resources, the reception indicative that measurement information obtained by the second network entity based on the measurement resources is valid based on the measurement validation information. The operations of 1710 may be performed in accordance with examples as disclosed herein. In some aspects, aspects of the operations of 1710 may be performed by an uplink communication component 1330 as described with reference to FIG. 13.

FIG. 18 illustrates a flowchart showing a method 1800 that supports measurement configuration and validation for small data transmission in accordance with one or more aspects of the present disclosure. The operations of the method 1800 may be implemented by a network entity or its components as described herein. For example, the operations of the method 1800 may be performed by a network entity as described with reference to FIGS. 1 through 6 and 11 through 14. In some aspects, a network entity may execute a set of instructions to control the functional elements of the network entity to perform the described functions. Additionally, or alternatively, the network entity may perform aspects of the described functions using special-purpose hardware.

At 1805, the method may include transmitting, by a first network entity and in association with a connection-active state release for a second network entity, first information that indicates: communication resources for uplink communication by the second network entity while the second network entity is in a connection-inactive state, measurement resources for an uplink communication resources validation procedure, uplink communication resources validation information, and measurement validation information. The operations of 1805 may be performed in accordance with examples as disclosed herein. In some aspects, aspects of the operations of 1805 may be performed by a first information component 1325 as described with reference to FIG. 13.

At 1810, the method may include receiving, while the second network entity is in the connection-inactive state, the uplink communication using the communication resources, the reception indicative that measurement information obtained by the second network entity based on the measurement resources is valid based on the measurement validation information. The operations of 1810 may be performed in accordance with examples as disclosed herein. In some aspects, aspects of the operations of 1810 may be performed by an uplink communication component 1330 as described with reference to FIG. 13.

The following provides an overview of aspects of the present disclosure:

Aspect 1: A method of wireless communication, comprising: receiving, at a first network entity and in association with a connection-active state release, first information that indicates: communication resources for uplink communication in a connection-inactive state, a timing advance command (TAC), measurement resources for a TAC validation procedure, TAC validation information, and measurement validation information, wherein the measurement validation information includes one or more timing-related criterion and one or more non-timing-related criterion; obtaining, based on the measurement resources, measurement information including first reference signal measurement information corresponding to a first reference signal and second reference signal measurement information corresponding to a second reference signal; validating, based on the measurement validation information, the measurement information as valid input information for the TAC validation procedure; performing, while in the connection-inactive state and based on the validation of the measurement information, the TAC validation procedure, wherein performing the TAC validation procedure comprises validating, based on the TAC validation information, the TAC for application to transmission of the uplink communication using the communication resources; and transmitting, while in the connection-inactive state and based on the validated TAC, the uplink communication using the communication resources.

Aspect 2: The method of aspect 1, wherein obtaining the measurement information comprises: receiving and measuring a first instance of a reference signal within a first BWP that was used by the first network entity while in a connected state; and receiving and measuring a second instance of the reference signal within the first BWP that was used by the first network entity while in the connected state.

Aspect 3: The method of any of aspects 1 through 2, wherein obtaining the measurement information comprises: receiving and measuring a first instance of a reference signal within a first BWP that was used by the first network entity while in a connected state; and receiving and measuring a second instance of the reference signal within a second BWP that was used by the first network entity while in the connection-inactive state.

Aspect 4: The method of any of aspects 1 through 3, wherein obtaining the measurement information comprises: receiving and measuring a first instance of a reference signal within a second BWP that was used by the first network entity while in the connection-inactive state, wherein a first BWP was used by the first network entity while in a connected state; and receiving and measuring a second instance of the reference signal within the second BWP that was used by the first network entity while in the connection-inactive state.

Aspect 5: The method of any of aspects 1 through 4, wherein performing the TAC validation procedure comprises: comparing a difference between the first reference signal measurement information and the second reference signal measurement information with a threshold difference.

Aspect 6: The method of aspect 5, further comprising: applying an offset or a scaling factor to at least one of the first reference signal measurement information, the second reference signal measurement information, or the threshold difference based on the first reference signal measurement information and the second reference signal measurement information being associated with different configurations of reference signals, different carrier frequencies, different configurations of receive antennas, or different transmit powers of the reference signals.

Aspect 7: The method of aspect 6, wherein applying the offset or the scaling factor further comprises: receiving the offset or the scaling factor for application to at least one of the first reference signal measurement information, the second reference signal measurement information, or the threshold difference.

Aspect 8: The method of any of aspects 1 through 7, wherein the non-timing-related criterion indicates that the first reference signal measurement information and the second reference signal measurement information are obtained within a same frequency range.

Aspect 9: The method of any of aspects 1 through 8, wherein the timing-related criterion indicates a first time at which the first reference signal measurement information is obtained, a second time at which the second reference signal measurement information is obtained, a TAC validation time, and a transmission time for transmission of the uplink communication, and the timing-related criterion indicates that the first time is prior to the second time, which is prior to or at a same time as the TAC validation time, which is prior to the transmission time.

Aspect 10: The method of aspect 9, wherein the timing-related criterion indicates that a difference between the TAC validation time and the second time is less than or equal to a delta time threshold, the delta time threshold has a value greater than zero and is based on one or more of a frequency range of the uplink communication, a DRX cycle length associated with the first network entity in the connection-inactive state, a measurement window configuration for a plurality of reference resources associated with the TAC validation procedure, a type and a configuration of the second reference signal, and a configuration of receive antennas used to obtain the second reference signal measurement information at the second time.

Aspect 11: The method of any of aspects 9 through 10, wherein the timing-related criterion indicates that a difference between the transmission time and the TAC validation time is less than or equal to a delta time threshold, the delta time threshold has a value greater than zero.

Aspect 12: The method of any of aspects 9 through 11, wherein the timing-related criterion indicates that a difference between a message arrival time and the first time is less than or equal to a delta time threshold, the message arrival time is a most recent time at which the first network entity receives a TAC of a primary TAG or receives the first information, and the delta time threshold has a value greater than zero and is based on one or more of a frequency range of the uplink communication, a DRX cycle length associated with the first network entity, a measurement window configuration for a plurality of reference resources associated with the TAC validation procedure, a type and a configuration of the first reference signal, and a configuration of receive antennas used to obtain the first reference signal measurement information at the first time.

Aspect 13: The method of any of aspects 9 through 12, further comprising: receiving an indication of a first threshold value associated with a difference between the TAC validation time and the second time, a second threshold value associated with a difference between the transmission time and the TAC validation time, and a third threshold value associated with a difference between a message arrival time and the first time, wherein the message arrival time is a most recent time at which the first network entity receives a TAC of a primary TAG or receives the first information.

Aspect 14: The method of any of aspects 1 through 13, wherein the uplink communication comprises an initial CG (CG)-small data transmission (SDT) or an autonomous retransmission prior to receiving a response message for the initial CG-SDT transmission.

Aspect 15: A method of wireless communication, comprising: receiving, at a first network entity and in association with a connection-active state release, first information that indicates: communication resources for uplink communication in a connection-inactive state, measurement resources for an uplink communication resources validation procedure, uplink communication resources validation information, and measurement validation information; obtaining, based on the measurement resources, reference signal measurement information; validating, based on the measurement validation information, the reference signal measurement information as valid input information for the uplink communication resources validation procedure; performing, while in the connection-inactive state and based on the validation of the reference signal measurement information, the uplink communication resources validation procedure, wherein performing the uplink communication resources validation procedure comprises validating, based on the uplink communication resources validation information, the communication resources; and transmitting, while in the connection-inactive state and based on the validated communication resources, the uplink communication using the communication resources.

Aspect 16: The method of aspect 15, wherein obtaining the reference signal measurement information comprises: receiving and measuring a reference signal within a first BWP that was used by the first network entity while in a connected state or a second BWP that was used by the first network entity while in the connection-inactive state.

Aspect 17: The method of any of aspects 15 through 16, wherein the communication resources that are validated are in a same frequency range as the measurement resources which are a basis for the reference signal measurement information.

Aspect 18: The method of any of aspects 15 through 17, wherein validating the reference signal measurement information comprises: comparing a timing and a value of the reference signal measurement information with a set of threshold measurement values.

Aspect 19: The method of aspect 18, wherein transmitting the uplink communication comprises: transmitting a plurality of uplink communications over a corresponding plurality of validated uplink transmission occasions, wherein the uplink communication resources validation procedure is performed prior to each transmission.

Aspect 20: The method of aspect 19, further comprising: receiving second information that indicates a plurality of reference resources for validation of the reference signal measurement information, each of the plurality of reference resources being associated with a different one of the plurality of validated uplink transmission occasions; and applying an offset or a scaling factor to at least one of the reference signal measurement information or the set of threshold measurement values based on the plurality of reference resources for the validation of the reference signal measurement information being associated with different reference signals, different carrier frequencies, different configurations of receive antennas, or different transmit powers.

Aspect 21: The method of aspect 20, wherein applying the offset or the scaling factor further comprises: receiving the offset or the scaling factor for application to at least one of the reference signal measurement information or the set of threshold measurement values.

Aspect 22: The method of any of aspects 15 through 21, wherein the measurement validation information indicates that a plurality of reference resources for the reference signal measurement information correspond to a resource map between the measurement resources which are a basis for the reference signal measurement information and the communication resources indicated in the first information.

Aspect 23: The method of any of aspects 15 through 22, wherein the measurement validation information indicates that the reference signal measurement information is obtained and the uplink communication is transmitted within a same frequency range.

Aspect 24: The method of any of aspects 15 through 23, wherein the measurement validation information indicates a first time at which a first reference signal measurement information is obtained, a communication resource validation time, a transmission time for transmission of the uplink communication, and a delta time, and the measurement validation information indicates that the first time is prior to or at a same time as the communication resource validation time, which is prior to the transmission time.

Aspect 25: The method of aspect 24, wherein the measurement validation information indicates that a difference between the communication resource validation time and the first time is less than or equal to the delta time.

Aspect 26: The method of any of aspects 24 through 25, wherein the delta time has a value greater than zero and is based on one or more of a frequency range of the uplink communication, a DRX cycle length associated with the first network entity, a measurement window configuration for a reference signal associated with communication resource validation, a type of a reference signal which is a basis for the reference signal measurement information, a configuration of receive antennas used to obtain the reference signal measurement information at the first time, a transmission power associated with the reference signal measurement information, and a configuration of receive antennas used for downlink channel reception.

Aspect 27: The method of any of aspects 15 through 26, further comprising: validating, while in the connection-inactive state, a TAC for application to transmission of the uplink communication using the communication resources indicated in the first information, wherein the TAC validation is based on the validity of the reference signal measurement information as the valid input information.

Aspect 28: A method of wireless communication, comprising: transmitting, by a first network entity and in association with a connection-active state release for a second network entity, first information that indicates: communication resources for uplink communication by the second network entity while the second network entity is in a connection-inactive state, a timing advance command (TAC), measurement resources for a TAC validation procedure, TAC validation information, and measurement validation information, wherein the measurement validation information includes one or more timing-related criterion and one or more non-timing-related criterion; and receiving, while the second network entity is in the connection-inactive state, the uplink communication using the communication resources, the reception indicative that measurement information obtained by the second network entity based on the measurement resources is valid based on the measurement validation information.

Aspect 29: The method of aspect 28, further comprising: transmitting a first instance of a reference signal within a first BWP that was used by the second network entity while in a connected state; and transmitting a second instance of the reference signal within the first BWP that was used by the second network entity while in the connected state.

Aspect 30: The method of any of aspects 28 through 29, further comprising: transmitting a first instance of a reference signal within a first BWP that was used by the second network entity while in a connected state; and transmitting a second instance of the reference signal within a second BWP that was used by the second network entity while in the connection-inactive state.

Aspect 31: The method of any of aspects 28 through 30, further comprising: transmitting a first instance of a reference signal within a second BWP that was used by the second network entity while in the connection-inactive state, wherein a first BWP was used by the first network entity while in a connected state; and transmitting a second instance of the reference signal within the second BWP that was used by the second network entity while in the connection-inactive state.

Aspect 32: The method of any of aspects 28 through 31, further comprising: transmitting an offset or a scaling factor for application by the second network entity to at least one of a first reference signal measurement information, a second reference signal measurement information, or a threshold difference between the first reference signal measurement information and the second reference signal measurement information.

Aspect 33: The method of any of aspects 28 through 32, wherein the non-timing-related criterion indicates that a first reference signal measurement information and a second reference signal measurement information are within a same frequency range.

Aspect 34: The method of any of aspects 28 through 33, wherein the timing-related criterion indicates a first time at which a first reference signal measurement information is obtained by the second network entity, a second time at which the second reference signal measurement information is obtained by the second network entity, a TAC validation time, and a transmission time for transmission of the uplink communication, and the timing-related criterion indicates that the first time is prior to the second time, which is prior to or at a same time as the TAC validation time, which is prior to the transmission time.

Aspect 35: The method of aspect 34, wherein the timing-related criterion indicates that a difference between the TAC validation time and the second time is less than or equal to a delta time threshold, the delta time threshold has a value greater than zero and is based on one or more of a frequency range of the uplink communication, a DRX cycle length associated with the second network entity in the connection-inactive state, a measurement window configuration for a plurality of reference resources associated with the TAC validation procedure, a type and a configuration of a reference signal, and a configuration of receive antennas used to obtain the second reference signal measurement information at the second measurement time.

Aspect 36: The method of any of aspects 34 through 35, wherein the timing-related criterion indicates that a difference between the transmission time and the TAC validation time is less than or equal to a delta time threshold, the delta time threshold has a value greater than zero.

Aspect 37: The method of any of aspects 34 through 36, wherein the timing-related criterion indicates that a difference between a message arrival time and the first time is less than or equal to a delta time threshold, the message arrival time is a most recent time at which the second network entity receives a TAC of a primary TAG or receives the first information, and the delta time threshold has a value greater than zero and is based on one or more of a frequency range of the uplink communication, a DRX cycle length associated with the second network entity, a measurement window configuration for a plurality of reference resources associated with the TAC validation procedure, a type and a configuration of a reference signal, and a configuration of receive antennas used to obtain the first reference signal measurement information at the first time.

Aspect 38: The method of any of aspects 34 through 37, further comprising: transmitting an indication of a first threshold value associated with a difference between the TAC validation time and the second time, a second threshold value associated with a difference between the transmission time and the TAC validation time, and a third threshold value associated with a difference between a message arrival time and the first time, wherein the message arrival time is a most recent time at which the first network entity transmits a TAC of a primary TAG or transmits the first information.

Aspect 39: The method of any of aspects 28 through 38, wherein the uplink communication comprises an initial CG (CG)-small data transmission (SDT) or an autonomous retransmission prior to receiving a response message for the initial CG-SDT transmission.

Aspect 40: A method of wireless communication, comprising: transmitting, by a first network entity and in association with a connection-active state release for a second network entity, first information that indicates: communication resources for uplink communication by the second network entity while the second network entity is in a connection-inactive state, measurement resources for an uplink communication resources validation procedure, uplink communication resources validation information, and measurement validation information; and receiving, while the second network entity is in the connection-inactive state, the uplink communication using the communication resources, the reception indicative that measurement information obtained by the second network entity based on the measurement resources is valid based on the measurement validation information.

Aspect 41: The method of aspect 40, further comprising: transmitting a reference signal within a first BWP that was used by the second network entity while in a connected state or a second BWP that was used by the second network entity while in the connection-inactive state.

Aspect 42: The method of any of aspects 40 through 41, wherein the communication resources that are validated are in a same frequency range as the measurement resources.

Aspect 43: The method of any of aspects 40 through 42, wherein receiving the uplink communication further comprises: receiving a plurality of uplink communications over a corresponding plurality of validated uplink transmission occasions.

Aspect 44: The method of aspect 43, further comprising: transmitting second information that indicates a plurality of reference resources for validation of the measurement information, each of the plurality of reference resources being associated with a different one of the plurality of validated uplink transmission occasions.

Aspect 45: The method of any of aspects 43 through 44, further comprising: transmitting an offset or a scaling factor for application to at least one of the measurement information or a set of threshold measurement values.

Aspect 46: The method of any of aspects 40 through 45, wherein the measurement validation information indicates that a plurality of reference resources for the measurement information correspond to a resource map between the measurement resources which and the communication resources indicated in the first information.

Aspect 47: The method of any of aspects 40 through 46, wherein the measurement validation information indicates a first time at which a first reference signal measurement information is obtained, a communication resource validation time, a transmission time for transmission of the uplink communication, and a delta time, and the measurement validation information indicates that the first time is prior to or at a same time as the communication resource validation time, which is prior to the transmission time.

Aspect 48: The method of aspect 47, wherein the measurement validation information indicates that a difference between the communication resource validation time and the first time is less than or equal to the delta time.

Aspect 49: The method of any of aspects 47 through 48, wherein the delta time has a value greater than zero and is based on one or more of a frequency range of the uplink communication, a DRX cycle length associated with a second network entity, a measurement window configuration for the reference signal associated with communication resource validation, a type of a reference signal which is a basis for the reference signal measurement information, a configuration of receive antennas used to obtain the reference signal measurement information at the first time, a transmission power associated with the reference signal measurement information, and a configuration of receive antennas used for downlink channel reception.

Aspect 50: A first network entity for wireless communication, comprising: a memory; and at least one processor coupled with the memory, wherein the at least one processor is configured to perform a method of any of aspects 1 through 14.

Aspect 51: An apparatus comprising at least one means for performing a method of any of aspects 1 through 14.

Aspect 52: A non-transitory computer-readable medium storing code the code comprising instructions executable by a processor to perform a method of any of aspects 1 through 14.

Aspect 53: A first network entity for wireless communication, comprising: a memory; and at least one processor coupled with the memory, wherein the at least one processor is configured to perform a method of any of aspects 15 through 27.

Aspect 54: An apparatus comprising at least one means for performing a method of any of aspects 15 through 27.

Aspect 55: A non-transitory computer-readable medium storing code the code comprising instructions executable by a processor to perform a method of any of aspects 15 through 27.

Aspect 56: A first network entity for wireless communication, comprising: a memory; and at least one processor coupled with the memory, wherein the at least one processor is configured to perform a method of any of aspects 28 through 39.

Aspect 57: An apparatus comprising at least one means for performing a method of any of aspects 28 through 39.

Aspect 58: A non-transitory computer-readable medium storing code the code comprising instructions executable by a processor to perform a method of any of aspects 28 through 39.

Aspect 59: A first network entity for wireless communication, comprising: a memory; and at least one processor coupled with the memory, wherein the at least one processor is configured to perform a method of any of aspects 40 through 49.

Aspect 60: An apparatus comprising at least one means for performing a method of any of aspects 40 through 49.

Aspect 61: A non-transitory computer-readable medium storing code the code comprising instructions executable by a processor to perform a method of any of aspects 40 through 49.

The methods described herein describe possible implementations, and the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, or optical fields or particles.

The various illustrative blocks and components described in connection with the disclosure herein may be implemented or performed using a general-purpose processor, a DSP, an ASIC, a CPU, an FPGA or other programmable logic device, discrete gate or transistor logic or discrete hardware components designed to perform the functions described herein. A general-purpose processor may be a microprocessor but, in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented using hardware, software executed by a processor, or firmware. If implemented using software executed by a processor, the functions may be stored as or transmitted using one or more instructions or code of a computer-readable medium. Other examples and implementations are within the scope of the disclosure and claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one location to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc. Disks may reproduce data magnetically, and discs may reproduce data optically using lasers. Combinations of the above are also included within the scope of computer-readable media.

As used herein, the term "or" is an inclusive "or" unless limiting language is used relative to the alternatives listed. For example, reference to "X being based on A or B" shall be construed as including within its scope X being based on A, X being based on B, and X being based on A and B. In this regard, reference to "X being based on A or B" refers to "at least one of A or B" or "one or more of A or B" due to "or" being inclusive. Similarly, reference to "X being based on A, B, or C" shall be construed as including within its scope X being based on A, X being based on B, X being based on C, X being based on A and B, X being based on A and C, X being based on B and C, and X being based on A, B, and C. In this regard, reference to "X being based on A, B, or C" refers to "at least one of A, B, or C" or "one or more of A, B, or C" due to "or" being inclusive. As an example of limiting language, reference to "X being based on only one of A or B" shall be construed as including within its scope X being based on A as well as X being based on B, but not X being based on A and B. Also, as used herein, the phrase "based on" shall not be construed as a reference to a closed set of information, one or more conditions, one or more factors, or the like. In other words, the phrase "based on A" (where "A" may be information, a condition, a factor, or the like) shall be construed as "based at least on A" unless specifically recited differently. Also, as used herein, the phrase "a set" shall be construed as including the possibility of a set with one member. That is, the phrase "a set" shall be construed in the same manner as "one or more" or "at least one of."

The term "determine" or "determining" encompasses a variety of actions and, therefore, "determining" can include calculating, computing, processing, deriving, investigating, looking up (such as via looking up in a table, a database or another data structure), ascertaining and the like. Also, "determining" can include receiving (e.g., receiving information), accessing (e.g., accessing data stored in memory) and the like. Also, "determining" can include resolving, obtaining, selecting, choosing, establishing, and other such similar actions.

In the figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the drawings, describes example configurations and does not represent all the examples that may be implemented or that are within the scope of the claims. The term "aspect" or "example" used herein means "serving as an aspect, example, instance, or illustration," and not "preferred" or "advantageous over other aspects." The detailed description includes specific details for the purpose of providing an understanding of the described techniques. These techniques, however, may be practiced without these specific details. In some instances, structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A first network entity for wireless communication, comprising:

a processing system configured to:

receive, in association with a connection-active state release, first information that indicates: communication resources for uplink communication in a connection-inactive state, a timing advance command (TAC), measurement resources for a TAC validation procedure, TAC validation information, and measurement validation information, wherein the measurement validation information includes one or more timing-related criterion and one or more non-timing-related criterion;

obtain, based on the measurement resources, measurement information including first reference signal measurement information corresponding to a first reference signal and second reference signal measurement information corresponding to a second reference signal;

validate, based on the measurement validation information, the measurement information as valid input information for the TAC validation procedure;

perform, while in the connection-inactive state and based on the validation of the measurement information, the TAC validation procedure, wherein, to perform the TAC validation procedure, the processing system is configured to validate, based on the TAC validation information, the TAC for application to transmission of the uplink communication using the communication resources; and transmit, while in the connection-inactive state and based on the validated TAC, the uplink communication using the communication resources.

2. The first network entity of claim 1, wherein, to obtain the measurement information, the processing system is configured to:

receive and measure a first instance of a reference signal within a first bandwidth part that was used by the first network entity while in a connected state; and receive and measure a second instance of the reference signal within the first bandwidth part that was used by the first network entity while in the connected state.

3. The first network entity of claim 1, wherein, to obtain the measurement information, the processing system is configured to:

receive and measure a first instance of a reference signal within a first bandwidth part that was used by the first network entity while in a connected state; and receive and measure a second instance of the reference signal within a second bandwidth part that was used by the first network entity while in the connection-inactive state.

4. The first network entity of claim 1, wherein, to obtain the measurement information, the processing system is configured to:

receive and measure a first instance of a reference signal within a second bandwidth part that was used by the first network entity while in the connection-inactive state, wherein a first bandwidth part was used by the first network entity while in a connected state; and receive and measure a second instance of the reference signal within the second bandwidth part that was used by the first network entity while in the connection-inactive state.

5. The first network entity of claim 1, wherein, to perform the TAC validation procedure, the processing system is configured to:

compare a difference between the first reference signal measurement information and the second reference signal measurement information with a threshold difference.

6. The first network entity of claim 5, wherein the processing system is further configured to:

apply an offset or a scaling factor to at least one of the first reference signal measurement information, the second reference signal measurement information, or the threshold difference based on the first reference signal measurement information and the second reference signal measurement information being associated with different configurations of reference signals, different carrier frequencies, different configurations of receive antennas, or different transmit powers of the reference signals.

7. The first network entity of claim 6, wherein, to apply the offset or the scaling factor, the processing system is further configured to:

receive the offset or the scaling factor for application to at least one of the first reference signal measurement information, the second reference signal measurement information, or the threshold difference.

8. The first network entity of claim 1, wherein the non-timing-related criterion indicates that the first reference signal measurement information and the second reference signal measurement information are obtained within a same frequency range.

9. The first network entity of claim 1, wherein:

the timing-related criterion indicates a first time at which the first reference signal measurement information is obtained, a second time at which the second reference signal measurement information is obtained, a TAC validation time, and a transmission time for transmission of the uplink communication, and the timing-related criterion indicates that the first time is prior to the second time, which is prior to or at a same time as the TAC validation time, which is prior to the transmission time.

10. The first network entity of claim 9, wherein:

the timing-related criterion indicates that a difference between the TAC validation time and the second time is less than or equal to a delta time threshold, and the delta time threshold has a value greater than zero and is based on one or more of a frequency range of the uplink communication, a discontinuous reception cycle length associated with the first network entity in the connection-inactive state, a measurement window configuration for a plurality of reference resources associated with the TAC validation procedure, a type and a configuration of the second reference signal, and a configuration of receive antennas used to obtain the second reference signal measurement information at the second time.

11. The first network entity of claim 9, wherein:

the timing-related criterion indicates that a difference between the transmission time and the TAC validation time is less than or equal to a delta time threshold, and the delta time threshold has a value greater than zero.

12. The first network entity of claim 9, wherein:

the timing-related criterion indicates that a difference between a message arrival time and the first time is less than or equal to a delta time threshold, the message arrival time is a most recent time at which the first network entity receives a TAC of a primary timing advance group or receives the first information, and the delta time threshold has a value greater than zero and is based on one or more of a frequency range of the uplink communication, a discontinuous reception cycle length associated with the first network entity, a measurement window configuration for a plurality of reference resources associated with the TAC validation procedure, a type and a configuration of the first reference signal, and a configuration of receive antennas used to obtain the first reference signal measurement information at the first time.

13. The first network entity of claim 9, wherein the processing system is configured to:

receive an indication of a first threshold value associated with a difference between the TAC validation time and the second time, a second threshold value associated with a difference between the transmission time and the TAC validation time, and a third threshold value associated with a difference between a message arrival time and the first time, wherein the message arrival time is a most recent time at which the first network entity receives a TAC of a primary timing advance group or receives the first information.

14. The first network entity of claim 1, wherein the uplink communication comprises an initial configured grant (CG)-small data transmission (SDT) or an autonomous retransmission prior to receiving a response message for the initial CG-SDT.

15. A method of wireless communication performed by a first network entity, comprising:

receiving, at the first network entity and in association with a connection-active state release, first information that indicates: communication resources for uplink communication in a connection-inactive state, a timing advance command (TAC), measurement resources for a TAC validation procedure, TAC validation information, and measurement validation information, wherein the measurement validation information includes one or more timing-related criterion and one or more non-timing-related criterion;

obtaining, based on the measurement resources, measurement information including first reference signal measurement information corresponding to a first reference signal and second reference signal measurement information corresponding to a second reference signal;

validating, based on the measurement validation information, the measurement information as valid input information for the TAC validation procedure;

performing, while in the connection-inactive state and based on the validation of the measurement information, the TAC validation procedure, wherein performing the TAC validation procedure comprises validating, based on the TAC validation information, the TAC for application to transmission of the uplink communication using the communication resources; and transmitting, while in the connection-inactive state and based on the validated TAC, the uplink communication using the communication resources.

16. The method of claim 15, wherein obtaining the measurement information comprises:

receiving and measuring a first instance of a reference signal within a first bandwidth part that was used by the first network entity while in a connected state; and receiving and measuring a second instance of the reference signal within the first bandwidth part that was used by the first network entity while in the connected state.

17. The method of claim 15, wherein obtaining the measurement information comprises:

receiving and measuring a first instance of a reference signal within a first bandwidth part that was used by the first network entity while in a connected state; and receiving and measuring a second instance of the reference signal within a second bandwidth part that was used by the first network entity while in the connection-inactive state.

18. The method of claim 15, wherein obtaining the measurement information comprises:

receiving and measuring a first instance of a reference signal within a second bandwidth part that was used by the first network entity while in the connection-inactive state, wherein a first bandwidth part was used by the first network entity while in a connected state; and receiving and measuring a second instance of the reference signal within the second bandwidth part that was used by the first network entity while in the connection-inactive state.

19. The method of claim 15, wherein performing the TAC validation procedure comprises:

comparing a difference between the first reference signal measurement information and the second reference signal measurement information with a threshold difference.

20. The method of claim 15, wherein:

the timing-related criterion indicates a first time at which the first reference signal measurement information is obtained, a second time at which the second reference signal measurement information is obtained, a TAC validation time, and a transmission time for transmission of the uplink communication, and the timing-related criterion indicates that the first time is prior to the second time, which is prior to or at a same time as the TAC validation time, which is prior to the transmission time.

* * * * *